CENTRALIZED MEMORY LINE CONCENTRATOR SYSTEM

INVENTORS G. F. ABBOTT, JR.
M. E. KROM
A. C. MEHRING
W. WHITNEY

BY Harold C. Herman
ATTORNEY

CENTRALIZED MEMORY LINE CONCENTRATOR SYSTEM

Filed Dec. 31, 1957 25 Sheets-Sheet 2

INVENTORS G.F. ABBOTT, JR.
M.E. KROM
A.C. MEHRING
W. WHITNEY
BY Harold C. Herman
ATTORNEY July 7, 1959 G. F. ABBOTT, JR., ET AL 2,894,072

CENTRALIZED MEMORY LINE CONCENTRATOR SYSTEM

Filed Dec. 31, 1957 25 Sheets-Sheet 3

INVENTORS G. F. ABBOTT, JR.
M. E. KROM
A. C. MEHRING
W. WHITNEY

BY Harold C. Herman
ATTORNEY

INVENTORS G. F. ABBOTT, JR.
M. E. KROM
A. C. MEHRING
W. WHITNEY
BY Harold C. Herman
ATTORNEY.

CENTRALIZED MEMORY LINE CONCENTRATOR SYSTEM

Filed Dec. 31, 1957 25 Sheets-Sheet 5

INVENTORS G.F. ABBOTT, JR.
M.E. KROM
A.C. MEHRING
W. WHITNEY
BY Harold C. Herman
ATTORNEY July 7, 1959 G. F. ABBOTT, JR., ET AL 2,894,072

CENTRALIZED MEMORY LINE CONCENTRATOR SYSTEM

Filed Dec. 31, 1957 25 Sheets-Sheet 6

INVENTORS G.F. ABBOTT, JR.
M.E. KROM
A.C. MEHRING
W. WHITNEY

BY Harold C. Herman

ATTORNEY

CENTRALIZED MEMORY LINE CONCENTRATOR SYSTEM

Filed Dec. 31, 1957 25 Sheets-Sheet 7

INVENTORS G. F. ABBOTT, JR.
M. E. KROM
A. C. MEHRING
W. WHITNEY
BY Harold C. Herman
ATTORNEY

INVENTORS G. F. ABBOTT, JR.
M. E. KROM
A. C. MEHRING
W. WHITNEY

BY Harold C. Herman
ATTORNEY

CENTRALIZED MEMORY LINE CONCENTRATOR SYSTEM

INVENTORS G. F. ABBOTT, JR.
M. E. KROM
A. C. MEHRING
W. WHITNEY

BY Harold C. Herman
ATTORNEY

CENTRALIZED MEMORY LINE CONCENTRATOR SYSTEM

INVENTORS G.F. ABBOTT, JR.
M.E. KROM
A.C. MEHRING
W. WHITNEY
BY Harold C. Hesman
ATTORNEY

CENTRALIZED MEMORY LINE CONCENTRATOR SYSTEM

Filed Dec. 31, 1957 25 Sheets-Sheet 11

INVENTORS G. F. ABBOTT, JR.
M. E. KROM
A. C. MEHRING
W. WHITNEY

BY Harold C. Herman
ATTORNEY

CENTRALIZED MEMORY LINE CONCENTRATOR SYSTEM

INVENTORS G. F. ABBOTT, JR.
M. E. KROM
A. C. MEHRING
W. WHITNEY
BY Harold C. Herman
ATTORNEY

CENTRALIZED MEMORY LINE CONCENTRATOR SYSTEM

Filed Dec. 31, 1957 25 Sheets-Sheet 13

INVENTORS G.F. ABBOTT, JR.
M.E. KROM
A.C. MEHRING
W. WHITNEY
BY
Harold C. Herman
ATTORNEY

CENTRALIZED MEMORY LINE CONCENTRATOR SYSTEM

Filed Dec. 31, 1957

25 Sheets-Sheet 14

INVENTORS G.F. ABBOTT, JR.
M.E. KROM
A.C. MEHRING
W. WHITNEY

BY Harold C. Herman
ATTORNEY

CENTRALIZED MEMORY LINE CONCENTRATOR SYSTEM

INVENTORS G.F. ABBOTT, JR.
M.E. KROM
A.C. MEHRING
W. WHITNEY

BY Harold C. Herman

ATTORNEY

CENTRALIZED MEMORY LINE CONCENTRATOR SYSTEM

INVENTORS G. F. ABBOTT, JR.
M. E. KROM
A. C. MEHRING
W. WHITNEY
BY Harold C. Herman
ATTORNEY INVENTORS G. F. ABBOTT, JR.
M. E. KROM
A. C. MEHRING
W. WHITNEY
BY Harold C. Herman
ATTORNEY INVENTORS G.F. ABBOTT, JR.
M.E. KROM
A.C. MEHRING
W. WHITNEY
BY Harold C. Herman
ATTORNEY

INVENTORS G. F. ABBOTT, JR.
M. E. KROM
A. C. MEHRING
W. WHITNEY

BY Harold C. Herman
ATTORNEY

INVENTORS G. F. ABBOTT, JR
M. E. KROM
A. C. MEHRING
W. WHITNEY
BY Harold C. Herman
ATTORNEY

CENTRALIZED MEMORY LINE CONCENTRATOR SYSTEM

INVENTORS G. F. ABBOTT, JR.
M. E. KROM
A. C. MEHRING
W. WHITNEY
BY Harold C. Herman
ATTORNEY

CENTRALIZED MEMORY LINE CONCENTRATOR SYSTEM

INVENTORS G. F. ABBOTT, JR.
M. E. KROM
A. C. MEHRING
W. WHITNEY

BY Harold C. Herman
ATTORNEY

CENTRALIZED MEMORY LINE CONCENTRATOR SYSTEM

FIG. 23

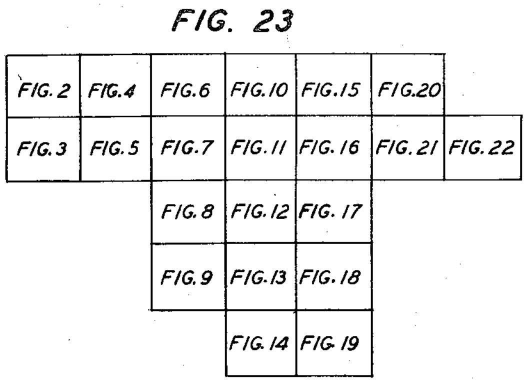

FIG. 24

| CONNECT LEAD | TO THE T-LEAD ASSOCIATED WITH VG-RELAYS | | | | | | | | | |
|---|---|---|---|---|---|---|---|---|---|---|
| | VG0 | VG1 | VG2 | VG3 | VG4 | VG5 | VG6 | VG7 | VG8 | VG9 |
| C0 | T3 | T2 | | T0 | T1 | | | T2 | | |
| C1 | T2 | T3 | | T1 | T3 | | | T0 | | |
| C2 | T1 | | T0 | T2 | | | | | T0 | T3 |
| C3 | T0 | | T1 | T3 | | | | | T2 | T1 |
| C4 | | | T2 | | T0 | T1 | T2 | T3 | | |
| C5 | | | T3 | | T2 | T3 | T0 | T1 | | |
| C6 | | T0 | | | | T0 | T3 | | T1 | T2 |
| C7 | | T1 | | | | T2 | T1 | | T3 | T0 |

FIG. 25

| VG | TSA | SM | SWITCH |
|---|---|---|---|
| 0 | 0,1 | 0 | 0,1 |
| | 2,3 | 0 | 2,3 |
| | 8,9 | 0 | 8,9 |
| 1 | 0,1 | 1 | 0,1 |
| | 6,7 | 0 | 6,7 |
| | 8,9 | 1 | 8,9 |
| 2 | 2,3 | 1 | 2,3 |
| | 4,5 | 0 | 4,5 |
| | 8,9 | 2 | 8,9 |
| 3 | 0,1 | 2 | 0,1 |
| | 2,3 | 2 | 2,3 |
| | 8,9 | 3 | 8,9 |
| 4 | 0,1 | 3 | 0,1 |
| | 4,5 | 1 | 4,5 |
| | 8,9 | 4 | 8,9 |
| 5 | 4,5 | 2 | 4,5 |
| | 6,7 | 1 | 6,7 |
| | 8,9 | 0 | 8A,9A |
| 6 | 4,5 | 3 | 4,5 |
| | 6,7 | 2 | 6,7 |
| | 8,9 | 1 | 8A,9A |
| 7 | 0,1 | 4 | 0,1 |
| | 4,5 | 4 | 4,5 |
| | 8,9 | 2 | 8A,9A |
| 8 | 2,3 | 3 | 2,3 |
| | 6,7 | 3 | 6,7 |
| | 8,9 | 3 | 8A,9A |
| 9 | 2,3 | 4 | 2,3 |
| | 6,7 | 4 | 6,7 |
| | 8,9 | 4 | 8A,9A |

FIG. 26

| VF | TSA | VG | SM | SWITCH |
|---|---|---|---|---|
| 0,3 | 0,7 | | 9 | 0-7 |
| | 8,9 | 0-4 | 9 | 8,9 |
| | | 5-9 | 9 | 8A,9A |
| 1,4 | 0,7 | | 8 | 0-7 |
| | 8,9 | 0-4 | 8 | 8,9 |
| | | 5-9 | 8 | 8A,9A |
| 2 | 0,7 | | 7 | 0-7 |
| | 8,9 | 0-4 | 7 | 8,9 |
| | | 5-9 | 7 | 8A,9A |
| 3,4 | 0 7 | | 6 | 0-7 |
| | 8,9 | 0-4 | 6 | 8,9 |
| | | 5-9 | 6 | 8A,9A |

FIG. 29

| CONNECT INDICATED CONTACT OF VG0-9 RELAYS TO INDICATED LEVEL OF MEMORY X BAR SWITCHES | | | | | | | | | | ON SWITCHES |
|---|---|---|---|---|---|---|---|---|---|---|
| VG0 | VG1 | VG2 | VG3 | VG4 | VG5 | VG6 | VG7 | VG8 | VG9 | |
| L0 | L1 | | L2 | L3 | | | L4 | | | 0.1 |
| L0 | | L1 | L2 | | | | | L3 | L4 | 2.3 |
| | | L0 | | L1 | L2 | L3 | L4 | | | 4.5 |
| | L0 | | | | L1 | L2 | | L3 | L4 | 6.7 |
| L0 | L1 | L2 | L3 | L4 | | | | | | 8.9 |
| | | | | | L0 | L1 | L2 | L3 | L4 | 8A.9A |

INVENTORS G. F. ABBOTT, JR.
M. E. KROM
A. C. MEHRING
W. WHITNEY

BY Harold C. Herman
ATTORNEY

INVENTORS G.F. ABBOTT, JR.
M.E. KROM
A.C. MEHRING
W. WHITNEY
BY Harold C. Herman
ATTORNEY.

CENTRALIZED MEMORY LINE CONCENTRATOR SYSTEM

Filed Dec. 31, 1957 25 Sheets-Sheet 25

INVENTORS G. F. ABBOTT, JR.
M. E. KROM
A. C. MEHRING
W. WHITNEY
BY Harold C. Herman
ATTORNEY United States Patent Office 2,894,072

Patented July 7, 1959

2,894,072

CENTRALIZED MEMORY LINE CONCENTRATOR SYSTEM

George F. Abbott, Jr., Pearl River, N.Y., and Myron E. Krom, Convent Station, Arthur C. Mehring, Summit, and Wiley Whitney, Madison, N.J., assignors to Bell Telephone Laboratories, Incorporated, New York, N.Y., a corporation of New York Application December 31, 1957, Serial No. 706,342

29 Claims. (Cl. 179—18)

This invention relates to telephone systems and more particularly to subscriber line concentrator systems.

Each subscriber station normally requires a pair of wires to connect it with the central office. For a substation which is located at a considerable distance from the central office the cost of these wires is substantial. In fact, in the present day telephone plant a large portion of the cost of installation and operation is that of the wire used in the subscriber loops between the substations and the central office. A line concentrator system is a means for reducing the outside plant serving the central office by effectively moving a portion of the switching equipment to which the lines are connected to a location remote from the central office. The remotely located equipment is a slave unit controlled by the central office to concentrate the traffic from the subscriber lines to the central office. A system of this type is disclosed in the Patent 2,812,385 granted on November 5, 1957, to Joel-Krom-Posin.

It is a general object of this invention to provide an improved communication system in which a large number of subscriber lines may be individually connected to a central office by a smaller number of common trunks.

Another general object of the present invention is to provide an improved line concentrator system which effects economies in the central office equipment and in the wiring connecting central offices with subscriber stations.

An illustrative embodiment of the present invention makes use of common control equipment found in crossbar systems such as described in the Patent 2,585,904 which was granted to A. J. Busch on February 19, 1952. Such common control telephone systems utilize two basic types of switching systems which are designated line link frames and trunk link frames. The line link frames and the trunk link frames are interconnected by a network of junctors. Subscriber lines are associated with the line link frames and all types of outgoing and incoming trunks as well as originating registers for supplying dial tone and storing dialed numbers are associated with the trunk link frames. Through this system of line and trunk link frames traffic flows in two directions: originating calls from a subscribed line appearance on a line link frame to a trunk appearance on a trunk link frame and terminating calls from a trunk appearance on a trunk link frame to a line appearance on a line link frame. The line link frames are therefore bilateral handling both originating and terminating calls with each subscriber line having only a single appearance in the switching equipment. By remotely locating the first switching stage, a relatively small amount of equipment is remotely located because of the single appearance of each subscriber line. The remotely located first switching stage is part of the slave unit which is referred to as the line concentrator.

The establishment of all connections through the line and trunk link frames is controlled by common circuits referred to as markers. The duration required by the marker to establish a connection provides an important cost indication because the longer the marker holding time, the larger is the number of markers required for a given volume of traffic. Concentrator systems, due to the necessity of passing information to and from the line concentrator, tend to increase the marker holding time.

It is another object of this invention to provide a line concentrator system which does not materially increase the holding time of markers in crossbar type telephone systems.

Still another object of this invention is to maintain marker holding time at a minimum value by avoiding a number of signaling operations usually required between the remote concentrator and the central office.

In the illustrative embodiment of the invention, each of a number of remote line concentrators provides connections from fifty subscriber lines to ten talking trunks extending from the central office. Each of the concentrators is connected to the central office by the ten talking trunks and also by two signaling trunks. The signaling trunks are part of a line scanning system which functions to determine the service condition of each of the lines and to signal the determined condition to the central office. Each of the concentrators includes a line scanning circuit of the type disclosed in the copending patent application Serial No. 706,474, filed by G. F. Abbott, Jr. on even date herewith. A pulse generator in the central office drives the line scanners in each of the concentrators to cyclically determine the service conditions of the fifty subscriber lines terminating thereat.

When a call is initiated on one of the subcriber lines, a service request indication is supplied by the line scanner over the signaling trunks to the central office. In the central office, the identity of the service requesting line is registered and a preferred idle concentrator trunk is selected for the call. In order to determine the availability of the concentrator trunks, a memory circuit in the central office is checked. The memory circuit, which maintains a record of all of the connections established through the line concentrators, is consulted wherever the condition of a line or trunk is required at the central office.

An important feature of this invention relates to the provision of a central office memory circuit which reduces considerably the signaling to and from the line concentrators.

Some of the functions provided by the central office memory circuit are as follows:

(*a*) To provide, as indicated above, idle trunk indications during the trunk selection sequence;

(*b*) To provide a line busy indication during a terminating call to a busy concentrator line;

(*c*) To identify the concentrator trunk utilized for a dial-tone connection for a callback call;

(*d*) To identify the concentrator trunk to which a busy line is connected when a no-test call is made to the busy line; and (*e*) To provide emergency line tracing of concentrator calls.

Most of these specific functions heretofore required signaling between the central office and the line concentrator. For example on a terminating call, a signaling sequence to and from a busy called line was required. The provision of means for accomplishing each of the specific functions of the memory circuit are features of this invention. By accomplishing these functions at the central office, signaling to the concentrator is unnecessary and a material increase in marker holding time due to the utilization of the line concentrator is avoided.

Still another feature of this invention pertains to means for checking the memory circuit for the condition of a called concentrator line before the signaling operation for the terminating call to the concentrator is initiated.

A further feature of this invention relates to relay means for maintaining the establishment of a connection through a concentrator trunk in the absence of operating current. Magnetically latched relays are utilized at the concentrators for maintaining the connection which require release current to disconnect the established connection.

Further objects, features and advantages of the present invention will become apparent upon consideration of the following description in conjunction with the drawing wherein:

Figs. 2 through 22 are a circuit representation of the line concentrator system of the present invention wherein:

Figs. 2 through 5 illustrate a remotely located line concentrator;

Fig. 6 illustrates a concentrator control circuit at the central office;

Fig. 7 illustrates functionally another concentrator and another concentrator control circuit;

Fig. 8 illustrates the register circuit at the central office;

Fig. 9 illustrates a pulse generating circuit at the central office;

Figs. 10 and 15 illustrate a trunk switch at the central office;

Figs. 11 through 13, 16 and 18 illustrate a memory circuit at the central office;

Figs. 14 and 19 illustrate an outpulsing circuit at the central office;

Fig. 17 illustrates a trunk selector circuit at the central office;

Fig. 20 illustrates functionally some of the crossbar common control equipment; and Figs. 21 and 22 illustrate a frame control circuit at the central office;

Fig. 23 illustrates the arrangement of Figs. 2 through 22;

Fig. 24 is a table illustrating the trunk connections for each vertical group;

Fig. 25 is a table illustrating the storage of the vertical group information in the memory circuit;

Fig. 26 is a table illustrating the storage of the vertical file information in the memory circuit;

Fig. 29 is a table illustrating the connections from contacts shown in Fig. 18 of the vertical file and vertical group relays.

GENERAL CIRCUIT DESCRIPTION

Figure 1:
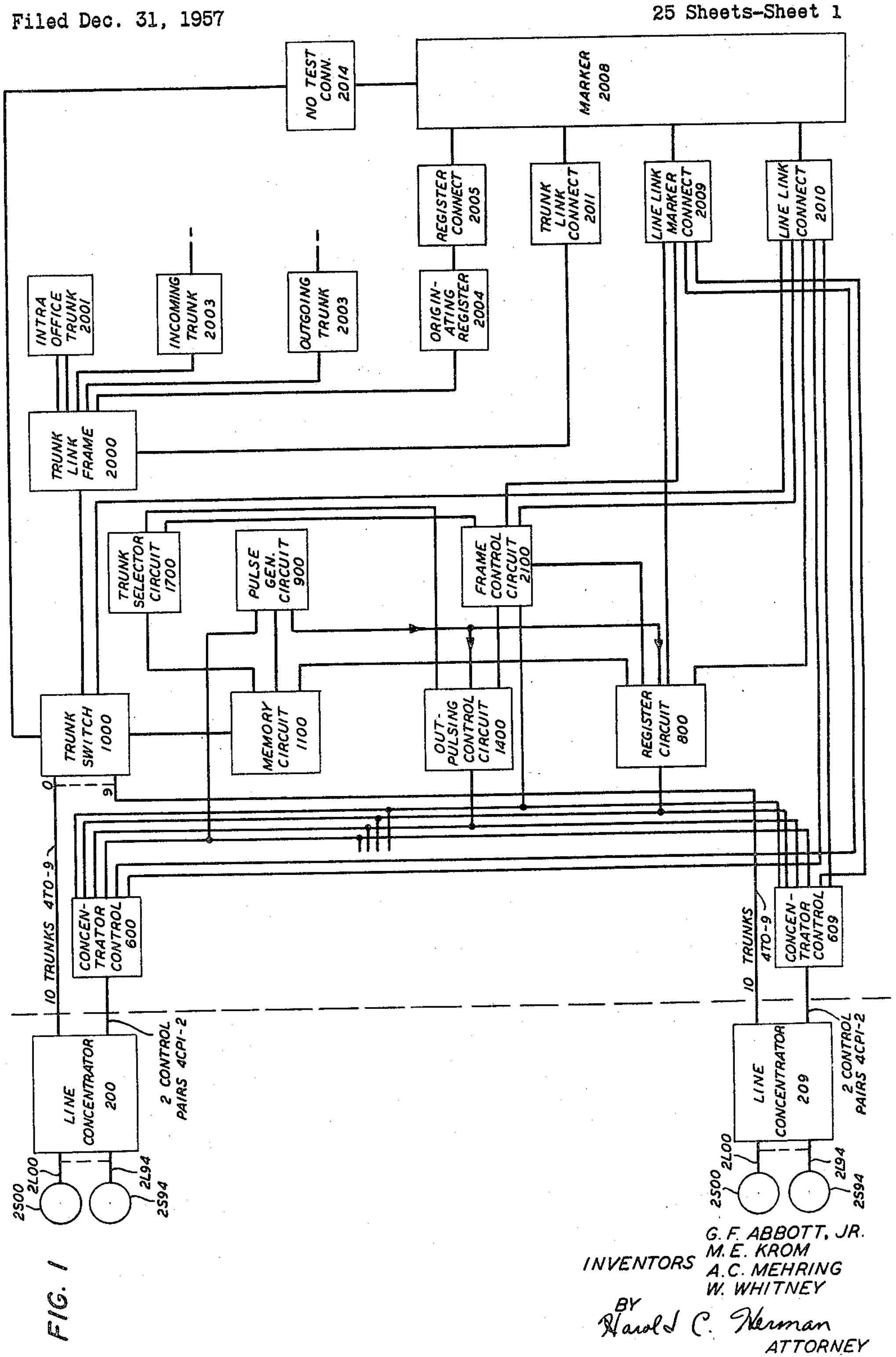
Fig. 1 is a functional diagram of the line concentrator system of the present invention.
Figure 2:
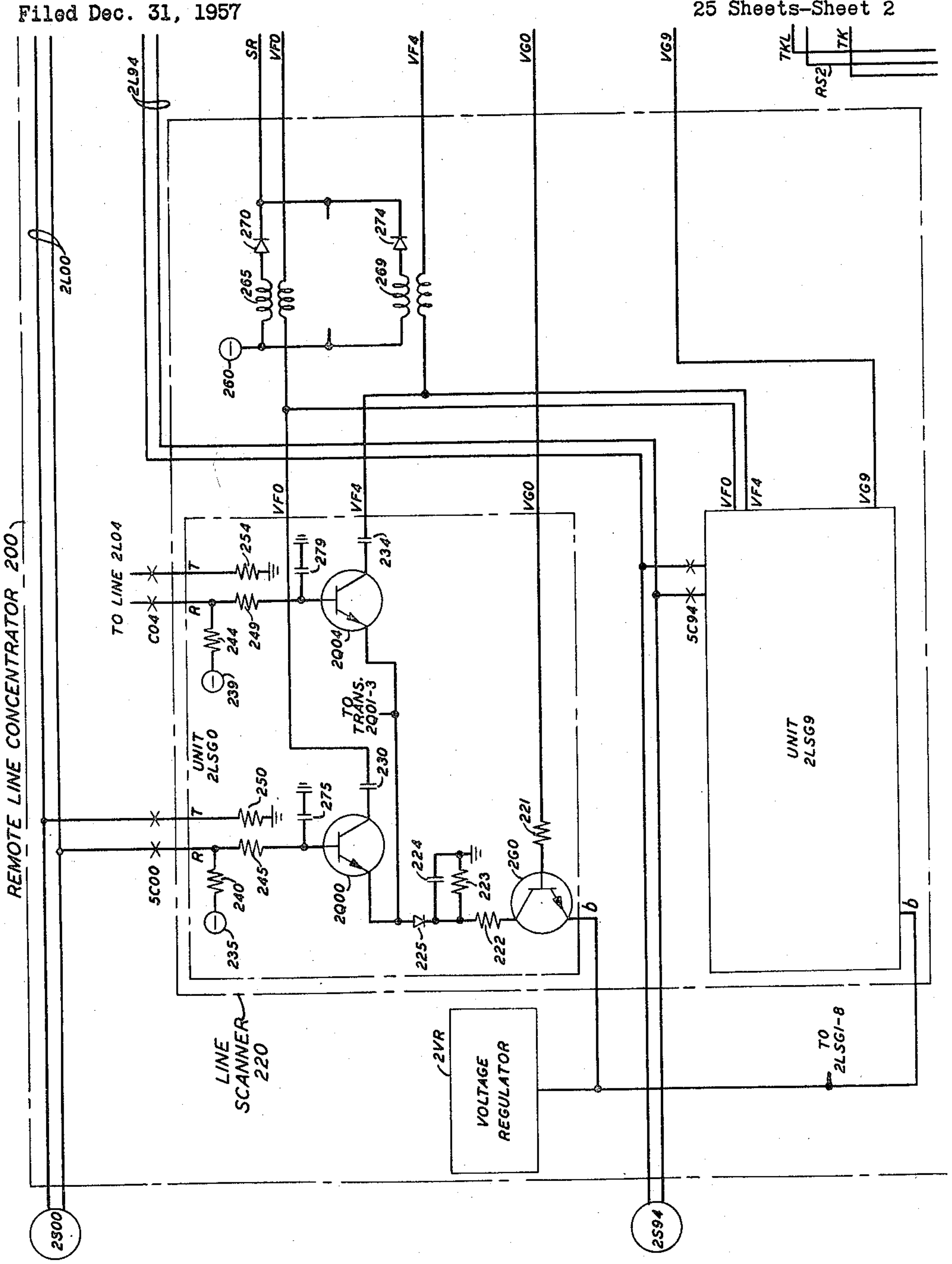
Figure 3:
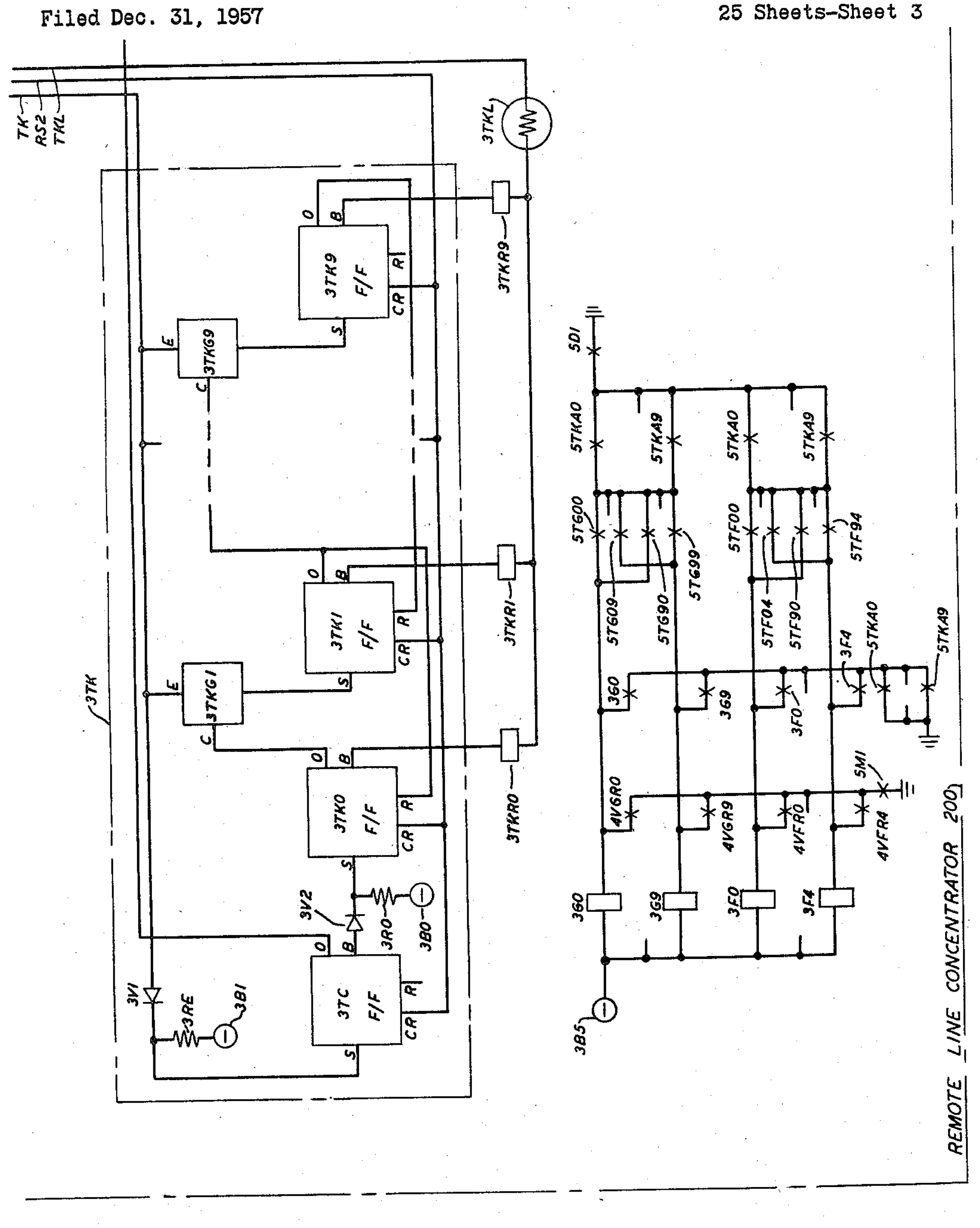
Figure 4:
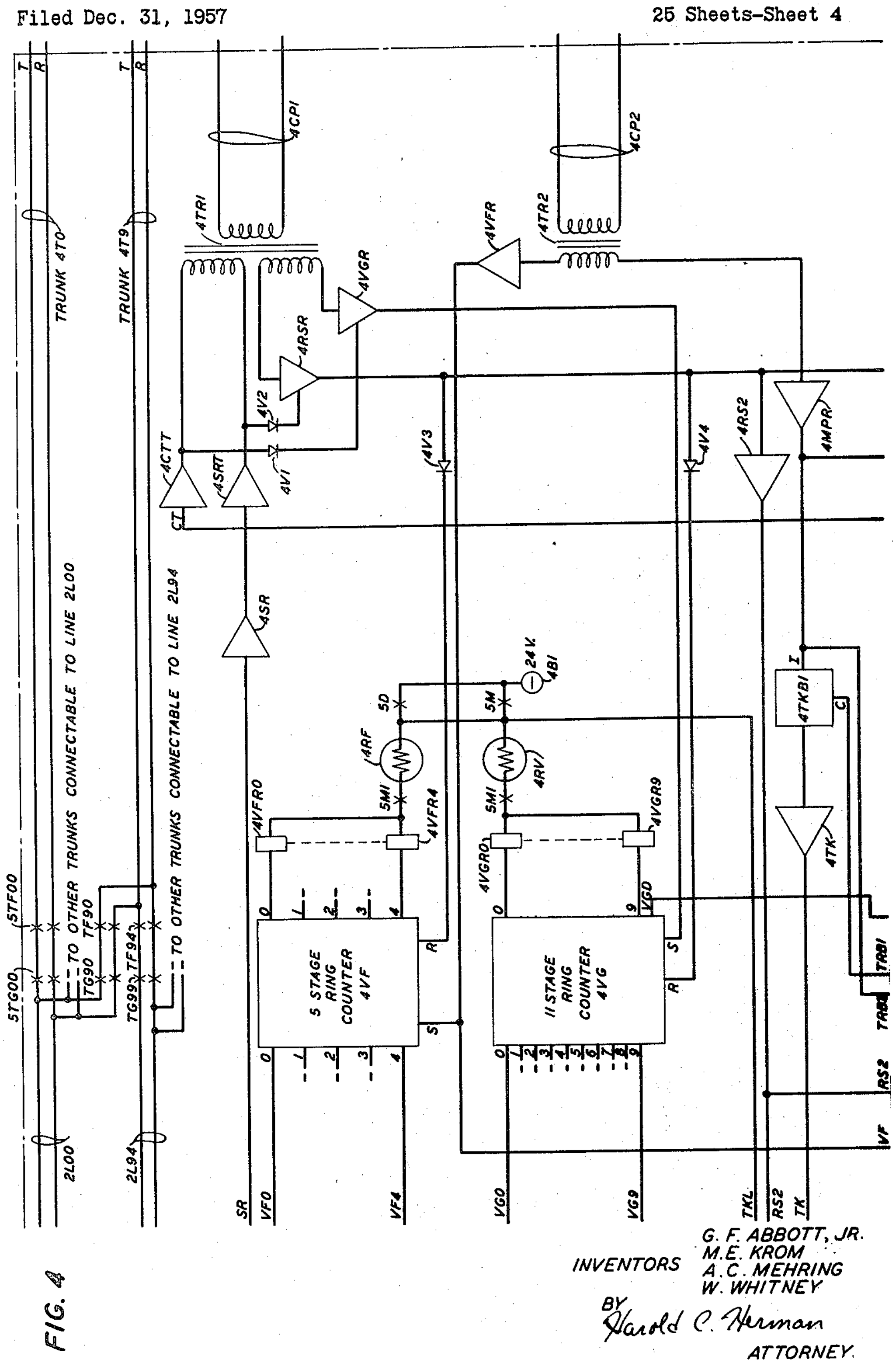
Figure 5:
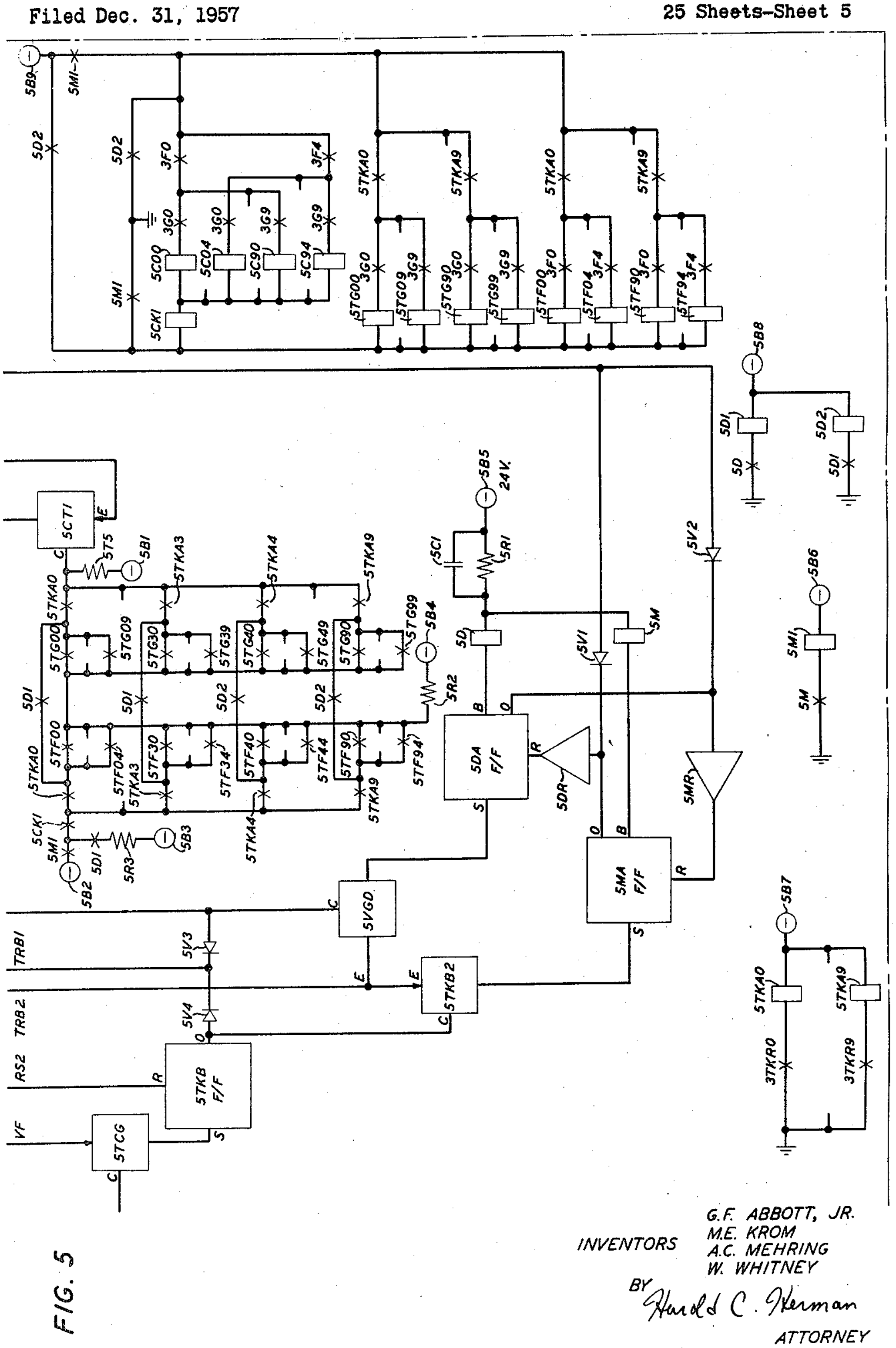

Referring to Fig. 1, which is a functional representation of the line concentrator system of this invention, the first digit or digits of the reference numbers indicates one of the figures in the detail circuit drawing in which the circuit appears. For example, the line concentrator 200 appear partially in Fig. 2.

The line concentrator 200 and nine other line concentrators 201–9 provide for connections from groups of fifty subscriber station 2S00, etc. to groups of ten talking trunks 4T0–9. Of the fifty subscriber stations 2L00, etc. connected to each of the line concentrators 200–9, only the substations 2S00 and 2S94 are shown. The designations of the substations identify the vertical group and a vertical file of the substation. These terms, which are hereinafter described, identify the time position of the substations in a scanning cycle. The last digit to each designation indicates the vertical file identity and the next-to-last digit indicates the vertical group identity. For example, the substation 2S94 has a vertical group of 9 and a vertical file of 4.

The effect of utilizing the line concentrators 200–9 is to place a part of the switching equipment of the central office at a distance therefrom. Each of the line concentrators 200–9 is connected to the central office by one of the groups of ten trunks 4T0–9 and by two control pairs 4CP1–2. The trunks 4T0–9 provide talking paths between the line concentrators 200–9 and the central office and the two control pairs 4CP1–2 provide for signalling paths to and from the central office equipment. With fifty subscriber stations connected to each of the ten concentrators 200–9 there are a total of 500 stations which are served by the central office equipment shown in Figs. 6 through 22. The stations 2S00, etc. are connected respectively by the lines 2L00, etc. to their associated concentrators 200–9.

With all 500 subscriber lines idle the central office continuously and synchronously scans the ten groups of fifty subscriber lines connected respectively to the ten concentrators 200–9 in order to detect service requests. The ten line concentrators 200–9 are synchronously scanned under control of a pulse generator 900 which simultaneously provides scanning pulses in parallel through ten concentrator control circuits 600–9 and the ten sets of control pairs 4CP1–2 to the ten line concentrators 200–9. The pulse generator 900 also supplies the scanning pulses to a register circuit 800 which is synchronously operated with the line concentrators 200–9. The concentrator control circuits 600–9 are individually associated with the concentrators 200–9 and the pulse generator 900 and the register 800 are common control equipment for all ten concentrators 200–9.

The pulse generator 900 supplies four types of pulses: vertical group pulses; vertical file pulses; reset pulses; and two types of timing pulses. These four types of pulses are illustrated in the pulse sequence diagram shown in Fig. 28. As in ordinary crossbar telephone systems the subscriber lines are arbitrarily arranged in groups designated vertical groups, vertical files and horizontal groups. All the subscriber lines connected to one of the ten concentrators 200–9 are in the same horizontal group and each horizontal group is subdivided into ten vertical groups each of which includes five vertical files. The vertical group pulses supplied by the generator 900 select a group of five lines connected to each of the concentrators 200–9. The vertical group pulse is supplied simultaneously to the ten line concentrators 200–9 so that five times ten or fifty subscriber lines are simultaneously selected. Between two such vertical group pulses the pulse generator 900 supplies five vertical file pulses to select one subscriber line connected to each of the ten concentrators 200–9. In order to scan the 500 lines the pulse generator 900 provides to each of the ten concentrators 200–9 and to the register 800, ten vertical group pulses spaced at intervals of 24 milliseconds and between each pair of vertical group pulses five vertical file pulses spaced at intervals of 4 milliseconds. The complete scanning cycle has a duration of 240 milliseconds.

In addition to the vertical group pulses and the vertical file pulses the generator 900 supplies one reset pulse at the beginning of each cycle to insure the synchronous operation of the line concentrators 200–9 and the register 800 with the generator 900. Each reset pulse also functions as the first vertical group pulse so that only nine vertical group pulses are provided instead of ten during each scanning cycle.

During each scanning cycle, therefore, the generator 900 supplies one reset pulse, nine vertical group pulses and fifty vertical file pulses. The generator 900 also supplies timing pulses at a rate of 500 and 250 pulses per second which are utilized when a call to or from one of the 500 subscriber lines is served. The line scanning sequence is at a relatively low frequency of 250 pulses per second because of the propagation time of the signals through the control pairs 4CP1–2. The sequences of pulses are such that a vertical file pulse must be sent from the central office and a service request derived from that vertical file pulse must be received back at the central office before the succeeding vertical file pulse is transmitted. It is this limitation which establishes a maximum of 250 pulses per second for the scanning frequency. This limitation, however, does not exist during an outpulsing sequence for supplying line and trunk identities to the concentrators 200–9 so that a speed of 500 pulses per second may be utilized. A higher outpulsing speed is desirable to prevent increasing the holding time of common control equipment hereinafter described.

At the line concentrators 200–9 the scanning pulses function to cyclically determine the service conditions of the fifty lines 2L00, etc. connected thereto. If all ten sets of fifty lines 2L00, etc. remain idle, the scanning sequence continues uninterrupted under control of the vertical group, vertical file and reset pulses from the central office. In each of the line concentrators 200–9 each vertical group pulse prepares for scanning five lines and each vertical file pulse scans one of the five lines in the group. The lines are successively scanned by the vertical file pulses so that service requests initiated at the line concentrators 200–9 can be identified at the register 800 on a time basis.

When a service request is initiated at any one of the ten sets of fifty lines 2L00, etc. the vertical file pulse identifying it is transformed by the associated one of the line concentrators 200–9 to a service request pulse which is sent back through the control pairs 4CP1–2 to the central office. Assume, for example, that a service request is initiated at the line 2L00 of the line concentrator 200. The service request pulse is supplied through the control pair 4CP1 to the concentrator control circuit 600 in the central office. The control circuit 600 functions to register the identity of the concentrator from which the service request is initiated and to initiate a sequence of operations for establishing a connection from the service requesting line 2L00 through one of the trunks 4T0–9 and a trunk switch 1000 to an originating register 2004 which supplies dial tone. More specifically, the concentrator control circuit 600 halts the register circuit 800 at the identity of the calling line 2L00, it halts the vertical group and reset pulsing to the line concentrator 200 and it supplies an inhibiting potential to the circuits 601–9 which block the vertical group and reset pulsing to the line concentrators 201–9. The circuit 600 also supplies the identity of the service requesting concentrator 200, which is the horizontal group identity to a frame control circuit 2100. The frame control circuit 2100 functions as a buffer between the common control equipment such as connectors 2010 and 2009 and a marker 2008, which are disclosed in the above-identified Busch patent and the central office common control equipment associated with the line concentrators 200–9. When the frame control circuit receives the horizontal group identity and also the vertical group identity of the service requesting line 2L00 it functions to seize the marker 2008 for the originating call.

When the register 800 is stopped, it registers an indication of the vertical file and the vertical group of the service requesting line 2L00 and supplies the line identity to the frame control circuit 2100. When the frame control circuit 2100, receives the vertical group identity, it seizes the line link marker connector 2009 and supplies to it a seizure indication indicating a request for the connection of the marker 2008. Responsive thereto, the marker 2008 is seized by the connector 2009 and in turn seizes the line link connector 2010.

When the marker 2008 is seized, it seizes the dial-tone register 2004 through a connector 2005 in preparation for connecting it to the calling line 2L00 and it seizes the line link connector 2010 receiving the vertical group and horizontal group information therefrom. The vertical file information is thereafter received from the connector 2009. With the vertical group, vertical file and horizontal group information relating to the calling line 2L00 received from the marker 2008, the line link connector 2010 is controlled by the marker 2008 to supply this information to the frame control circuit 2100. In addition, an indication that the call is a dial tone or originating call is supplied to the frame control circuit 2100.

The line information is supplied back to the circuit 2100 in this manner to provide for a sequence that may be utilized for originating as well as terminating calls. As is hereinafter described, a terminating call is handled in substantially the same manner as an originating call from the time the frame control circuit 2100 receives the line information from the marker 2008.

When the frame control circuit 2100 receives the line information from the marker 2008, it functions to halt an abandoned call check, to initiate a trunk selection sequence in the trunk selector 1700, and to ready the central office and the line concentrator 200 for outpulsing the identity of the selected trunk and the identity of the calling line 2L00 to the line concentrator 200. In readying the central office, the circuit 2100 supplies the line information to an outpulsing control circuit 1400 which, as is hereinafter described, outpulses it to the concentrator 200. The line information is also supplied by the circuit 2100 to a memory circuit 1100 which maintains a running record of the connections established through the line concentrators 200–9. When the information is received at the memory circuit 1100, an idle test is made of the calling line 2L00. For originating calls this check or test is unnecessary. However, the same test is made for terminating calls, callback calls and no-test calls where it is necessary. The same outpulsing sequence is utilized for the terminating and originating calls so that the test is made on the originating call as well as on terminating calls. An idle line indication is provided to the outpulsing control circuit 1400.

An abandoned call check is initiated when the vertical group pulsing to the concentrator 200 is inhibited at the control circuit 600. When the vertical group pulsing is halted, the vertical file pulse continues to cyclically scan the five lines 2L00–4 in the vertical group 0. In effect, the scanning rate is increased because the scanning is within a single vertical group instead of ten. Each time the line 2L00 is scanned, a service request pulse is returned through the control pairs 4CP1–2 and the circuit 600 to the register 800. The register 800 monitors the service requests and if one fails to arrive from the concentrator 200 before the frame control circuit 2100 is operated by the marker 2008, the call is considered abandoned and a release sequence is initiated by the register 800 for returning the central office to normal and to resume normal scanning. When the frame control circuit 2100 is seized by the marker 2008, it operates the circuit 600 to block the vertical file pulsing and it provides an indication to the register 800 that the abandoned call check is terminated.

The trunk selection sequence is initiated in the selector circuit 1700 when a start potential is provided thereto from the frame control circuit 2100. In addition to the start potential from the frame control circuit 2100, the selector circuit 1700 utilizes a timing pulse from the pulse generator 900 and trunk availability information from the memory circuit 1100. Only six of the trunks 4T0–9 are available for connection to any one of the lines 2L00, etc. and a selection preference is established wherein trunks 4T8–9 are always the last two preferred trunks. The six trunks connectable to a line are referred to as a trunk multiple and the multiples are the same for all five lines in each vertical group. In all, there are ten different trunk multiples, one for each vertical group.

The trunk availability information is provided to the circuit 1700 from the memory circuit 1100 which stores a record of each established call or connection through the line concentrators 200–9. The trunk availability information is supplied from the memory circuit 1100 through a number of leads which are selectively grounded to indicate trunk availability. Fig. 24 illustrates the order in which the trunks are tested for each vertical group. The leads C0–7 identify the trunk number and the leads T0–3 identify the order of testing for preference. For example, the trunks 4T0–3, 4T8–9 are connectable to any of the lines 2L00–4 in the vertical group 0, with the order of preference being 4T3, 4T2, 4T1, 4T0, 4T8 and 4T9. A ground potential is provided for one of the trunks 4T0–9 to the selector circuit 1700 when an idle indication is provided both from the memory circuit 1700 and also from a trunk switch 1000. Both must provide an idle indication for a trunk availability ground to be provided to the circuit 1700. Only available trunks provide for a ground potential to the circuit 1700 as trunks that are busy as well as trunks that are not in the trunk multiple provide for an open circuit to the selector circuit 1700.

Suppose, for example, that trunks 4T3–1 of the concentrator 200 are busy but that trunk 4T0 is idle so that a ground potential is provided for the fourth preferred trunk. With the first three preferred trunks 4T3–1 for the vertical group 0 unavailable, the fourth preferred trunk 4T0, which is idle, is selected and identified by the selector circuit 1700. The selected trunk identity is supplied by the circuit 1700 to the trunk switch 100 and to the memory circuit 1100. The switch 1000 functions to connect the trunk 4T0 through a trunk link frame 2000 to the originating register 2004, and the memory circuit 1100 functions to register the line and selected trunk identities. As described above, the line information is supplied to the memory circuit 1100 from the circuit 2100 when it is seized by the marker 2008. As is hereinafter described, the switch 1000 does not complete the connection until a memory check indication of the registration of the line and trunk information is provided thereto. When the selector circuit 1700 selects the trunk 4T0, it also provides an indication that a trunk is selected through the frame control circuit 2100 and the connector 2010 to the marker 2008.

If all the trunks in the multiple are busy, the call is abandoned. The marker 2008 does not complete the connection to the originating register 2004 until the indication is provided through the connector 2010 that the selector circuit 1700 has selected a trunk. If a trunk is not selected an overflow indication is provided from the selector circuit 1700 to the frame control circuit 2100 which initiates a reset operation for returning the central office and the line concentrators 200–9 to normal.

When the concentrator control circuit 600 is operated by the circuit 2100 to halt the abandoned call check, it also readies outpulsing paths from the control circuit 1400 to the control pairs 4CP1–2 and it provides a start potential to the circuit 1400. Responsive thereto and before initiating a trunk outpulsing sequence, the circuit 1400 supplies a reset pulse to the line concentrators 200–9 to ready them for the reception of the outpulsed information.

With the reset pulse provided to the concentrator 200, and with an idle test indication received from the memory circuit 1100, the circuit 1400 supplies to the selector circuit 1700 timing pulses from the pulse generator 900. The timing pulses are utilized at the selector circuit 1700 to supply an indication of the selected trunk identity through the circuit 1400, the circuit 600 and the control pairs 4CP1–2 to the line concentrator 200.

At the same time that the trunk identity is being supplied to the concentrator 200, the circuit 1400 outpulses the vertical group identity. As described above, the line information was supplied to the circuit 1400 from the frame control circuit 2100 after it was seized by the marker 2008. The vertical group outpulsing is concurrent with the trunk outpulsing as both utilize the same timing pulses from the pulse generator 900. To identify the selected trunk 4T0, one pulse is provided to the concentrator 200. If the selected trunk was trunk 4T1, two pulses would be provided to the concentrator 200, etc. For the vertical group 0 no pulses are provided to the concentrator 200 because it is set to identify the vertical group 0 when it is reset or normalized by the outpulsing control circuit 1400. If the vertical group was 1 one pulse would be provided, etc.

When both the trunk and vertical group outpulsing is completed, the outpulsing control circuit 1400 supplies the vertical file identity to the line concentrator 200. For the vertical file identity 0, five vertical file pulses are provided to the line concentrator 200. If the vertical file identity was 1, a single pulse would be provided; for a vertical file identity of 2, two pulses would be provided, etc. Five pulses are sent for vertical file 0 because the first vertical file pulse performs a dual function. In addition to being part of the vertical file signal, it also sets the line concentrator 200 for the reception of mark pulses. The control pair 4CP2 is utilized for both trunk and mark pulses which are both of the same polarity. The first vertical file pulse indicates to the concentrator 200 that trunk outpulsing is completed and that subsequent pulses of the same polarity as the trunk pulses through the control pair 4CP2 are mark pulses. With the selected trunk and line identities outpulsed to the concentrator 200, it is ready for cross-point closure by the central office mark pulses.

During the outpulsing sequence, as described above, the memory circuit 1100 is operated to register the outpulsed line and trunk identities. When the memory circuit 1100 registers the line and trunk identities it provides a memory check indication to the outpulsing control circuit 1400 which is enabled to supply the mark pulses to close the connection at the concentrator 200 between the line 2L00 and the selected trunk 4T0. The mark pulses are supplied through the circuit 600 and the control pair 4CP2 to operate the concentrator 200.

When the connection is established at the line concentrator 200 to the calling line 2L00, the scanning circuitry shown in the detail circuit drawings is disassociated from the line 2L00 so that a clear tip and ring connection is provided to the central office. At the same time a crosspoint closure indication is supplied from the concentrator 200 through the control pair 4CP1, the circuit 600 to the circuit 1400 to halt the supply of the mark pulses to the line concentrator 200. The crosspoint closure indication in combination with a crosspoint closure indication from the trunk switch 1000 causes the control circuit 1400 to initiate a reset sequence returning the central office and the concentrators 200–9 to normal. The concentrators 200–9 receive a series of reset pulses from the control circuit 1400 as soon as the crosspoint closure check is received therefrom. The central office is not, however, returned to normal until the crosspoint closure indication is also received from the trunk switch 1000.

As described above, during the time that the connection is being established in the concentrator 200, a connection is also being established in the trunk switch 1000 to the other end of the selected trunk 4T0. This sequence is also initiated by the marker 2008 when it seizes the frame control circuit 2100. The circuit 2100 supplies an indication of the horizontal group, vertical group and vertical file to the trunk switch 1000. When the trunk switch 1000 receives this information it provides an indication of which of the channels or connections to the trunk link frame 2000 are busy. This indication is supplied from the trunk switch 1000 to the line link connector 2010. If all the paths through the trunk switch 1000 are busy, the marker 2008 releases and initiates a reset sequence for returning the central office to normal. If paths or channels are available the marker 2008 selects one through the trunk switch 1000 and provides an operating potential through the connector 2010 to the trunk switch 1000 and through a trunk link connector 2011 to the trunk link frame 2000.

The trunk switch 1000 is inhibited until a memory check indication is provided from the circuit 1100. As described above, this indication is also supplied to the outpulsing control circuit 1400 before the mark pulses are supplied to the concentrator 200. If the memory check indication is not received at the trunk switch 1000 it does not operate and the marker 2008 times out and takes a trouble record. When the trunk switch 1000 operates to establish a connection from the trunk 4T0 through the switch 1000 and the trunk link frame 2000 to the originating register 2004, it provides a crosspoint closure indication to the outpulsing control circuit 1400. When the outpulsing control circuit 1400 receives the crosspoint closure indication from the trunk switch 1000 and also the crosspoint closure indication from the line concentrator 200, it initiates a reset sequence for releasing the selector 1700, the memory circuit 1100 and the register 800. The line concentrators 200–9 were returned to normal after the concentrator crosspoint closure indication was received at the circuit 1400. When the marker 2008 establishes the connection through the trunk switch 1000 to the register 2004, it releases and in turn releases the connectors 2010 and 2009 and the circuit 2100.

Service requests are not immediately recognized from the line concentrators 200–9 after scanning is resumed. Under control of the register 800, service requests are not recognized at any of the circuits 600–9 for a random interval in order to prevent one line in trouble to present a continuing demand which denies service to lines subsequent in the scanning cycle.

The sequence of operations for establishing a terminating connection responsive to a call to one of the subscriber lines 2L00, etc. is substantially the same as the sequence of operations for an originating call. The two main exceptions in the sequence involve making a line busy test in the memory circuit 1100 and providing the trunk overflow indication from the trunk switch 1000 to the marker 2008 in the event all trunks are busy.

A terminating call is initiated when the marker 2008 seizes the frame control circuit 2100 through the line link connector 2010. When the marker 2008 seizes the frame control circuit 2100, it supplies thereto the horizontal group and line identities of the called line and also an indication that the call is a terminating call. If the call, for example, is to line 2L00 of the concentrator 200, the horizontal group, vertical group and vertical file indications are all 0. When the circuit 2100 registers this information, it operates the concentrator control circuit 600 associated with the horizontal group 0 to halt the line scanning and to ready the central office for outpulsing the line and trunk identities to the concentrator 200. The sequence for outpulsing the line and trunk identities is exactly the same as for an originating call. The outpulsing control circuit 1400 is operated by the circuit 600 to initiate the trunk and vertical group outpulsing. If the line 2L00 is idle, the outpulsing sequence continues with the line and trunk information being supplied to the concentrator 200.

If, however, the called line 2L00 is busy the memory circuit 1100 disables the outpulsing control circuit 1400. When the frame control circuit 2100 is seized, it initiates a line busy test of the called line 2L00 in the memory circuit 1100. The memory circuit is checked and if the line 2L00 is busy, as indicated above, the circuit 1400 is inhibited.

When the memory circuit 1100 detects a line busy condition, it also provides an operating potential to the control circuit 2100 which provides a line busy indication through the trunk switch 1000 and the line link connector 2010 to the marker 2008. When the marker 2008 receives the line busy signal, it releases the frame control circuit 2100 and returns busy tone to the calling subscriber. When the frame control circuit 2100 releases, it operates the control circuit 1400 to initiate a release sequence for resetting the central office to normal and for resuming normal scanning. The line concentrator system is, in this manner, returned to normal if the called line 2L00 is busy.

After an originating connection is established from one of the lines 2L00, etc. to the register 2004, the called party is dialed and a callback call is established from the calling line through one of the trunks 2001 or 2003 to the called party. For example, after the subscriber at the station 2S00 has finished dialing, the marker 2008 is seized by the originating register 2004 to initiate a callback sequence for establishing a connection from the selected trunk 4T0 to the called subscriber. The normal scanning sequence is not interrupted during the callback call as the conection remains established at the concentrator 200 from the line 2L00 to the trunk 4T0. It is necessary that the same trunk 4T0 be utilized for the talking connection through the outgoing trunk 2003 as was utilized for the originating call. In order to establish the callback connection it is necessary, therefore, to identify the trunk that is utilized for the dial-tone connection.

When the marker 2008 is seized, it in turn seizes the frame control circuit 2100 through the line link connector 2010 and supplies to it the line and concentrator identities and also an indication that the call is for a callback. When the frame control circuit 2100 receives the line information, it supplies this information to the memory circuit 1100 and initiates a sequence therein for determining the identity of the trunk utilized for the originating connection. The memory circuit 1100 determines which one of the trunks was utilized and supplies an indication thereof to the trunk selector circuit 1700. At the same time that the memory circuit 1100 is operated, the frame control circuit 2100 initiates the operation of the selector circuit 1700 for registering the identity of the trunk utilized for the originating call. When the selector circuit 1700 registers the trunk identity it supplies an indication thereof to the trunk switch 1000 which functions to extend to the connection from the trunk to the trunk link frame 2000. The operating potential for the trunk switch 1000 is provided from the marker 2008 through the line link connector 2010. After the marker 2008 operates the trunk switch 1000 to complete a connection from the line 2L00 through trunk 4T0, the switch 1000 and the trunk link frame 2000 to the outgoing trunk 2003, the marker 2008 releases and in turn releases the frame control circuit 2100. When the circuit 2100 releases, it in turn releases the selector circuit 1700 and the read-out circuitry, not shown, of the memory circuit 1100.

The outpulsing circuit 1400 is not operated during the callback sequence as the identity of the trunk utilized for the originating call is determined at the memory circuit 1100. Moreover, as described above, line scanning is not halted.

After an originating or a terminating call to line 2L00 is completed, the subscriber at the station 2S00 hangs up to intimate a disconnect sequence for disconnecting the line 2L00 from the trunk to which it is connected. The disconnect sequence is initiated by the trunk switch 1000 which detects the disconnect request when the subscriber at the station 2S00 hangs up. The switch 1000 supplies an indication that a disconnect request has been initiated to the memory circuit 1100. If the memory circuit 1100 has a record of the connection, the combination of the request and the record in the memory circuit 1100 causes a disconnect operation of the frame control circuit 2100.

The memory circuit 1100 provides an indication to the control circuit 2100 of the identity of a line concentrator from which the disconnect request initiated. When the circuit 2100 receives the indication, it signals the marker 2008 through the line link connector 2010 that a disconnect sequence has been initiated.

The marker 2008 functions to block the service of originating or terminating calls thereafter initiated from or to any of the subscriber lines 2L00, etc. during the disconnect sequence. The circuit 2100 also establishes a preference for serving disconnect requests initiated at the same time from two or more of the line concentrators 200–9. After the circuit 2100 has determined which one of the concentrators to serve, it readies the outpulsing control circuit 1400 for an outpulsing sequence to the selected concentrator. The control circuit 2100 also provides a start potential to the selector circuit 1700 for determining the identity of the trunk which is to be disconnected. The trunk selector circuit 1700 consults the memory circuit 1100 and determining and registering the identity of the trunk to be disconnected. For example, suppose that the trunk to be disconnected is trunk 4T0 of the concentrator 200. During the trunk identification operation of the selector circuit 1700 the control circuit 600 is operated by the frame control circuit 2100 to initiate the outpulsing sequence. The circuit 600 readies outpulsing paths from the circuit 1400 to the line concentrator 200 and it halts normal scanning.

When the control circuit 1400 is operated by the circuit 600 and the trunk selection operation is completed at the circuit 1700, the outpulsing control circuit 1400 functions to supply ten vertical group pulses and the trunk identifying pulses to the line concentrator 200. With the trunk 4T0 to be disconnected, only a single trunk identifying pulse is provided to the line concentrator 200. Vertical file pulses are not outpulsed from the circuit 1400 to the concentrator 200. The trunk and vertical group outpulsing are started simultaneously so that the last trunk pulse does not arrive after the tenth vertical group pulse. The tenth vertical group pulse functions at the concentrator 200 as an indication that the outpulsing sequence is for disconnect instead of connect. The concentrator 200 has maintained an indication of the identity of the line to which the trunk 4T0 is connected because the crosspoints between the line 2L00 and the trunk 4T0 are still operated. After the trunk and vertical group outpulsing is completed the control circuit 1400 supplies a number of marke pulses which function at the concentrator 200 to disconnect the line 2L00 from the trunk 4T0. When the disconnect is completed a disconnect check pulse is returned to the circuit 1400 which initiates a release sequence for returning the circuits 1700, 600 and 1400 to normal.

When the control circuit 1400 receives the disconnect check pulse from the concentrator 200, it causes the memory circuit 1100 to erase the record of the connection established from the line 2L00 to the trunk 4T0. In this manner, the memory circuit is erased after the actual disconnect at the line concentrator 200. When the memory circuit 1100 erases the registration, it provides an indication that the information has been removed to the frame control circuit 2100 which releases and provides an indication of its release to the marker 2008.

No-test calls provide direct access to the subscriber lines 2L00, etc., whether they are idle or busy for testing or for operator verification. A no-test to an idle line is completed in exactly the same manner as for a terminating call. A no-test call to a busy line is completed as if it is a terminating call up to the point where the busy indication is detected. In the line concentrator system, no-test calls are completed through a no-test connector 2014, the trunk switch 1000 and the trunk 4T9 associated with the line concentrator to which the no-test call is made. If the trunk 4T9, which is always the least preferred trunk, is busy, the no-test call is routed by the marker 2008 to an overflow trunk, not shown.

Support, for example, that a no-test call is made to the line 2L00 of the concentrator 200 and that the line 2L00 is busy. The marker 2008 seizes the frame control circuit 2100 and supplies to it the line information. The circuit 2100 initiates the operation of the memory circuit 1100 to make a line busy test of the line 2L00. The memory circuit 1100 detects that the line 2L00 is busy and it inhibits the operation of the outpulsing control circuit 1400. If the circuit 1400 is not inhibited it proceeds to outpulse the line information and also the identity of a selected trunk as provided thereto from the selector circuit 1700. The memory circuit 1100 also returns an indication through the frame control circuit 2100, the trunk switch 1000 and the connector 2010 to the marker 2008 that the line 2L00 is busy.

When the marker 2008 receives the line busy indication and a no-test connection through the connector 2014 is available, it operates the switch 1000 to extend a connection to the connector 2014. The marker 2008 determines whether a no-test connection is available by checking the memory circuit 1100 to determine if trunk 4T9 of the concentrator 200 is busy. If the trunk 4T9 is busy, an indication thereof is provided through the trunk switch 1000 to the marker 2008 which thereupon releases and releases the frame control circuit 2100, etc. If trunk 4T9 is idle, the marker 2008 initiates a sequence for determining the identity of the trunk to which line 2L00 is busy. The sequence is initiated by the frame control circuit 2100 which operates the memory circuit 1100 to supply an indication of the busy trunk to the selector circuit 1700. The selector circuit 1700 registers an indication of the busy trunk. Assume, for example, that the trunk, which is connected to the line 2L00 when the no-test call thereto is initiated, is trunk 4T0.

After the selector circuit 1700 registers the identity of trunk 4T0, it supplies an indication thereof to the trunk switch 1000. After the marker initiates the operation of the memory circuit 1100 and the selector circuit 1700, it tests the switch 1000 for the identity of the channel through which the line 2L00 is connected. With the identity of the trunk 4T0 at the trunk switch 1000, the marker 2008 can identify the channel to which the trunk 4T0 is connected. When the marker 2008 identifies the busy channel it disconnects the trunk 4T9 at the switch 1000 and establishes a connection from its terminals, not shown in Fig. 1, in the trunk switch 1000 to the no-test connector 2014. In the trunk switch 1000, the terminals of the trunk 4T9 are now connected to the busy channel. In other words, the connection from line 2L00 through trunk 4T0 and the trunk switch 1000 remains established and an additional connection is made to the established connection through the trunk switch 1000. The additional connection is made from the busy channel in the trunk switch 1000 to the no-test connector 2014 utilizing a portion of the switch 1000 which is associated with trunk 4T9. The additional connection to the no-test connector 2014 is held under control of the connector 2014 whereas the original connection through trunk 4T0 is held under control of the trunk link frame 2000.

The connector 2014 supplies an indication to the marker 2008 that the no-test connection is established. The marker 2008 thereupon releases and in turn releases the frame control circuit 2100 which initiates a release sequence for returning the circuits 1700, 1400, 1100 and the trunk switch 1000 to normal except for the talking connection to the line 2L00 and a no-test connection to the connector 2014.

DETAIL CIRCUIT DESCRIPTION

Figure 6:
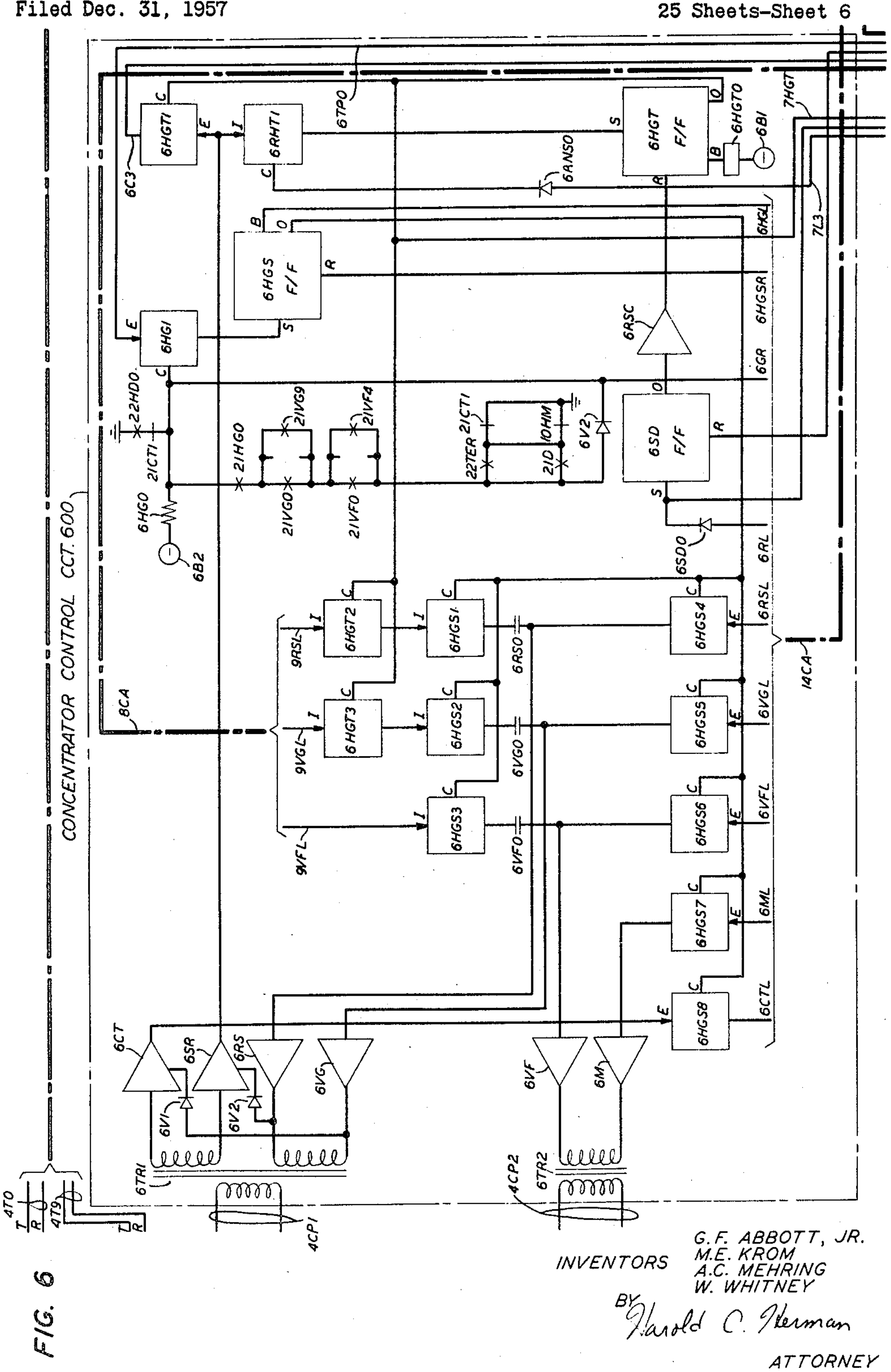
Figure 7:
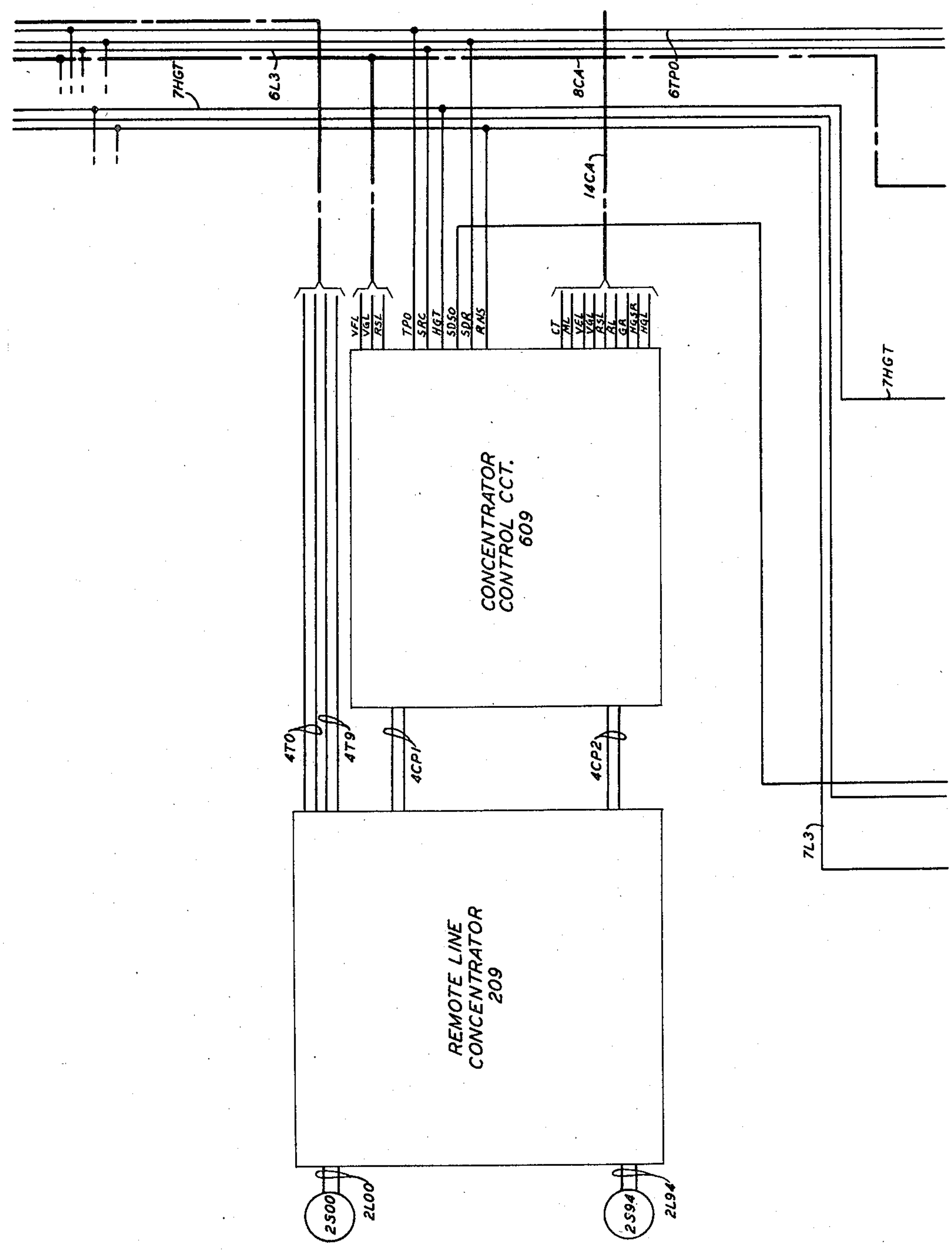
Figure 8:
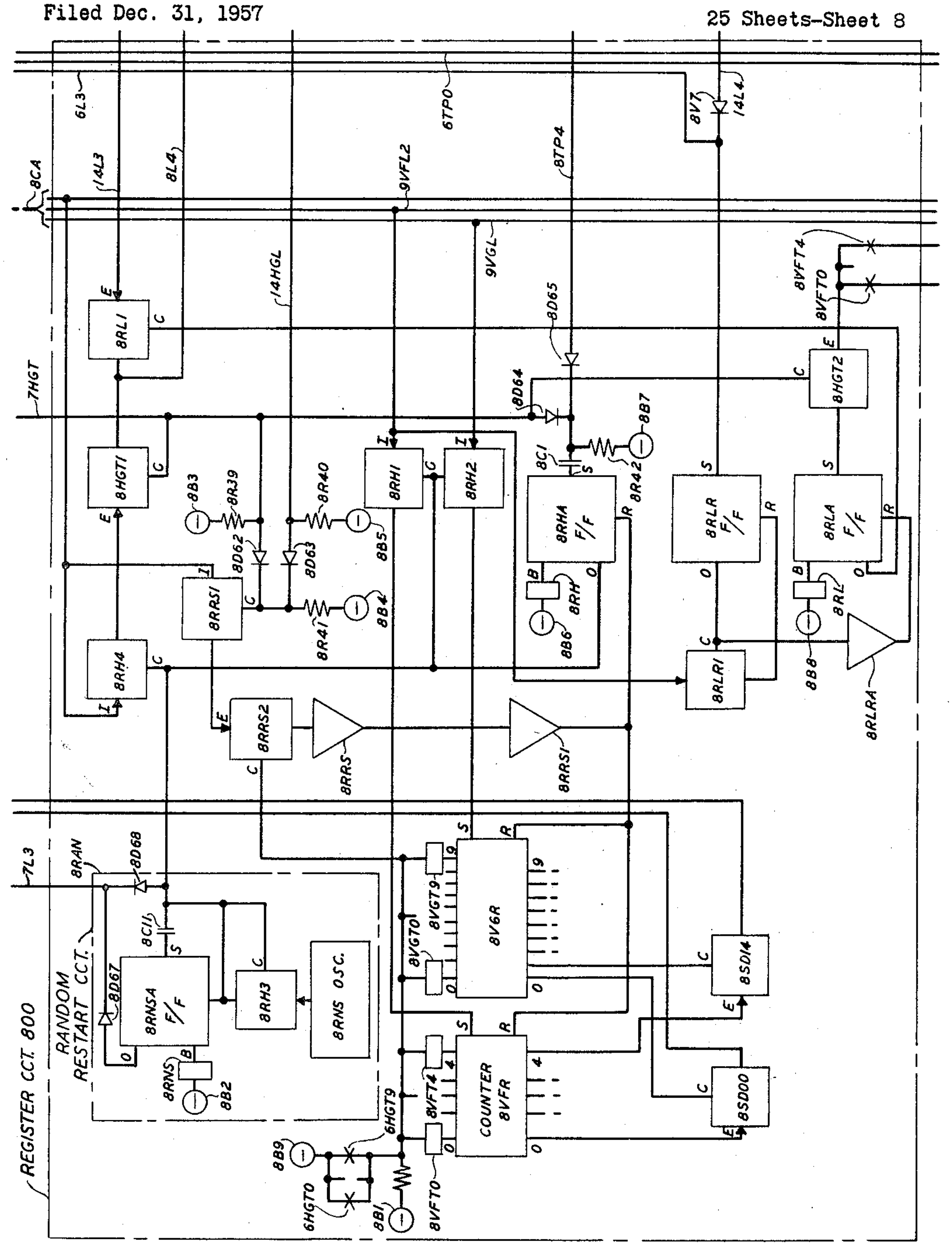

In the detail circuit drawing shown in Figs. 2 through 22, when arranged in accordance with Fig. 23, the relay contacts are shown detached from the relay windings. The first digit of each reference number indicates the figure in the detail circuit drawings in which the relay or component appears and the letters indicate the function thereof. Relay 6HGT0, for example, is the horizontal group relay 0 and appears in Fig. 6. The designation of the contact of a relay is generally the same as that of the relay even though it appears in a different figure. Contacts which are closed when the relay is deenergized are represented by a single short line perpendicular to the lines representing the connecting conductors, while contacts which are closed when the relay is operated are represented by an X crossing the connecting conductors. Contact 10HM in Fig. 6, for example, is a contact which is closed when the relay 10HM is deenergized and contact 21D in Fig. 6 is a contact which is closed when the relay 21D is operated. The contacts are shown detached from the relay windings in order for each functional circuit path to be shown and described in the simplest feasible manner.

*Normal scanning*

The line concentrator 200, shown in Figs. 2 through 5, is located at a remote location from a central office shown in Figs. 6 through 22. As described above, ten line concentrators 200–9 are connected to the central office equipment. Only the line concentrator 200 is shown in detail with the concentrator 209 being shown as a box in Fig. 7. Each of the concentrators 200–9 provides for connections from fifty subscriber lines to the central office. The line concentrator 200 provides for connections from the fifty subscriber stations 2S00, etc. of which only the substations 2S00 and 2S94 are shown.

The designation of the substation is by vertical group and vertical file. The first of the last two digits indicates the vertical group identity and the last digit indicates the vertical file identity. The substation 2S94 therefore has a vertical group of nine and a vertical file of four. There are only fifty substations connected to each of the concentrators 200–9.

The effect of utilizing the line concentrators 200–9 is to place a part of the switching equipment of the central office at a distance therefrom in order to conserve outside plant facilities. Each of the line concentrators 200–9 is connected to the central office by ten trunks 4T0–9 and two control pairs 4CP1–2. The trunks 4T0–9 provide talking paths between the line concentrators 200–9 and the central office, and the two control pairs 4CP1–2 provide for signaling paths to and from the central office equipment. With fifty subscriber lines, such as line 2L00, connected to each of the ten line concentrators 200–9, there are a total of 500 subscriber lines which are served by the central office equipment shown in Figs. 6 through 22. With all 500 subscriber lines idle the central office continuously and synchronously scans the ten groups of fifty subscriber lines respectively connected to the ten concentrators 200–9.

The ten line concentrators 200–9 are synchronously operated under control of a pulse generator 900 which simultaneously provides scanning pulses though ten concentrator control circuits 600–9 and the ten sets of control pairs 4CP1–2 to the ten line concentrators 200–9. Only one, the concentrator control circuit 600, which is shown in Fig. 6, is illustrated in detail, and the concentrator control circuit 609 is shown as a box in Fig. 7. The pulse generator 900 also supplies the scanning pulses to a register 800 which is synchronously operated with the line concentrators 200–9. The concentrator control circuits 600–9 are individually associated with the concentrators 200–9, and the pulse generator 900 and the register 800 are common control equipment for all ten concentrators 200–9. The ten line concentrators 200–9 and the register 800 are synchronously and cyclically operated under control of the pulses from the generator 900.

The pulse generator 900 supplies four types of pulses: vertical group pulses, vertical file pulses, reset pulses and two types of timing pulses. These pulses are illustrated in the pulse sequence diagram shown in Fig. 28. As in ordinary crossbar telephone systems the subscriber lines are arbitrarily arranged in groups designated vertical groups, vertical files and horizontal groups. All the subscriber lines connected to one of the ten concentrators 200–9 are in the same horizontal group, and each horizontal group is subdivided into ten vertical groups, each of which includes five vertical files. The vertical group pulses supplied by the generator 900 select a group of five lines connected to each of the concentrators 200–9. The vertical group pulse is supplied simultaneously to the ten line concentrators 200–9 so that five times ten or fifty subscriber lines are selected. Between two such vertical group pulses the pulse generator 900 supplies five vertical file pulses to the concentrators 200–9 to select one subscriber line connected to each of the concentrators or ten in all. In order to scan the 500 lines the pulse generator 900 provides to each of the ten line concentrators 200–9 and to the register 800, ten vertical group pulses spaced at intervals of 24 milliseconds and five vertical file pulses spaced at intervals of 4 milliseconds between each pair of vertical group pulses. The complete scanning cycle has a duration of 240 milliseconds.

In addition to the vertical group and vertical file pulses the generator 900 supplies one reset pulse at the beginning of each cycle to insure the synchronous operation of the line concentrators 200–9 and the register 800 with the generator 900. Each reset pulse, as is hereinafter described, also functions as the first vertical group pulse so that only nine vertical group pulses are provided instead of ten for each cycle.

To briefly recapitulate, during each scanning cycle the pulse generator 900 supplies one reset pulse, nine vertical group pulses and fifty vertical file pulses. The pulse generator 900 also provides timing pulses at a rate of 500 and 250 pulses per second which are utilized, as hereinafter described, when a call to or from one of the 500 subscriber lines is being served. The pulse generator 500 provides pulses at rates of 500 pulses per second and 250 pulses per second. The 250 pulses per second are utilized for line scanning, the 500 pulses per second are utilized for outpulsing, and the 1000 pulses per second are utilized for other control purposes. Line scanning is at a relatively low frequency of 250 pulses per second because of the propagation time of the signal through the sets of concentrator control pairs 4CP1–2 that connect the remote concentrators 200–9 with the central office. The sequences of pulses are such that when a vertical file pulse is sent from the central office the line is scanned and if the receiver is off-hook, a service request must be received back at the central office before the succeeding vertical file pulse is transmitted. This limitation establishes a maximum of 250 pulses per second for the scanning frequency. This limitation, however, does not exist during the outpulsing operation so that a speed of 500 pulses per second may be utilized to prevent increasing marker holding time.

Figure 28:
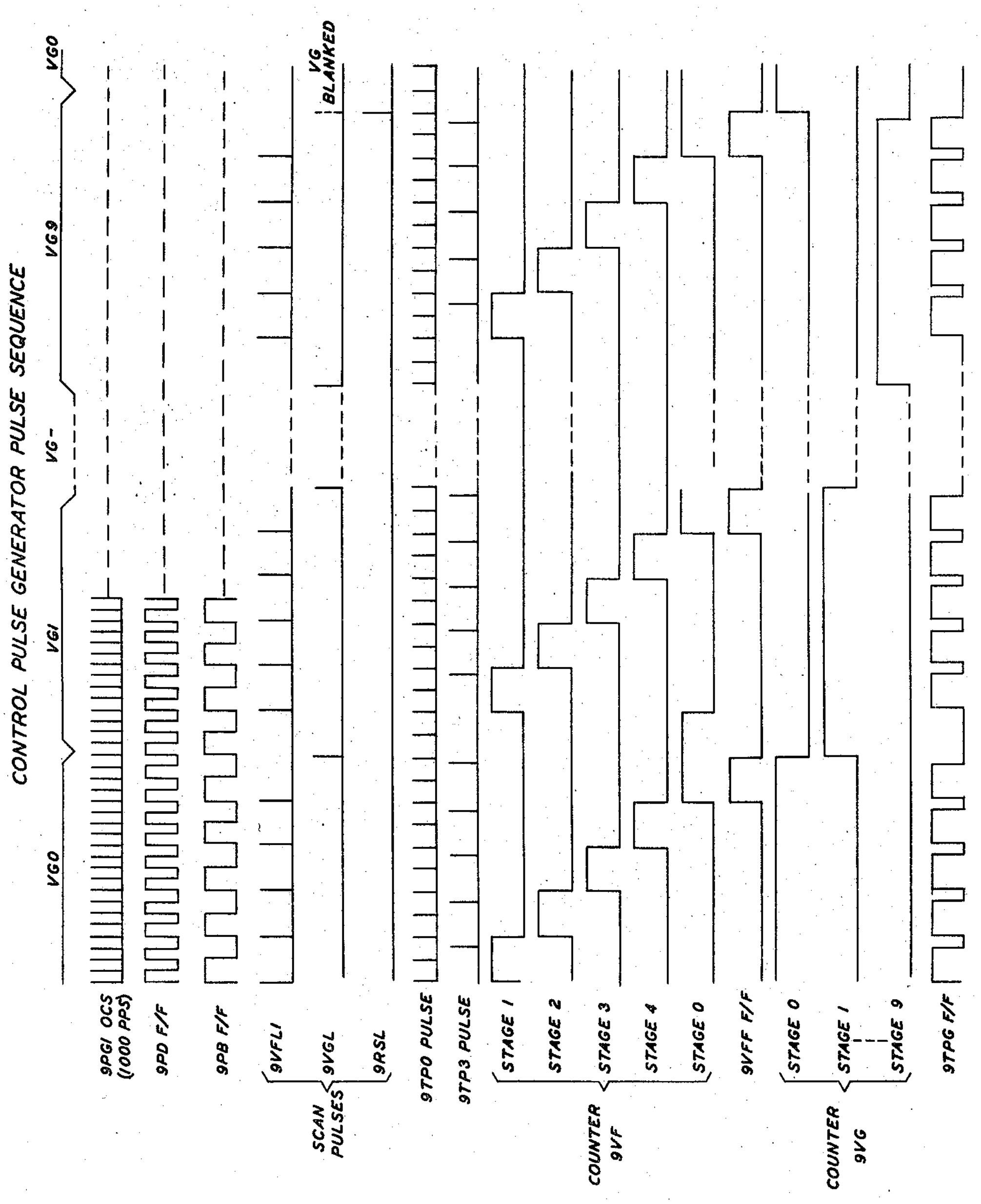
Fig. 28 is a series of curves illustrating the operation of the various components in the pulse generating circuit.

In the control pulse generator 900, an oscillator 9PG1 is the primary source of pulses. The oscillator 9PG1 generates a continuous train of positive square wave pulses at a nominal rate of 100 pulses per second with each pulse being 18 volts in magnitude and 30 microseconds in duration. These pulses are illustrated in Fig. 28 which illustrates the scanning sequence and the pulsing operation of various components in the pulse generator 900. The 18-volt positive pulses are provided from the oscillator 9PD1 to two enabling gates 9PD2 and 9TPG1 and to an inhibiting gate 9PD1. An enabling gate is a three-terminal device which normally inhibits the passage of positive pulses from its input terminal E to its output terminal but which is enabled to allow their passage when a positive control potential is provided to the third or control lead C. An inhibiting gate is a three-terminal device which normally permits the passage of positive pulses from its input terminal I to its output terminal but which inhibits their passage when a positive control potential is provided to its control terminal C. The designations E and I of the input terminals serve to identify the type of gate in the drawing. The component circuits utilized in the illustrative embodiment of the line concentrator system, including inhibiting gates, enabling gates, And gates, Or gates, flip-flop circuits, amplifiers, ring counters, etc., are known, and circuits of this type are disclosed in the above-identified patent to Joel-Krom-Posin.

Assuming that all the circuits in the pulse generator 900 are normal, the first pulse from the oscillator 9PG1 passes through the inhibiting gate 9PD1 and a capacitor 9C3 to the set terminal S of a flip-flop circuit 9PD. The flip-flop circuit 9PD is a three-terminal device having two stable conditions "on" and "off" or "set" and "reset." In the off or reset condition the output terminal O is at a potential of minus 24 volts, and in the off or set condition the output terminal O is at a potential of minus 8 volts. The change from either state to the other is practically instantaneous. A positive pulse to the set terminal S causes the circuit 9PD to change from its off to its on condition and a positive pulse to the reset terminal R causes it to change back to its off condition. Some of the flip-flop circuits shown in Figs. 2–22, such as circuit 6HGT, have two output terminals O and B. The two terminals O and B are isolated outputs from the flip-flop circuit with the terminal B generally being utilized to operate a relay and the terminal O generally being utilized to control gates. Some of the flip-flop circuits, such as circuit 3TR0, also have two reset terminals R and CR instead of a single reset terminal R. The two terminals R and CR are isolated internally in the flip-flop circuit and an input to either functions to reset the circuit if it is set.

The first pulse from the oscillator 9PG1 sets or turns on the flip-flop circuit 9PD. When the circuit 9PD is set, it provides a control potential to the control terminals C of the gates 9PD1 and 9PD2 to reverse their conditions, it provides a set pulse through an inhibiting gate 9PB1 and a capacitor 9C4 to the set terminal S of a flip-flop circuit 9PB, and it provides a pulse through the varistor 9V1 and an amplifier 9TPA to the lead 9TP0. The circuit 9PD effectively halves the number of pulses from the oscillator 9PG1 so that the pulses appearing on lead 9TP0 are at a rate of 500 pulses per second. The 500 pulses per second are provided through lead 9TP0 to the trunk selector circuit 1700 where they are utilized during the trunk selection sequence of operations, which is hereinafter described.

When the flip-flop circuit 9PB is set, it provides a control potential to the terminals C of inhibiting gates 9PB1 and 9PB2 and enabling gate 9PB3 reversing their conditions, and it provides a pulse through an inhibiting gate 9VFF1 to a vertical file amplifier 9VFA. The amplifier 9VFA provides the amplified pulse to the input terminal S of a ring counter 9VF, through the diode 9TPV to the set terminal S of a flip-flop circuit 9TPG, through a lead 9VFL1 to the outpulsing control circuit 1400 and through a lead 9VFL2 to the register circuit 800 and the circuits 600–9. The vertical file pulse on lead 9VFL2 is one of the scanning pulses utilized to determine the service conditions of the lines 2L00, etc.

After the first pulse from the oscillator 9PG1, both of the circuits 9PD and 9PB are in a set condition. The next or second pulse from the oscillator 9PG1 is provided through the enabling gate 9PD2 to the reset terminal R of the flip-flop circuit 9PD. As indicated above, a positive pulse at the terminal R resets the circuit 9PD. When the circuit 9PD is reset, it removes the control potential from the gates 9PD1 and 9PD2 enabling gate 9PD1 and disabling gate 9PD2. The flip-flop circuit 9PB remains set so that after the second pulse from the oscillator 9PG1, the circuit 9PD is reset and the circuit 9PB is set.

The third pulse from the oscillator 9PG1 functions to set the flip-flop circuit 9PD as the gate 9PD1 is enabled. When the circuit 9PD is set for the second time, it provides a pulse through the enabling gate 9PD3 to the reset terminal R of the flip-flop circuit 9PB. When the circuit 9PB is reset it enables a path through the gate 9PB1 to its input terminal S.

The fourth pulse resets the circuit 9PD, and the fifth pulse commences the cycle or sequence of operations again by setting both circuits 9PD and 9PB. It is evident therefore that the circuit 9PD is set every 2 milliseconds or at every second pulse from the oscillator 9PG1 and the circuit 9PB is set every 4 milliseconds or at every fourth pulse from the oscillator 9PG1.

Figure 9:
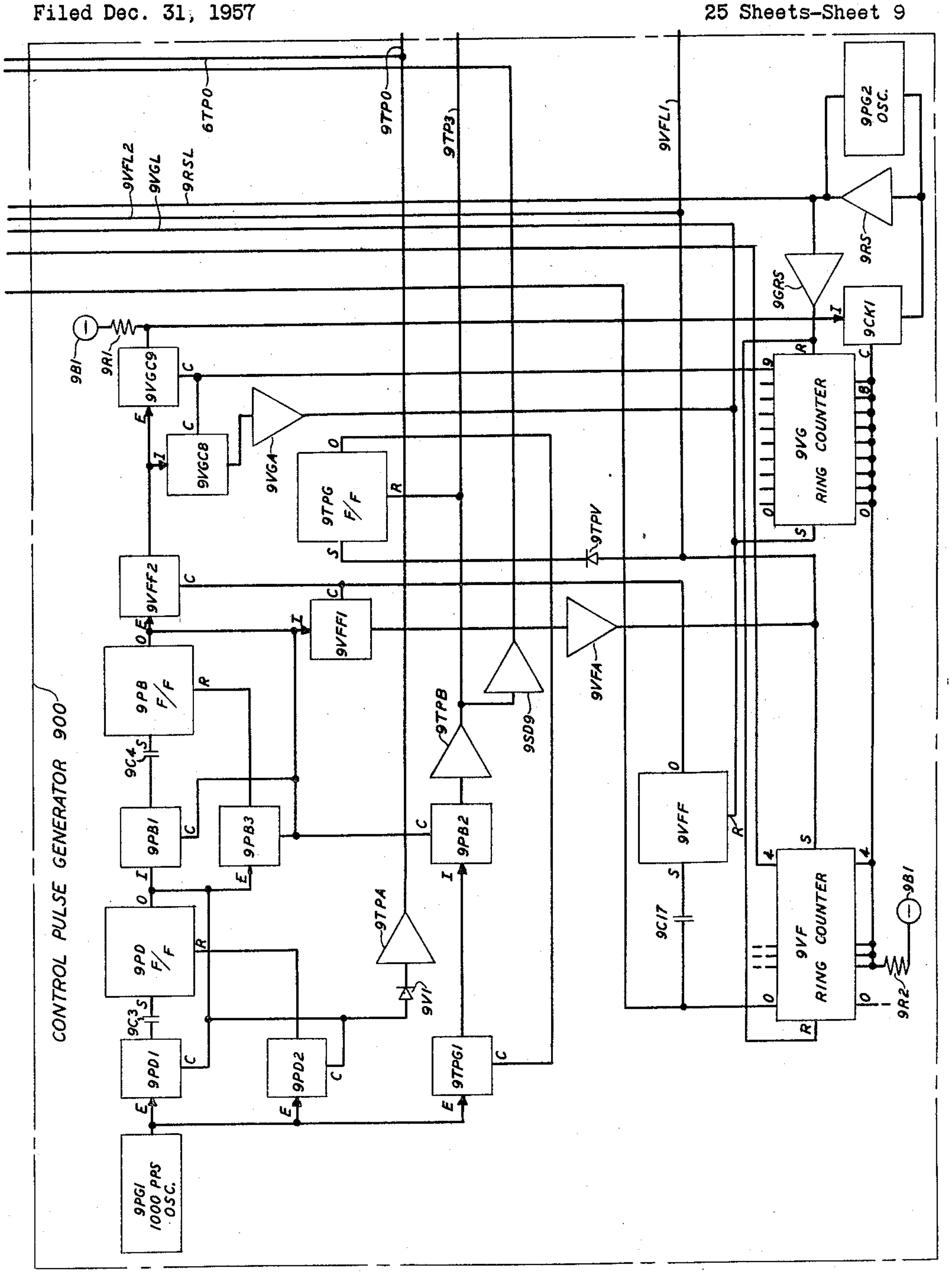

As described above, when the circuit 9PB is set it provides a positive pulse to the five-stage ring counter 9VF. A ring counter is a walking circuit or a sequence circuit which advances one step for every input supplied thereto. The pulses supplied from the amplifier 9VFA to the input terminal S of the ring counter 9VF functions to step it from one stage to the next. Assuming that the five-stage ring counter 9VF is set at its stage 0, the first pulse from the amplifier 9VFA steps it to its stage 1. As indicated in Fig. 9 the ring counter 9VF has two output terminals 0, two output terminals 1, etc. These two outputs are outputs from the same stage with the potential conditions thereon being the same but are shown separately to indicate that they are isolated outputs. The five-stage ring counter 9VF advances in this manner one step for every pulse from the amplifier 9VFA until the stage 0 is set. At the fifth vertical file pulse, when the stage 0 is set, the counter 9VFA provides a positive output pulse through the capacitor 9C17 to the input terminal S of the flip-flop circuit 9VFF. When the flip-flop circuit 9VFF is set, it disables the inhibiting gate 9VFF1 to block the path from the flip-flop circuit 9PB to the ring counter 9VF and it enables a gate 9VFF2 to ready a path for a vertical group pulse. The next pulse from the circuit 9PB is provided through the enable gate 9VFF2, the normal inhibiting gate 9VGC8 to the amplifier 9VGA instead of through the gate 9VFF1 to the amplifier 9VFA. The output pulse from the amplifier 9VGA is provided to the input terminal S of a ten-stage ring counter 9VG, to the reset terminal R of the circuit 9VFF and through a lead 9VGL to the register 800 and the concentrator control circuits 600–9. The first vertical group pulse steps the counter 9VG from stage 0 to stage 1 assuming that it was originally set at stage 0.

When the circuit 9VFF is reset, it disables the gate 9VFF2 to block the path for the vertical group pulse and it reestablishes the path for the vertical file pulses by enabling the gate 9VFF1. The sequence continues in this manner with the next five pulses from the circuit 9PB passing through the gate 9VFF1 and the amplifier 9VFA to step the ring counter 9VFF. Every time the counter 9VF is stepped from stage 4 to stage 0 it sets the circuit 9VFF to enable the vertical group pulse path and disable the vertical file pulse path. Each vertical group pulse, in addition to stepping the counter 9VG, functions also to reset the circuit 9VFF.

The counter 9VF is cyclically operated until fifty vertical file pulses have been received thereat. When the counter 9VG advances to its stage 9 and subsequently the counter 9VF advances to its stage 0 a reset path is readied for resetting the counter 9VG and for providing a reset pulse to the register 800 and to the control circuits 600–9. With the counter 9VG set at stage 9 the fiftieth vertical file pulse is provided through lead 9VFL2 at the same time that the counter 9VF is stepped from stage 4 to stage 0. The output terminals 1–4 of the ring counter 9VF are multipled to the output terminals 0–8 of the ring counter 9VG and to the control terminal C of an inhibiting gate 9CK1. The control terminal C of the gate 9CK1 is at a positive inhibiting potential as long as any one of the stages 1–4 of the counter 9VF or any one of the stages 0–8 of the counter 9VG is set. If all of these stages are reset, that is if the counter 9VF is set at stage 0 and the counter 9VG is set at stage 9, the control terminal C of the gate 9CK1 is at a negative potential due to its connection through the resistor 9R2 to the negative potential source 9B2. The gate 9CK1 is therefore enabled to allow the passage of a pulse when the counter 9VF is set at stage 0 and the counter 9VG is set at stage 9.

When the counter 9VG is set at stage 9, it also provides a control potential to the control terminals C of the gates 9VGC8 and 9VGC9 reversing their conductive conditions. The next puse from the flip-flop circuit 9PB is therefore routed through the gate 9VFF2 (enabled by the set circuit 9VFF), the gate 9VGC9 (enabled by stage 9 of the counter 9VG), the gate 9CK1 (controlled by the counters 9VF and 9VG) to the amplifier 9RS. The input terminal I of the gate 9CK1 is normally at a negative potential due to its connection through the resistor 9R1 to the negative potential source 9B1.

The amplified reset pulse from the amplifier 9RS is provided through the amplifier 9GRS to the reset terminals R of the counters 9VF and 9VG, to the synchronizing input terminal of an oscillator 9PG2 and through the lead 9RSL to the register 800 and the control circuits 600–9. Normally the counter 9VF is already set at its stage 0 so that the reset pulse performs no function thereat. If the counter 9VF is not set at its stage 0 the reset pulse functions to set it thereat. The reset pulse also functions to step the counter 9VG from its stage 9 to its stage 0.

When the counter 9VG steps to stage 0, it disables the gates 9CK1 and 9VGC9 to open the reset path, and it enables the gate 9VGC8 to ready the vertical group path. The next pulse from the circuit 9PB is provided to the amplifier 9VFA.

When the counter 9VG is stepped from its stage 9 to its stage 0 by the reset pulse, a vertical group pulse does not appear on lead 9VGL. The vertical group pulse is blocked at the gate 9VGC8. In effect the first vertical group pulse is blanked and the reset pulse is provided instead. As is hereinafter described, the reset pulse functions as a vertical group pulse at the register 800 and at the line concentrators 200–9.

One stage of the counter 9VF and one stage of the counter 9VG must be set at all times for the proper operation of the generator 900. Since it is necessary that the counters 9VF and 9VG be functioning properly in order to provide the reset pulse through the gate 9CK1, a pulse from an outside source is required to start the generator 900 initially or in the event of trouble operation. This start or trouble pulse is supplied from the free-running oscillator 9PG2 in the event reset pulses are not received thereat. The oscillator 9PG2 has an operating cycle somewhat greater than the complete scan cycle of 200 milliseconds. The output of the oscillator 9PG2 is connected to the input lead of the reset amplifier 9RS causing it to reset the counters 9VF and 9VG. The pulse from the oscillator 9PG2 is normally synchronized with the reset pulse so that it cannot introduce random reset pulses. In the event a reset pulse is not provided to the oscillator for more than 200 milliseconds, it functions to provide a reset pulse.

In addition to the vertical file, vertical group and reset pulses provided from the generator 900, pulses are also supplied on the leads 9TP0 and 9TP3 by the generator 900. The pulses supplied on the lead 9TP0 are obtained, as described above, from the amplifier 9TPA which is driven by the flip-flop circuit or pulse divider 9PD. The pulses on lead 9TP0 are therefore at a rate of 500 pulses per second.

The puses on lead 9TP3 are supplied at a rate of 250 pulses per second, the same rate as the vertical file pulses. The pulses appearing on lead 9TP3, however, are delayed or spaced 3 milliseconds after the vertical file pulses. Each vertical file pulse from the amplifier 9VFA is provided, as indicated above, through the varistor 9TPV to set the flip-flop circuit 9TPG. When the circuit 9TPG is set, it enables a gate 9TPG1 to ready a path from the oscillator 9PG1 to lead 9TP3. The path, however, is not completed until after an inhibiting control potential is removed from the control terminal C of an inhibiting gate 9PB2. The control terminal C of the gate 9PG2 is connected to the output terminal O of the flip-flop circuit 9PB. As indicated in Fig. 28, the circuit 9PB is reset 2 milliseconds after each vertical file pulse appearing on lead 9VFL1. When the third pulse is supplied from the oscillator 9PG1, the circuit 9PB is reset so that the gate 9PB2 is enabled to allow the passage of the pulse to the lead 9TP3. In this manner, 3 milliseconds after each vertical file pulse, a pulse is provided on lead 9TP3.

The generator 900 is not stopped during the operating sequence of the line concentrator system of the present invention but continuously and cyclically generates the fifty vertical file pulses, the nine vertical group pulses, the reset pulse, the fifty timing pulses on lead 9TP3 and 120 timing pulses on lead 9TP0. The total scanning cycle has a duration of 240 milliseconds. The vertical file pulses for each group are spaced at intervals of 4 milliseconds and the vertical group pulses during each cycle are spaced at intervals of 24 milliseconds.

The scanning pulses, which consist of the vertical file, vertical group and reset pulses, are supplied to the register 800 and through the concentrator control circuits 600–9 to the ten line concentrators 200–9. During the normal scanning sequence the concentrators 200–9 and the register 800 are cyclically operated under control of the control pulse generator 900. The timing pulses through lead 9TP0 are provided to the outpulsing control circuit 1400, to the memory circuit 1100 and to the trunk selector circuit 1700. The pulses on lead 9TP3 are provided to the memory circuit 1100 and to the outpulsing control circuit 1400.

As described above, the scanning pulses are supplied from the pulse generator 900 to the register circuit 800. The register circuit 800 includes two ring counters 8VFR and 8VGR which are similar to the counters 9VF and 9VG in the pulse generator 900. When the central office is not serving a call, the pulse generator 900 drives the call register 800 in synchronism therewith by supplying the vertical file, vertical group and reset pulses to the counters 8VFR and 8VGR. The vertical file pulses are supplied through the lead 9VFL2 and an inhibiting gate 8RH1 to the input terminal S of the counter 8VFR. The vertical group pulses are supplied through the lead 9VGL and an inhibiting gate 8RH2 to the input terminal S of the counter 8VGR, and the reset pulses are supplied through lead 9RSL, the inhibiting gate 8RRS1, the enabling gate 8RRS2 and the amplifiers 8RRS and 8RS1 to the reset terminals R of the counters 8VFR and 8VGR. As is hereinafter described, the three gates 8RH1, 8RH2 and 8RRS1 are inhibited or disabled when a service request is received from any one of the ten line concentrators 200–9 to block the reception of the vertical file, vertical group and reset pulses at the counters 9VFR and 9VGR. The counters 9VFR and 9VGR are in this manner stopped when a service request is received from the line concentrators 200–9.

The vertical file, vertical group and reset pulses are provided to the register 800 and also through the ten control circuits 600–9 to the concentrators 200–9. Only the control circuit 600 of the ten circuits 600–9 is shown in detail. The leads 9VFL2, 9VGL and 9RSL are multipled through a cable 8CA to each of the ten control circuits 600–9. In the circuit 600 the vertical file pulses through lead 9VFL2 are provided through an inhibiting gate 6HGS3, a capacitor 6VF0, an amplifier 6VF, a transformer 6TR2 and the control pair 4CP2 to the line concentrator 200. The vertical group pulses through lead 9VGL are provided through inhibiting gates 6HGT3 and 6HGS2, a capacitor 6VG0, an amplifier 6VG, a transformer 6TR1 and the control pair 4CP1 to the line concentrator 200. The output of the amplifier 6VG is also provided through the varistor 6V1 to a control terminal of a receiving amplifier 6CT to prevent the reflection of pulses through the transformer 6TR1. The amplifier 6CT and another amplifier 6SR are blocking amplifiers which are inhibited when a control potential is provided thereto. The reset pulses through lead 9RSL are provided through inhibiting gates 6HGT2 and 6HGS1, a capacitor 6RS0, an amplifier 6RS, the transformer 6TR1 and the control pair 4CP1 to the concentrator 200. The output of the amplifier 6RS is also provided through a varistor 6V2 to the control terminal of the blocking amplifier 6SR.

In this manner during the normal scanning sequence, the pulse generator 900 continuously and cyclically provides vertical group, vertical file and reset pulses to the register 800 and also to each of the ten line concentrators 200–9. The register 800 includes two counters 8VFR and 8VGR and, as hereinafter described, each of the line concentrators 200–9 includes similar counters 4VF and 4VG which are cyclically and synchronously operated together with the counters 8VFR and 8VGR under control of the pulse generator 900. The vertical file pulses through the control pair 4CP2 are coupled in the concentrator 200 through a transformer 4TR2 and an amplifier 4VFR, to the input terminal S of the five-stage ring counter 4VF. The vertical group pulses through the control pair 4CP1 are coupled through a transformer 4TR1 and a receiving amplifier 4VGR to the input terminal S of the eleven-stage counter 4VG. The function of the eleventh-stage VGD is hereinafter described. The reset pulses through the control pair 4CP1 are coupled through the transformer 4T1, a receiving amplifier 4RSR, varistors 4V3–4 to the reset terminals R of the counters 4VF and 4VG. The reset pulses are also respectively provided from the amplifier 4RSR through varistors 5V1–2 and amplifiers 5DR and 5MR to the reset terminals R of flip-flop circuits 5DA and 5MA.

During the scanning sequence after the counter 4VG steps to stage 9, the reset pulse functions to reset it to stage 0. The stage VGD is not utilized during the scanning sequence.

The counters 4VF and 4VG are driven by the scanning pulses from the central office to cyclically scan the fifty lines 2L00, etc. When an output or step potential is provided on one of the leads 0–9 of the group counter 4VG, it operates an associated one of ten transistors 2G0–9 located respectively in ten similar scanning units 2SC0–9. The scanning units 2SC0–9 are in a transistor line scanner 220 which is driven by the counters 4VF and 4VG to determine the service conditions of the fifty subscriber lines 2L00, etc. The line scanner 220 is of the type described in detail in the copending patent application Serial No. 706,474 filed by G. F. Abbott, Jr. on even date herewith. The ten output terminals 0–9 of the group counter 4VG are connected respectively to the ten units 2LSG0–9 in the scanner 220.

Referring to the unit 2LSG0 which is shown in detail, the transistor 2G0 is an NPN junction transistor having its base electrode connected through a base resistor 221 to the terminal 0 of the counter 4VG, its emitter electrode connected to a voltage regulator 2VR and its collector electrode connected through a resistor 222 and a varistor 225 to the emitter electrodes of five junction transistors 2Q00–04. The junctions between the resistor 222 and the varistor 225 is connected through a resistor 223 and also through a capacitor 224 to ground. Each of the group transistors 2G0–9 is multipled to five gate transistors 2Q00–04. In all there are fifty gate transistors which are associated individually with the fifty lines 2L00, etc., with lines 2L00–04 and their associated transistors 2Q00–04 being in vertical group 0.

As described above, the emitter electrodes of the ten transistors 2G0–9 are multipled to the voltage regulator 2VR. The voltage regulator 20 is a low impedance source of reference voltage which is utilized for regulating the sensitivity of the transistor gates including, respectively, the ten sets of NPN junction transistors 2Q00–04. The more negative the potential supplied by the regulator 2VR, which is adjustable, the more sensitive are the transistors 2Q00–04 to potential changes across the lines 2L00, etc.

Assume by way of example that the potential provided by the voltage regulator 2VR is minus 18 volts. The emitter electrodes of the transistors 2G0–9 are therefore at the minus 18-volt regulator potential. The base-to-emitter junction of only one of the transistors 2G0–9 is forward biased at any time since the normal potential at the leads 0–9 of the ring counter 4VR is minus 24 volts. The step potential cyclically provided at the output terminals 0–9 is minus 8 volts so that the transistors 2G0–9 are successively saturated. When a step potential is provided at terminal 0 of the counter 4VG, the transistor 2G0 becomes conductive. The impedance between the collector electrode and the emitter electrode of the transistors 2G0–9 is high when the associated stage of the ring counter 4VG is off and is essentially a short circuit when the associated stage is on. The current path through the collector and emitter electrodes of the transistor 2G0 is from ground through the resistors 223 and 222 and the collector and emitter electrodes of the transistor 2G0 to the regulator 2VR. When the transistor 2G0 is saturated, the potential supplied to the transistors 2Q00–04 in the unit 2LSG0 is approximately two-thirds the voltage supplied from the voltage regulator 2VR due to the voltage divider effect of resistors 223 and 222. With a regulator voltage of minus 18 volts, a minus 12-volt potential is provided to the emitter electrode of each of the five transsistors 2Q00–04. The potential normally provided to the emitter electrodes of the transistors 2Q00–04 is ground potential due to the connection of the emitter electrodes through the varistor 225 and the resistor 223 to ground.

When the transistor 2G0 is saturated, the potential at the emitter electrodes of the transistors 2Q00–04 changes from ground potential to the minus 12-volt potential which is equal to two-thirds the potential supplied from the regulator 2VR. The minus 12-volt potential at the emitter electrodes of the transistors 2Q00–04 is sufficient to initiate conduction because the emitter-base junctions of transistors 2Q00–04 are normally reverse biased, respectively, by a minus 24-volt potential from sources 235–39. The base electrodes of the five transistors 300–04 are connected respectively through resistors 245–49 and resistors 240–44 to the minus 24-volt potential sources 235–39. The resistors 245–49 are also connected respectively through operated contacts of relays 5C00–04 to the ring leads of the lines 2L00–04. The line concentrator 200 includes fifty cut-off relays 5C00, etc. that are individually associated with the fifty subscriber lines 2L00, etc. The relays 5C00, etc. are magnetically latched relays of the type disclosed in the copending patent application Serial No. 697,465, filed by G. E. Perrault on November 19, 1957. The relays 5C00, etc., which are normally in an operated condition, are reset as is hereinafter described, to disconnect the line scanner 220 and provide a clear tip and ring connection for any calling one of the lines 2L00, etc.

Returning to the scanning sequence and assuming that the line 2L00 is idle with the receiver on-hook, the resistance between the tip and the ring leads of the line 2L00 will be large and the potential at the base electrode of transistor 2Q00 will be minus 24 volts. The tip leads of the lines 2L00, etc. are connected respectively through operated contacts of the relays 5C00, etc. and ten sets of resistors 250–54 to ground. When the line 2L00 is idle, the base potential is determined by the battery 235. The resistors 250–54 function to protect the contacts of the relays 2C00–04 from excessive currents due to foreign potentials, and capacitors 275–79, connected respectively between the base electrodes of transistors 2Q00–04 and ground, serve to educe the effects of alternating-current interference and to absorb transient surges due to lightning, etc. The varistor 225 functions to protect the emitter junctions of the line transistors 2Q00–04 against breakdown due to excessive reverse bias. The emitter junctions are normally reverse biased by 24 volts and have a breakdown potential of approximately 40 volts. The varistor 225 provides an additional protection as its breakdown potential is also approximately 40 volts. Since the emitter electrode of transistor 2Q is at minus 12 volts, which is more positive than the minus 24-volt potential at the base electrode, conduction through the transistor 2Q00 is inhibited and the emitter-collector junction impedance is high.

The transistor gate including the transistor 2Q00 is, in this manner, disabled when the associated line 2L00 is idle so that a pulse to the collector electrode of transistor 2Q00 is inhibited. The pulses, which are supplied to the collector electrodes of the ten sets of transistors 2Q00–04 are vertical file step pulses supplied from the five-stage ring counter 4VF respectively through the primary windings of five transformers 265–69 and five capacitors 230–34. The secondaries of the transformers 265–69 are connected between a battery 260 and an Or circuit arrangement consisting of five varistors 270–74. If a vertical file pulse from the counter 4VF can pass through the primary winding of the associated one of the transformers 265–69, an amplifier 4SR, which is connected to the varistors 270–74, supplies the pulse induced in the secondary winding as a service request indication. A pulse is allowed to pass through the primary winding of one of the tranformers 265–69 only when one of the line transistors 2Q00–04 connected thereto is saturated. The transformers 265–69 are connected respectively to ten of the transistors 2Q00–04. The transformer 265, for example, is connected to the transistor 2Q00 in each of the ten units 2LSG0–9. If any one of these ten transistors 2Q00 is saturated when the vertical file pulse 0 is supplied, a service request indication is recognized. The identity of the line, which initiates the service request, is determined by its time position in the scanning cycle. With line 2L00 idle, the positive vertical file pulse from terminal 0 of the counter 4VF is blocked at the transistor 2Q00. The absence of an input pulse to the amplifier 4SR functions as an indication that line 2L00 is idle.

If all ten sets of fifty lines 2L00, etc. remain idle, the scanning sequence continues under control of the three sets of pulses, the vertical group, the vertical file and the reset pulses from the central office. In each of the line concentrators 200–9 each vertical group pulse readies one of the scanning units 2LSG0–9 and each vertical file pulse scans one of the five lines associated therewith. In this manner the five lines are successively scanned by the five vertical file pulses which occur between two of the vertical group pulses. At the time position for the first vertical group pulse, the vertical file pulse is actually omitted, as described above, and a reset pulse is transmitted from the central office to insure that the counters 4VG and 4VF are in the start position.

*Originating call*

When a call is initiated at one of the substations 2S00, etc., a vertical file pulse from the ring counter 4VF is transformed by one of the scanning units 2LSG0–9 to a service request pulse. For example, if the call originates at line 2L00, the scanning unit 2LSG0 functions to provide a service request pulse to the amplifier 4SR.

When the line 2L00 assumes a service request condition with the receiver off-hook, the resistance across the tip and ring leads of the line 2L00 becomes relatively low so that the base electrode of the transistor 2Q00 in the unit 2LSG0 is near ground potential. The resistors 240 and 250 function together with the line impedance as a voltage divider to determine the potential at the base electrode of transistor 2Q00. The potential at the base electrode changes to a value near ground potential when the line 2L00 assumes the service request condition because the resistance of the resistor 240 is much larger than that of the resistor 250. With the base electrode of transistor 2Q00 near ground potential and the emitter electrode of transistor 2Q00 at minus 12 volts due to the operation of the transistor 2G0, the emitter-base junction is forward biased to allow base current through the transistor 2Q00. With base current through the transistor 2Q00, the impedance between its collector and emitter electrodes becomes very small. When the associated stage 0 of the ring counter 4VF is thereafter operated or turned on, a pulse is supplied from terminal 0 of the counter 4VF through the primary winding of transformer 265, capacitor 230, the collector-to-emitter path of transistor 2Q00, varistor 225 and resistor 223 shunted by capacitor 224 to ground. The pulse through the primary winding of the transformer 265 induces a pulse in the secondary winding of the transformer 265 which is supplied through the varistor 270 to the service request amplifier 4SR.

The amplifier 4SR supplies the service request pulse through the transmitting amplifier 4SRT, the transformer 4TR1 and the control pair 4CP1 to the concentrator control circuit 600 in the central office. The amplifier 4SRT also provides an inhibiting potential through a varistor 4V1 to the blocking amplifier 4RSR to prevent the reflection of a pulse from the transformer 4TR1. In the control circuit 600, which is associated with the concentrator 200, the service request pulse is coupled through the transformer 6TR1, an amplifier 6SR and an inhibiting gate 6RHT1 to the input terminal S of a flip-flop circuit 6HGT. The circuit 6HGT, which is set by the service request pulse, initiates a sequence of operations for selecting an idle one of the trunks 4T0–9 and for establishing a connection from the service requesting line 2L00 through the selected trunk and a trunk switch 1000 to an originating register 2004 which supplies dial tone.

When the circuit 6HGT is set, it disables the gates 6HGT2 and 6HGT3 to block the vertical group and reset pulses to the line concentrator 200, it enables a gate 6HGT1 to ready a path for detecting an abandonment of the call at line 2L00 and it provides a control potential through a varistor 6V1 and lead 7HGT to the control circuits 601–9 and also to the register circuit 800. The control potential on lead 7HGT functions to halt the transmission of the vertical group and reset pulses through the circuits 601–9 and to halt the register 800 at the identity of the calling line 2L00. The gates 6HGT2 and 6HGT3 are disabled as their control terminals C are muliplied to an output terminal 0 of the circuit 6HGT.

The circuit 6HGT is similar to the flip-flop circuits 9PD and 9PB, described above, except that it has two independent output terminals B and O. The output terminal O is connected to the control terminals C of the gates 6HGT2 and 6HGT3 and to the lead 7HGT and the output terminal B is connected to the winding of a relay 6HGT0.

If the flip-flop circuit 6HGT is not set the service request is not recognized and if the flip-flop circuit 6HGT is reset after having recognized the service request, an abandoned call is indicated. Service may be denied to any one of the subscriber lines 2L00, etc. by inhibiting the operation of the flip-flop circuit 6HGT during the time that the particular line is scanned. For example, if service is to be denied for line 2L00, the circuit 6HGT is maintained in its reset condition during the time that a service request would be received from the line concentrator 200 for the line 2L00. Service is denied utilizing enabling gates 8SD00, 8SD14, etc. One enabling gate is utilized for each of the lines 2L00, etc. for which service is to be denied. The gate 8SD00 functions to provide a reset pulse to the flip-flop circuit 6HGT during and immediately after the line 2L00 is scanned. The control terminal C of the gate 8SD00 is connected to the output terminal 0 of the ring counter 8VGR and the input terminal E of the gate 8SD00 is connected to the output terminal 0 of the ring counter 8VFR. The group counter 8VGR enables the gate 8SD00 and the file counter 8VFR provides a pulse through the gate 8SD00 at the same time that the vertical file pulse 0 is provided to the line concentrator 200. The pulse through the gate 8SD00 is provided to the input terminal S of a flip-flop circuit 6SD in the concentrator control circuit 600. When the circuit 6SD is set, it provides an output potential to a reset amplifier 6RSC which functions to provide a reset potential to the flip-flop circuit 6HGT. As long as the reset potential is at terminal R of the circuit 6HGT a service request pulse at its input terminal S does not function to operate it. If the circuit 6HGT is not operated by the service request pulse, service is effectively denied to the subscriber line 2L00. The gate 8SD14 is shown connected to the concentrator control circuit 609 but any number of similar enabling gates may be utilized in the register circuit 800 to provide service denial to other subscriber lines connected to any of the concentrators 200–9. The gate 8SD14 functions to deny service for the subscriber line 2L14 connected to the remote line concentrator 209.

If the flip-flop circuit 6HGT is reset during a relatively short interval following its operation, an abandoned call is indicated and the central office is returned to normal. An abandoned call is detected utilizing the the vertical file pulses which are not inhibited or blocked upon the reception of the service request pulse at the central office. The continuation of the vertical file pulses to the counter 4VF in the line concentrator 200 causes the line scanner 220 to continue to scan the five lines 2L00–04 in the vertical group 0 from which the service request originated. Each time that the service requesting line 2L00 is scanned, which is at each fifth vertical file pulse, another service request pulse is provided to the central office. As is hereinafter described, the service request pulses are monitored in the register 800 to check that the call is not abandoned before establishing a talking connection thereto.

In the circuit 800, the control pulse on lead 7HGT is coupled through a varistor 8D64 and a coupling capacitor 8C1 to the input terminal S of a flip-flop circuit 8RHA. The junction between the varistor 8D64 and the capacitor 8C1 is connected to a negative battery 8B7 through a resistor 8R42. The flip-flop circuit 8RHA is therefore set by the flip-flop circuit 6HGT responsive to the first service request pulse. When the circuit 8RHA is set, it provides an inhibiting potential to the control terminals C of four gates 8RH1–4. The gates 8RH1 and 8RHA inhibit, respectively, the vertical file and vertical group pulses from the control pulse generator 900 to the counters 8VFR and 8VGR. The reset pulses to the counters 8VFR and 8VGR are also inhibited as the control potential through lead 7HGT is provided through a varistor 8D62 to the control terminal C of the inhibiting gate 8RRS1 which is in the reset path to the counters 8VFR and 8VGR. The varistor 8D62 is normally reverse biased by its connection through a resistor 8R39 to battery 8B3.

The counters 8VFR and 8VGR are halted, in this manner, to register the calling line identity or in a position corresponding to a number of the calling subscriber. When the circuit 8RHA is set, it also provides a set pulse from its output terminal 0 through a capacitor 8C11 to the input terminal S of a circuit 8RNSA in a random restart circuit 8RAN and it provides an inhibiting potential to a lead 7L3. When the circuit 8RNSA sets, it provides an additional inhibiting potential from its output terminal 0 through the varistor 8D67 to the lead 7L3. As long as either of the circuits 8RHA or 8RNSA remains set, an inhibition potential remains on the lead 7L3.

The lead 7L3 is connected in each of the circuits 600–9 through a varistor 6RNS0 to the control terminal C of the inhibiting gate 6RHT1. The gate 6RHT1 is in the service request path to the circuit 6HGT so that service requests are not recognized even though scanning is resumed as long as either of the circuits 8RSNA or 8RHA is set.

When the circuits 8RSNA and 8RHA are set, they also respectively operate relays 8RSN and 5RH. The winding of relay 8RSN is connected between the output terminal B of the circuit 8RNSA and a battery 8B2, and the winding of the relay 8RH is connected between the output terminal B of the circuit 8RHA and a battery 8B6. When each of the relays 8RL and 8RSN operates it closes an operating path for a timing relay 22TT1 and it energizes an associated lamp. Relay 8RH closes a path from the grounded winding of relay 22TT1 through its operated contact and a resistor 22R3 shunted by a lamp 22L3 to a battery 22B20. The lamp 22L3 provides an indication that relay 8RH is operated. Relay 8RSN closes a similar operating path through a resistor 22R7 shunted by a lamp 22L7 for relay 22TT1. Relay 22TT1 is a slow-to-operate relay which completes a path from the battery 22B20 to an alarm circuit 2204 if either relay 8RH or 8RSN is not released within a predetermined interval.

When the flip-flop circuit 6HGT in the control circuit 600 operates, in addition to stopping the register 800, it also operates an associated relay 6HGT0, the winding of which is connected between the output terminal B of the circuit 6HGT and a battery 6B1. The circuits 600–9 include, respectively, the relays 6HGT0–9 which function to identify the associated one of the concentrators 200–9 from which the service request originated. When the relay 6HGT0 operates, it closes a path from a negative battery 8B9 to the windings of relays 8VFT0–4 and 8VGT0–9 in the register 800. The windings of the relays 8VFT0–4 and 8VGT0–9 are connected, respectively, between the output terminals 0–4 of the counter 8VFR and 0–9 of the counter 8VGR through a resistor 8R1 to a minus 6-volt battery 8B1. With minus 24 volts at terminals 0 of both the counters 8VFR and 8VGR to identify the line 2L00, the relays 8VFT0 and 8VGT0 are operated due to the operation of relay 6HGT0.

When the relay 8VFT0 operates, it closes a path from the output terminal 0 of the ring counter 9VF in the generator 900 to the input terminal E of an enabling gate 8HGT2. The control terminal C of the gate 8HGT2 is connected to the lead 7HGT so that the gate 8HGT2 is enabled to allow the passage of the next vertical file pulse 0 from the ring counter 9VF to the input terminal S of a flip-flop circuit 8RLA. When the circuit 8RLA is set, it operates a relay 8RL the winding of which is connected between the output terminal B of the circuit 8RLA and a battery 8B8. When relay 8RL operates, it energizes a lamp 22L4 and it closes another operating path for the relay 22TT1 associated with the alarm circuit 2204. Relay 6HGT0, when it operates, energizes a lamp 22L5 and closes still another path for the relay 22TT1. The relay 22TT1 operates and brings in an alarm if any one of the relays 6HGT0, 8RL, 8RH, 8RSN or 14CKR does not release within a predetermined interval.

If the line 2L00 is still requesting service at the time the vertical file pulse 0 sets the circuit 8RLA, a second service request pulse is returned to the control circuit 600 from the concentrator 200. The service request pulse is directed through the enabled gate 6HGT1, described above, and lead 6L3 to the input terminal S of a flip-flop circuit 8RLR. When the circuit 8RLR is set, it supplies a pulse through an amplifier 8RLRA to the reset terminal R of the circuit 8RLA. The circuit 8RLR also functions to enable a gate 8RLR1 to ready a reset path for itself from the lead 9VFL2. The next vertical file pulse, which would be a vertical file pulse 1, therefore resets the circuit 8RLR. The vertical file pulse 0 in this manner functions to set the circuit 8RLA, and the service request pulse, derived from the vertical file pulse 0 when line 2L00 is scanned, functions to reset the circuit 8RLA. As is hereinafter described, if the circuit 8RLA is not immediately reset, it functions to release the central office equipment and to resume line scanning as the call from line 2L00 is considered abandoned.

As long as the vertical file pulses are provided to the concentrator 200 the abandoned call check is repeated with the flip-flop circuit 8RLA being set and then reset during each cyclic operation of the counter 9VF. A cyclic operation of the ring counter 9VF occurs every 24 milliseconds so that an abandoned call check is made every 24 milliseconds as long as the vertical file pulses are supplied to the line concentrator 200.

If the service request is discontinued before a marker 2008 is seized for the call, the call is canceled and scanning is resumed. If the call is abandoned at line 2L00, a service request pulse is not provided to the central office when the line 2L00 is subsequently scanned. The flip-flop circuit 8RLA is set by the vertical file pulse 0 from the ring counter 9VF but now it remains set as a service request pulse is not provided to operate the circuit 8RLR which functions, as described above, to reset the circuit 8RLA. When the circuit 8RLA is set, it enables a gate 8RL1 which allows the next vertical file pulse, vertical file pulse 1, to operate an amplifier 14RLS in the outpulsing control circuit 1400. The path for the vertical file pulse is through the lead 9VFL1, an inhibiting gate 14CKR2, lead 14L3, the now enabled gate 8RL1, lead 8L4 to the input terminal of the release amplifier 14RLS. The control terminal C of the inhibiting gate 14CKR2 is normally negative due to its connection through a resistor 14R1 and the winding of a relay 14CKR to a negative battery 14B1.

The release pulse from the amplifier 14RLS is provided to the register 800 and to the concentrator control circuits 600–9 to return them to normal and to resume the normal scanning sequence for detecting service requests. The amplified release pulse is provided from the amplifier 14RLS through a lead 6RL which is part of cable 14CA, a varistor 6SD0 to the set terminal S of a flip-flop circuit 6SD. The cable 14CA is multipled to each of the concentrator control circuits so that a flip-flop circuit 6SD in each of the circuits 600–9 is set. The circuit 6SD in the control circuit 600 functions to provide a reset pulse through a reset amplifier 6RSC to the reset terminal R of the flip-flop circuit 6HGT. When the circuit 6HGT is reset, it releases, the relay 6HGT0 and removes the control potential from the terminals C of the gates 6HGT1–3 and from the lead 7HGT to restore the vertical group and reset path through the concentrator control circuits 600–9 to the line concentrators 200–9. When the potential is removed from the lead 7HGT, the gate 8RRS1 is returned to normal readying a path from the reset lead 9RSL to the reset amplifier 8RS1. The next reset pulse from the control pulse generator 900 is coupled through the amplifier 8RS1 to reset the flip-flop circuit 8RHA and to reset the counters 8VFR and 8VGR. When the circuit 8RHA is reset, it readies the scanning pulse paths from the leads 9VFL2 and 9VGL, respectively, to the counters 8VFR and 8VGR to permit the register 800 to keep track of the scanning sequence.

When the reset amplifier 14RLS is operated to reset the flip-flop circuit 6HGT in the control circuit 600, it also provides a release pulse to reset the flip-flop circuit 8RLA in the register circuit 800. A pulse is provided from the amplifier 14RLS through lead 14L4 and varistor 8V7 to the set terminal S of the flip-flop circuit 8RLR. As described above, when the circuit 8RLR is set, it functions to enable the gate 8RLR1 and to provide a reset pulse through the amplifier 8RLRA to reset the circuit 8RLA. The next vertical file pulse from the generator 900 is provided through lead 9VFL2 and the enabled gate 8RLR1 to reset the circuit 8RLR. In this manner the abandoned call check circuitry is restored to normal when an abandoned call is detected.

When the release pulse is provided to reset the circuit 6HGT to thereby resume scanning, a release pulse is also provided from the amplifier 14RLS to the line concentrators 200–9 to return them to normal. The release pulse from the amplifier 14RLS is provided through a varistor 14V8, lead 6RSL, which is part of cable 14CA, to the circuits 600–9. In the circuit 600 the pulse is provided through lead 6RSL and an inhibiting gate 6HGS4 to the reset amplifier 6RS. As described above, during the normal scanning sequence the amplifier 6RS provides a reset pulse to the line concentrator 200. In this manner the counters 4VG and 4VFR in the concentrator 200 are reset if the service request is canceled or abandoned.

To briefly recapitulate, the pulse from the amplifier 14RLS is produced from a vertical file pulse, which occurs somewhere during the scanning sequence, immediately after the vertical file pulse which fails to provide for the service request pulse. The vertical file pulse, transformed to a release pulse, functions to reset the circuits 600–9 and the line concentrators 200–9. Scanning of the lines 2L00, etc. is immediately resumed when the circuit 6HGT is reset but the register circuit 800 is, however, not immediately reset. The register 800 resets thereafter under control of the next reset pulse through lead 9RSL because, as described above, the next reset pulse functions to reset the circuit 8RHA and the counters 8VFR and 8VGR. The counters 8VFR and 8VGR therefore do not follow the scanning count until the reset pulse functions to synchronize them with the counters 4VF and 4VG in the ten line concentrators 200–9. A service request pulse is not, however, recognized at any one of the concentrator control circuits 600–9 during this interval when the concentrators 200–9 are not synchronized with the register 800. During this interval the service requests are blocked or not recognized due to the inhibiting potential at the control terminal C of the inhibiting gates 6RHT1 in the circuits 600–9 which remains as long as the flip-flop circuit 8RHA in the register circuit 800 remains set. As described above, the circuit 8RHA is reset by the first reset pulse following the abandoned call sequence. When the circuit 8RHA is reset, it removes the inhibiting control potential supplied through the varistor 8D68 in the random restart circuit 8RAN from a lead 7L3. As described above, the lead 7L3 is connected through the varistor 6RNS0 to the control terminal C of the gate 6RHT1 in each of the circuits 600–9.

The reason for resetting the flip-flop circuit 6HGT by the vertical file pulse during the scanning cycle instead of waiting for the reset pulse is to prevent the seizure of the marker 2008. Once the marker 2008 is seized and has operated a frame control circuit 2100, an originating connection is established to the calling line 2L00 even if the subscriber at substation 2S00 abandons the call. In order to prevent utilizing marker holding time unnecessarily, the circuit 6HGT is reset as soon as the abandonment is detected. As described above, when the circuit 6HGT is reset, it releases the relays 6HGT0, 8VFT0 and 8VGT0 to remove the start potential towards the marker 2008.

The central office remains insensitive to service requests for a random interval after the synchronization of the register 800 with the line concentrators 200–9 by the reset pulse. Though the circuit 8RHA is reset to remove the inhibiting potential provided at its output terminal 0, an inhibiting potential remains on lead 7L3 for a random interval under control of the random restart circuit 8RAN. The function of the circuit 8RAN is to prevent troubles which are individual to a line or to a small number of lines from denying dial-tone service to a large portion of the subscribers. Since the lines are always scanned in the same order it would be possible otherwise for a trouble condition on any line to deny service to all lines that succeed it in the scanning cycle. The circuit 8RAN maintains an inhibiting potential on lead 7L3 for a random portion of each scanning cycle immediately following the reset pulse which synchronizes the counters 4VF and 4VG with the counters 8VFR and 8VGR.

As described above, an inhibiting potential is provided from the output terminal 0 of the circuit 8RNSA in the random restart circuit 8RAN through a varistor 8D67 to the lead 7L3. As long as the circuit 8RNSA remains set, an inhibiting potential remains upon lead 7L3. The circuit 8RNSA remains set until a reset pulse is provided thereto from an oscillator 8RNS through the inhibiting gate 8RH3. The oscillator 8RNS supplies a short pulse at intervals slightly less frequent than the repetition rate of the scanned cycle and its operating cycle is independent of the operating cycle of the control pulse generator 900. The gate 8RH3 is returned to normal to ready a path for the reset pulse from the oscillator 8RNS when the circuit 8RHA is reset. Tht circuit 8RNSA is therefore reset at a random interval after the circuit 8RHA is reset by the reset pulse from the generator 900. Since the operating cycle of the oscillator 8RNS is slightly less than the 240-millisecond cycle of the pulse generator 900, the circuits 600–9 are enabled to recognize service requests at a random interval subsequent to the synchronization of the register 800 with the line concentrators 200–9.

The release operation and resumption of scanning, described above, occurs if an abandoned call is detected. Assuming that the call is not abandoned at the line 2L00, the relays 6HGT0, 8VGT0 and 8VFT0 remain operated to identify, respectively, the concentrator 200, the vertical group 0 and the vertical file 0 of the calling line 2L00.

Figure 20:
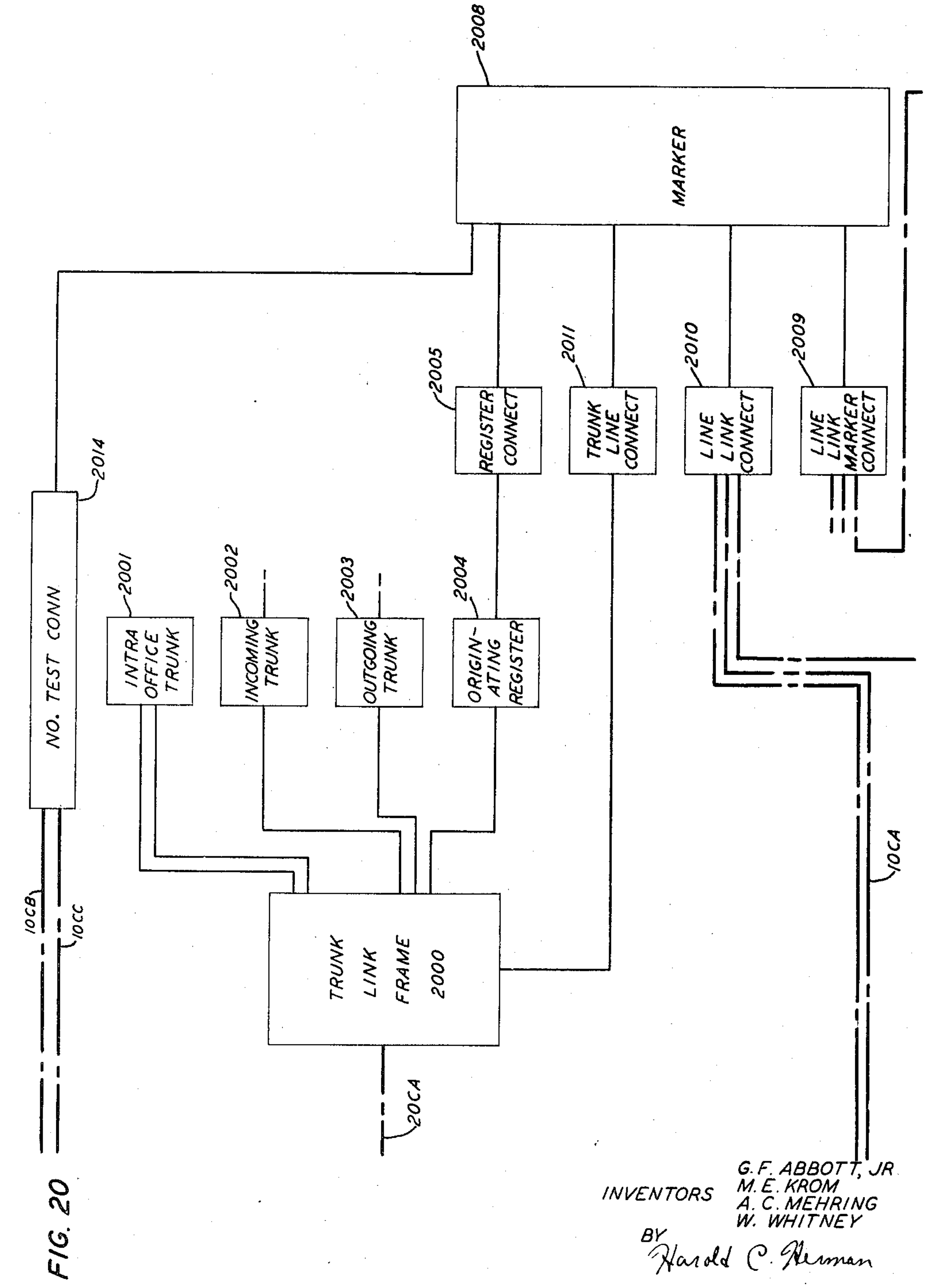
Figure 21:
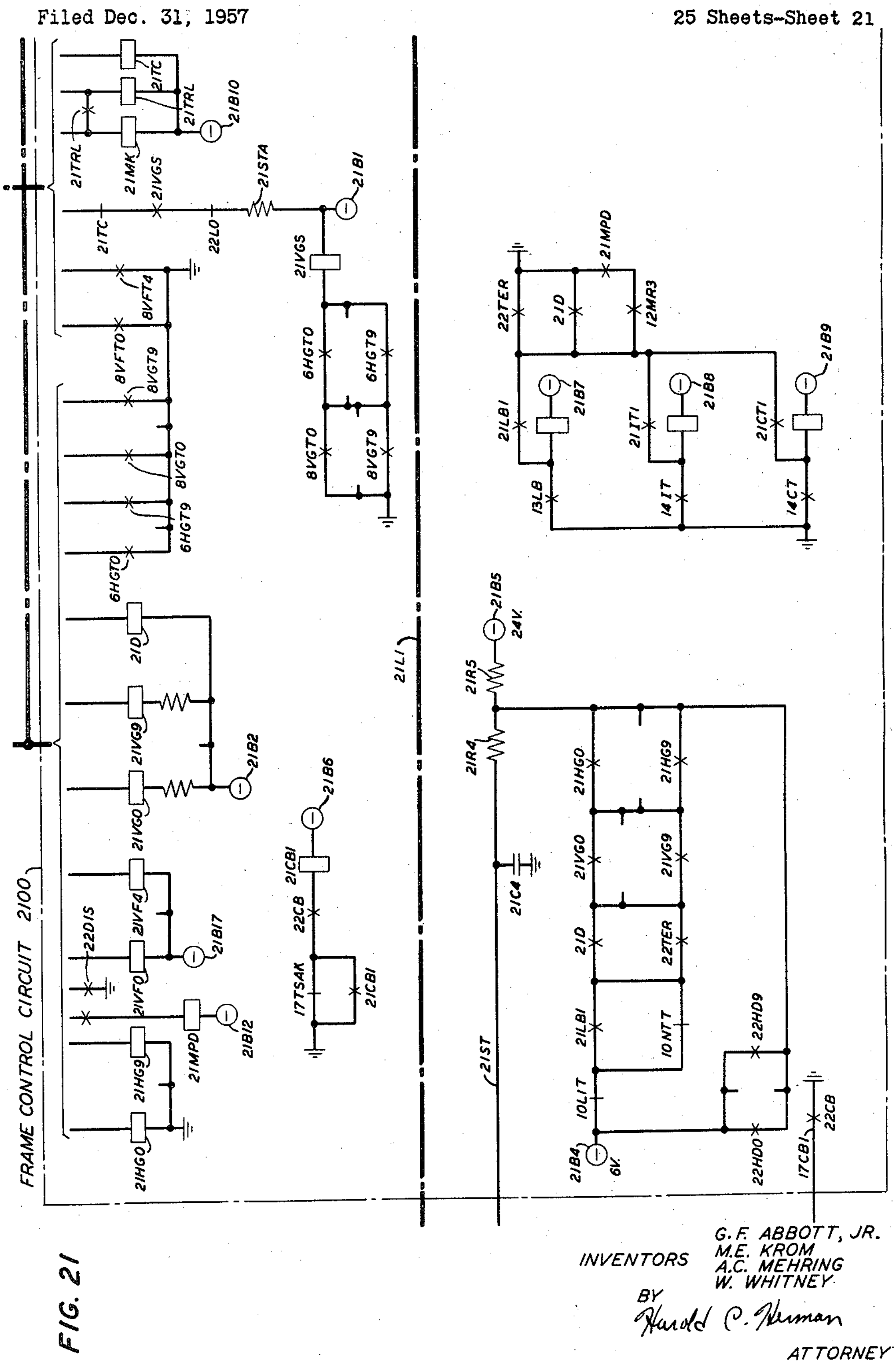

When the relay 6HGT0 operates, it supplies the identity of the line concentrator 200 to a line link connector 2010 by connecting ground in a frame control circuit 2100 thereto. When the relays 8VGT0 and 8VFT0 operate, they respectively provide the vertical group and vertical file identities to the connector 2010 and to a marker connector 2009 by extending ground connections thereto. When relay 8VGT0 operates, it also operates in turn a start relay 21VGS in the frame control circuit 2100. The operating path for the relay 21VGS is from ground through operated contacts of relays 8VGT0 and 6HGT0 and the winding of the relay 21VGS to a negative battery 21B1. When relay 21VGS operates, it closes a seizure or start path from the battery 21B1 through a resistor 21STA, a normal contact of a relay 21L0, an operated contact of the relay 21VGS and a normal contact of a relay 21TC to the line link marker connector 2009. The potential supplied in this manner to the connector 2009 functions to cause the connector 2009 to seize the marker 2008 for the originating call. The marker 2008, connectors 2009–10, etc. shown in Fig. 20, are of the type disclosed in the above-identified Busch patent.

When the marker 2008 is seized, it seizes the dial-tone register 2004 in preparation for connecting it to the calling line 2L00 and it seizes the line link connector 2010 receiving the vertical group and horizontal group information therefrom. The vertical file information is thereafter received from the connector 2009. With the vertical group, vertical file and horizontal group information relating to the calling line 2L00 received at the marker 2008, the line link connector 2010 is controlled by the marker 2008 to operate the relays 21HG0, 21VF0 and 21VG0 in the frame control circuit 2100. In addition, a relay 21D is operated to indicate that the call is a dial tone or originating call, and a relay 21TC is operated to indicate the marker seizure is complete. The relays 21HG0 and 21VF0 are operated over a path to ground and the relays 21VG0 and 21D are operated over a path to battery 21B2. The windings of the relays 21VG0–9 are serially connected respectively with resistors 21R10–19 between the battery 21B2 and the connector 2010 and the winding of the relay 21TC is connected between a battery 21B10 and the connector 2009. When relay 21TC operates, it opens the start path from the battery 21B1 to the connector 2009.

When the frame control circuit 2100 is operated in this manner, it functions to initiate a trunk selection sequence in the trunk selector circuit 1700, to halt the abandoned call check, and to ready the central office and the line concentrator 200 for outpulsing the identity of the selected trunk and calling line identity.

The trunk selection sequence is initiated in the selector circuit 1700 when the potential on a start lead 21ST changes from minus 24 volts towards minus 6 volts. Only a portion of the selector circuit 1700 is shown and disclosed herein as a selector circuit of this type is disclosed in detail in the copending patent application Serial No. 678,134, filed on August 14, 1957, by B. W. Lee. The operation of relays 21D, 21VG0 and 21HG0 provides for the start potential on lead 21ST from the frame control circuit 2100. Normally the lead 21ST, which is connected to the grounded capacitor 21C4, is at a potential of minus 24 volts due to its connection through resistors 21R4 and 21R5 to battery 21B5. When relays 21HG0, 21VG0 and 21D operate, a path is provided from the junction of resistors 21R4 and 21R5 through the serially connected operated contacts of relays 21HG0, 21VG0 and 21D, and the normal contacts of relays 21LB1 and 10L1T to a 6-volt battery 21B4. The start potential is provided in this manner to the selector circuit 1700 even if relay 21VF0 has not as yet operated.

In addition to the start potential on lead 21ST, the selector circuit 1700 utilizes a timing pulse from the pulse generator 900 through lead 9TP0, and trunk availability information from the memory circuit 1100 through cables 17CB and 17CD. Only six of the trunks 4T0–9 are available for connection to any one of the lines 2L00, etc. and a selection preference is established wherein trunks 4T8 and 4T9 are always the last two preferred trunks. The six trunks connectable to a line are referred to as a trunk multiple and the multiples are the same for all five lines in each vertical group. In all there are ten different trunk multiples, one for each vertical group. A trunk mutiplying system of this type is disclosed in the pending patent application Serial No. 555,929, filed on December 28, 1955, by Brooks-Joel-Krom and in the Patent 2,812,385 granted on November 5, 1957, to Joel-Krom-Posin.

Figure 27:
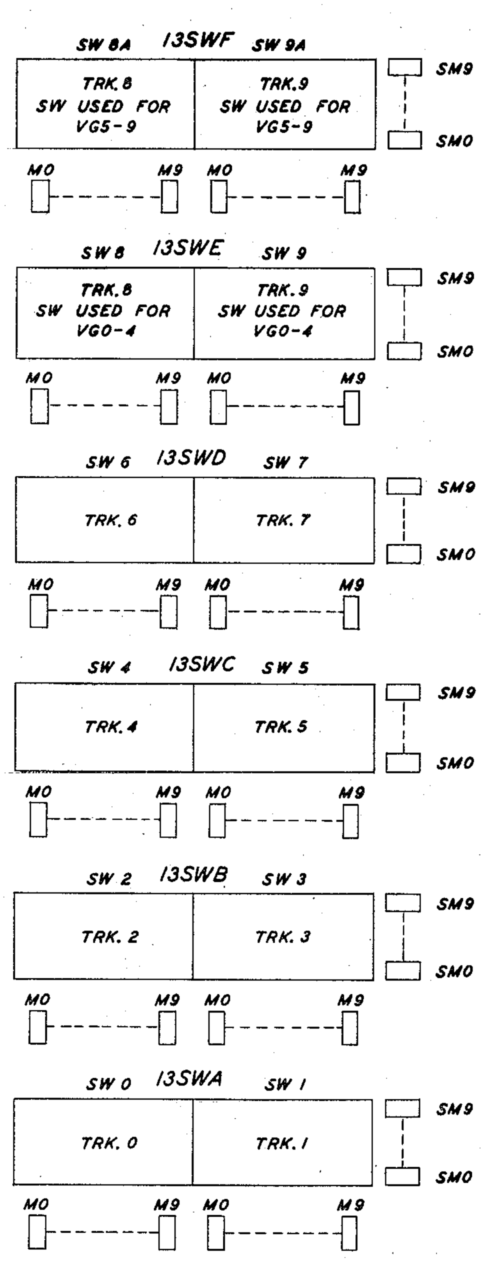
Fig. 27 is a functional arrangement showing the memory crossbar switches.

As indicated above, the trunk availability information is provided to the circuit 1700 from the memory circuit 1100. The memory circuit 1100 includes six 200 point crossbar switches 13SWA–F which store a record of each established call or connection through the line concentrators 200–9. The assignment of the trunks 4T0–9 of each of the concentrators 200–9 to the switches 13SWA–F is illustrated in Fig. 27. The hold magnets designated M0–9 in Fig. 27 identify the horizontal group or concentrator identity. For example, if trunk 4T3 of the line concentrator 200 is busy, the magnet M0 (identifying concentrator 200) of the switch 13SW3 (identifying trunk 4T3) is operated. The switch 13SW3 is one-half of the switch 13SWB. Each of the switches 13SWA–F has two halves which are separately identified to indicate the trunk number of the information stored therein. Switch 13SW3, for example, stores the information relating to all ten trunks 4T3 connected respectively to the line concentrators 200–9.

Each of the trunks 4T0–7 of each of the concentrators 200–9 is assigned one vertical of the eighty verticals in switches 13SW1–7. Each of the trunks 4T8–9 of each of the concentrators 200–9 is assigned two verticals of the forty vertical in switches 13SWE–F because they are common to all ten vertical groups. As indicated above, trunks 4T0–7 are connected on a random slip basis with only four being available to each vertical group. Each of the trunks 4T0–7 is accessible to five vertical groups and each of the trunks 4T8–9 is accessible to all ten vertical groups.

As is hereinafter described, when a connection is established through any one of the line concentrators 200–9, one of the hold magnets M0–9 of one of the switches 13SWA–F registers the identity of the trunk utilized for the call and the select magnets register the vertical file and vertical group identity of the line. The operating paths for the hold magnets M0–9, which are also hereinafter described, are shown in Fig. 11. In the detail circuit drawing shown in Figs. 2 through 22, when arranged in accordance with Fig. 23, the hold magnets of the switches 13SWA–F are identified by a designation which includes a symbol of the switch of which they are a part. For example, the hold magnet M0 of the switch 13SW0, which is part of switch 13SWA, is identified by the designation 11M0SW0. The digits 11 indicate that the hold magnet is shown in Fig. 11, the letters M0 indicate that it is associated with concentrator 200 and the portion SW0 of the designation identifies the switch 13SW0 and indicates that it is associated with trunk 4T0.

Returning now to the operation of the trunk selector circuit 1700, the trunk availability information is supplied from the memory circuit 1100 through six leads T0–3 and T8–9 which are selectively grounded to indicate trunk availability. For example, if the first preferred trunk is idle or available for the connection, lead T0 is grounded by the memory circuit 1100. If the first preferred trunk is busy or unavailable, the lead T0 is not grounded. In the memory circuit 1100 the leads T0–3 are multipled to contacts of the vertical group relays 21VG0–9. Only the relay 21VG0 is operated at this time so that the leads T0–3 are extended through operated contacts of the relay 21VG0 to four of the leads C0–7 which are associated individually with trunks 4T0–7. The connections from the leads T0–3 to the leads C0–7 are illustrated in the table shown in Fig. 24. The lead C0, for example, is connected to the lead T3 for the vertical group 0. Only four of the leads C0–7 are utilized for each vertical group because only four of the eight trunks 4T0–7 are tested for any particular vertical group. Trunks 4T8 and 4T9 are always tested last for each of the vertical groups 0–9. The order in which the trunks are tested is rotated according to the vertical group so that all trunks obtain approximately equal usage. Fig. 24 illustrates this slip multiple as well as the rotation of preference by means of the connections between the leads C0–7 and T0–3. The leads C0–7 identify the trunk number and the leads T0–3 indicate the order of testing or preference. For example, the trunks which are connectable to a line in the vertical group 0 are trunks 4T0–3 with the order of preference being as follows: 4T3, 4T2, 4T1 and 4T0. In other words, the first preferred trunk for the vertical group 0 is trunk 4T3, the second 4T2, etc. If trunk 4T3 is being utilized for another call, the lead T0 to the trunk selector circuit 1700 is not grounded and the next preferred trunk, which is trunk 4T2, is tested.

A trunk tests idle or available for selection when both its associated hold magnet in the memory circuit 1100 and a corresponding hold magnet in a trunk switch 1000 are normal. For example, if trunk 4T0 of the concentrator 200 is idle, a path is completed from ground to Fig. 16 through a normal contact of a hold magnet 15T00, a normal contact of the hold magnet 11M0SW0, an operated contact of the relay 21HG0, lead C0, lead T3, an operated contact of relay 21VG0 and cable 17CB to the trunk selector circuit 1700. If either the hold magnet 15T00 or the hold magnet 11M0SW0 is operated, ground is not provided through lead T3 to the circuit 1700. Only available trunks ground the leads T0–9 as trunks that are busy as well as trunks that are not in the trunk multiple provide for an open circuit on the corresponding ones of the leads T0–3 and T8–9.

The trunk switch 1000 includes twenty ten by ten crossbar switches 15SW0–9 and 15JW0–9. The switches 15SW0–9 are associated individually with the line concentrators 200–9 and each of the ten horizontals of each of the switches 15SW0–9 is connected to a different one of the ten junctor switches 15JW0–9. Each of the switches 15SW0–9 has ten verticals and hold magnets which are associated individually with the trunks 4T0–9. For example, as described above, the trunk 4T0 of the line concentrator 200 is associated with the hold magnet 15T00 of the switch 15SW0. The last digit of the hold magnet designation is the same as the trunk number and the next-to-last digit is the same as the switch or concentrator number. In all there are one hundred hold magnets 15T00–99 which are associated with the ten groups of ten trunks 4T0–9 and which provide for control paths in the memory circuit 1100.

Figure 16:
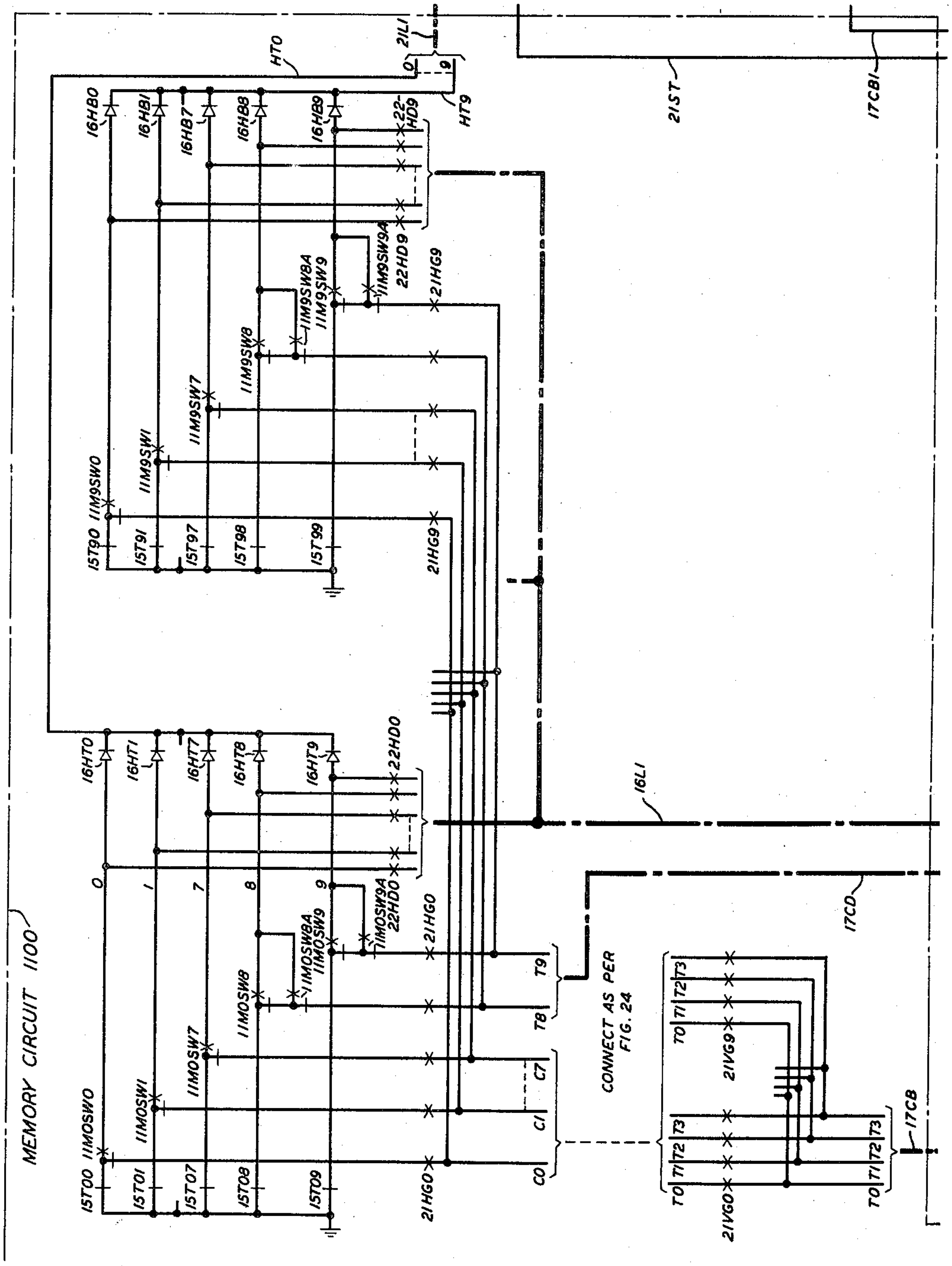
Figure 17:
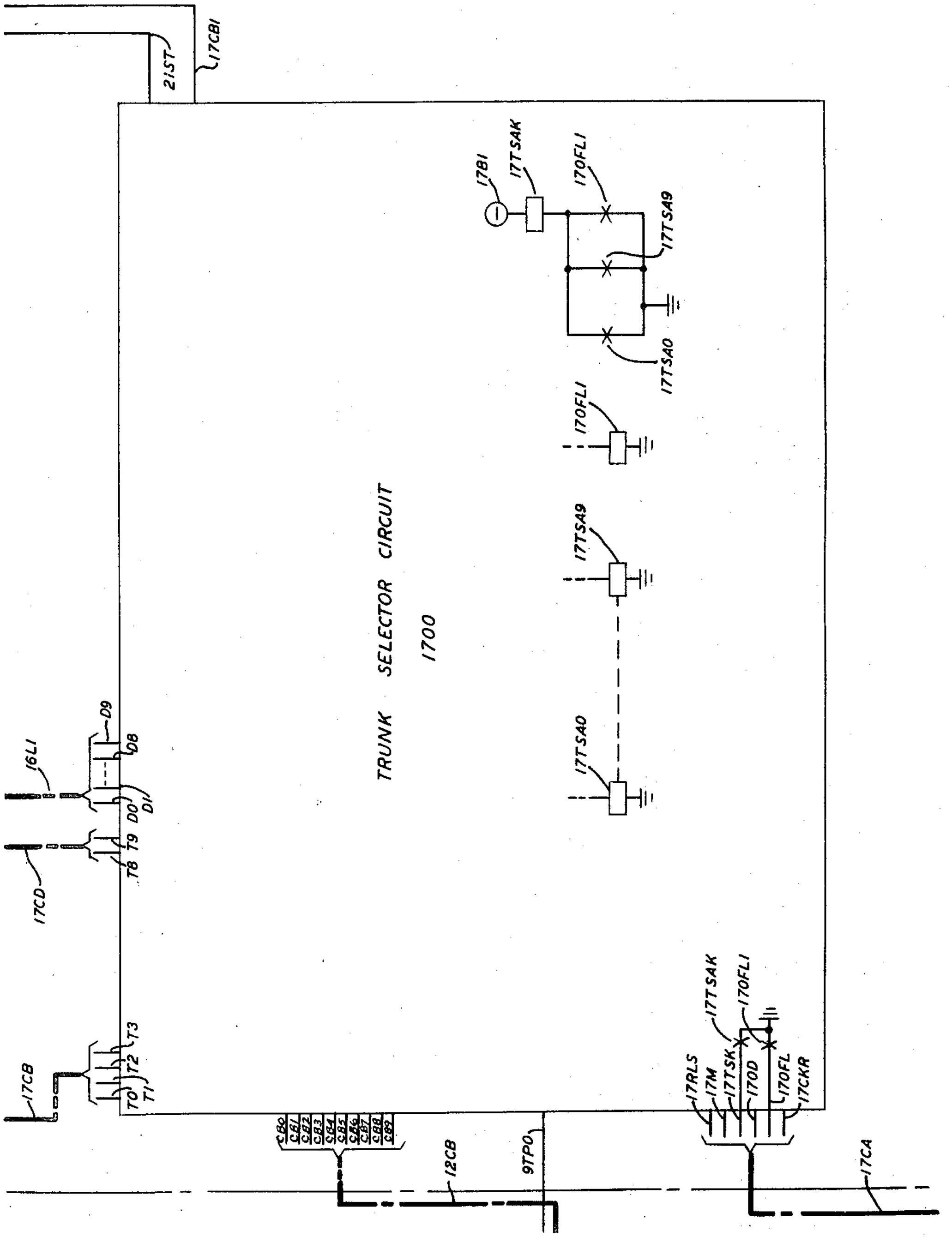

As described above, there are one hundred and twenty memory hold magnets because each of the trunks 4T8–9 has associated therewith two hold magnets. In other words, for each of the trunks 4T0–7, there is one hold magnet in the switch 1000 and one hold magnet in the memory circuit 1100 and for each of the trunks 4T8–9 there is one hold magnet in the switch 1000 and two hold magnets in the memory circuit 1100. This is illustrated in Fig. 16 where the contact of the magnet 15T00 is only connected to the contact of the magnet 11M0SW0 whereas the magnet 15T09 associated with trunk 4T9 is connected to the serially connected contacts of the two hold magnets 11M0SW9 and 11M0SW9A.

The operation of the memory circuit 1100 and the trunk switch 1000 are further described during the remainder of the sequence of operation for establishing an originating connection.

Returning again to the trunk selection sequence, the selector circuit 1700 utilizes the trunk availability of information on leads T0–3 and T8–9 to select the first available preferred trunk. Suppose, for example, that trunks 4T3–1 of concentrator 200 are busy but that trunk 4T0 is idle so that a ground potential is provided on lead T3 but not on leads T0–2. With the first three preferred trunks for the vertical group 0 unavailable, the fourth preferred trunk 4T0, which is available, is selected and relay 17TSA0 is operated to identify it. The trunk selector circuit 1700 functions to select the first preferred available trunk and to operate one of the relays 7TSA0–9 to identify it.

When relay 17TSA0 operates, it in turn causes the operation of a check relay 17TSAK. The operating path for relay 17TSAK is from ground through an operated contact of relay 17TSA0 and the winding of relay 17TSAK to battery 17B1. When relay 17TSAK operates, it connects a control potential through lead 17TSK, which is part of cable 17CA, to enable a gate 14TSK2 in the outpulsing control circuit 1400. As is hereinafter described, the gate 14TSK2, which is part of the vertical group outpulsing path, is normally inhibited due to the connection of its terminal C1 through a resistor 14R13 to a battery 14B9. When the ground potential is provided through lead 17TSK to the terminal C2 of the gate 14TSK2, the gate 14TSK2 becomes enabled. The gate 14TSK2 is a combined gate having its terminal C1 connectable through a contact of a preference relay 21MPD to a battery 14B8. If the battery 14B8 is connected to terminal C1, the ground potential at terminal C2 does not enable the gate 14TSK2. As is hereinafter described, relay 21MPD is operated during the disconnect sequence of operations to prevent enabling the gate 14TSK2.

When relay 14TSK2 is enabled, it readies a vertical group outpulsing path from the circuit 1400 to the line concentrator 200. Before proceeding, however, with the outpulsing sequence consider the situation in which all six trunks 4T0–3, 4T8 and 4T9 connectable to line 2L00 are busy.

If no idle trunks are available for selection, the call is abandoned. The marker 2008 does not complete the connection to the originating register 2004 until a closure is provided from the connector 2010 through an operated contact of relay 17TSAK shown in Fig. 22 to the connector 2009. For a terminating call, as is hereinafter described, ground is normally provided through a normal contact of the relay 17TSAK and lead 21CD to the connector 2010 to delay the marker operation. When relay 17TSAK operates, it opens the ground connection through lead 21CD allowing the marker 2008 to complete its operation. In this manner for both originating and terminating calls an indication of trunk selection is required for the marker 2008 to complete its operation. If all the concentrator trunks available to the particular vertical group requesting service are busy during the trunk selection sequence, relay 17OFL1 is operated to open connections through leads LL0–9 in the trunk switch 1000 and to ground the leads LL0–9 towards the connector 2010. This switching operation by the relay 17OFL1 causes marker 2008 to release as all channels through the switch 1000 appear busy.

When the marker 2008 releases, it releases the connectors 2010 and 2009 and the register 2005. Thereupon relays 21D, 21HG0, 21VG0, 21VF0 and 21TC are released to initiate a release sequence for returning the central office to normal and restart normal scanning. The sequence for returning the central office equipment to normal when the marker 2008 releases is the same as that, hereinafter described, which takes place when the marker 2008 releases after establishing an originating connection.

Assuming that trunk 4T0 is selected for connection to the calling line 2L00, the leads LL0–9 in the trunk switch 1000 are not grounded so that the marker 2008 maintains its control of the connector 2010. After the trunk 4T0 is selected, the selector circuit 1700 functions to outpulse the identity of the selected trunk 4T0 to the line concentrator 200. The trunk outpulsing sequence is controlled by the outpulsing control circuit 1400. The circuit 1400 is operated to initiate the outpulsing sequence by the frame control circuit 2100 when relays 21D, 21VG0, 21VF0 and 21HG0 are operated.

When the frame control circuit 2100 is operated, it functions to both initiate the outpulsing sequence and to halt the abandoned call check by operating a flip-flop circuit 6HGS in the concentrator control circuit 600. More specifically, the abandoned call check is halted in the concentrator control circuit 600 upon the operation of the relays 21HG0, 21VG0, 21VF0 and 21D by enabling a gate circuit 6HG1. The control path for the gate 6HG1 is from ground through a normal contact of relay 10HM and the serially connected operated contacts of relays 21D, 21VF0, 21VG0 and 21HG0 to the control terminal C of the gate 6HG1. The control terminal C of the gate 6HG1 is normally at a negative potential due to its connection through a resistor 6HG0 to a negative battery 6B2. When the gate 6HG1 is enabled, it readies a path from the timing pulse lead 9TP0 of the scanner pulse generator 900 through a lead 6TP0 and the gate 6HG1 to the input terminal S of the flip-flop circuit 6HGS. The next timing pulse through leads 9TP0 and 6TP0 functions to set the circuit 6HGS.

When the flip-flop circuit 6HGS is set it performs the following functions:

(1) It inhibits the gates 6HGS1–3 to open the paths for the scanning pulses to the concentrator 200. The gate 6HGS3 is in the vertical file pulsing path so that the vertical file pulses to the line concentrator 200 are blocked. The abandoned call check is, in this manner, halted by the operation of the flip-flop circuit 6HGS;

(2) It enables the gates 6HGS4–8 in preparation of outpulsing to the concentrator 200;

(3) It operates a check release relay 14CKR in the control circuit 1400 over a path from the output terminal B of the circuit 6HGS through lead 6HGL, which is part of cable 14CA, a varistor 14D8, a resistor 14R1 and the winding of relay 14CKR to a negative battery 14B1. When relay 14CKR operates, it closes another operating path for the timing relay 22TT1 and energizes a lamp 22L6. The operating path for relay 22TT1 is from ground through the winding of relay 22TT1, an operated contact of relay 14CKR and a resistor 22R6 shunted by the lamp 22L6 to the battery 22B20. After a predetermined interval the relay 22TT1 functions to connect the battery 22B20 to the alarm circuit 2204. Relay 14CKR remains operated as long as the circuit 1400 is not returned to normal;

(4) It sets a start flip-flop circuit 14STA in the circuit 1400 by providing a pulse through the lead 6HGL and the capacitor 14C7 to the input terminal S of the circuit 12STA; and (5) It inhibits the gate 8RRS1 in the register 800 to prevent resetting the flip-flop circuit 8RHA prematurely by providing a control potential through leads 6HGL, 14HGL and varistor 8D63 to the control terminal C of the gate 8RRS1. The varistor 8D63 is normally reverse biased by its connection through a resistor 8R40 to battery 8B5.

When the flip-flop circuit 14STA in the control circuit 1400 is set, it functions to ready a path for transmitting timing pulses from the lead 9TP0 of the generator 900 to a lead 17OP of the trunk selector circuit 1700. The pulses to the lead 17OP of the selector circuit 1700 are utilized during the trunk outpulsing sequence. The outpulsing control circuit 1400 also commences vertical group outpulsing upon its operation by the circuit 6HGS in the control circuit 600. As is hereinafter described, the vertical group and trunk outpulsing are concurrent.

When the circuit 14STA is operated, it provides a control potential through a varistor 14D40 to a reset amplifier 14RS. The input terminal of the reset amplifier 14RS is connected through a resistor 14R32 to a negative battery 14B6. The amplifier 14RS functions to insure that the circuit 1400 is normal or ready by providing a reset or normalizing pulse to the circuits 14VFLA, 14CTA, 14ITA and 14RIA and to counters 19VGP and 19VFP in the circuit 1400. The reset pulse is also provided to a flip-flop circuit 13LBA in the memory circuit 1100.

When the flip-flop circuit 14STA operates, it also provides a control potential to enable three gates 14ST1–3 and to disable a gate 14ST4. The next pulse through lead 9TP0 is provided respectively through the enabled gates 14ST3 and 14ST2 to the reset lead 6RSL and to the input terminal S of the flip-flop circuit 14RIA. The reset pulse is provided through lead 6RSL, the gate 6HGS4, the amplifier 6RS, transformer 6T1 and the control pair 4CP1 to reset the counters 4VF and 4VG in the line concentrator 200. When the circuit 14RIA is set, it provides a control potential to the control terminal C of a gate 14RI1 and also through a lead 9TP and a varistor 8D65 to the input terminal S of the flip-flop circuit 8RHA. The circuit 8RHA was set, as described above, by the circuit 6HGT.

The next pulse through lead 9TP0 is gated through the enabled gates 14RI1 and 14ST1 to a read-in amplifier 14RA. The amplifier 14RA generates a pulse which resets the circuit 14STA and which sets two outpulsing counters 19VGP and 19VFP to register respectively the vertical group and vertical file digits to be outpulsed to the line concentrator 200. The same pulse through lead 9TP0 is also routed as a second reset pulse to the line concentrator 200 through the enabled gate 14ST3 as was the preceding reset pulse. In this manner, the next timing pulse after the circuit 14RIA is set performs two functions:

(1) It is sent to the line concentrator 200 to insure it is reset; and (2) It functions as a read-in pulse for the two counters 19VGP and 19VFP.

The counter 14VGP is an eleven-stage counter having stages 19VGP0–9 and 19VD, and counter 19VFP is a five-stage counter having stages 19VFP0–4. Each of the stages 19VGP0–9, 19VD and 19VFP0–4 is a bistable circuit. The read-in pulse from the amplifier 14RA is provided to the input terminals of ten enabling gates 19VG0–9, an enabling gate 19MPD and five enabling gates 19VF0–4. The setting of the counters 19VGP and 19VFP by the read-in pulse is controlled by the relays 21VG0–9 and 21VF0–4 in the control circuit 2100. With relays 21VG0 and 21VF0 operated to identify the calling line 2L00, the read-in pulse from the amplifier 14RA is supplied through the gate 14VG0 to the input terminal of the circiut 19VGP9 and it is also provided through the gate 19VF0 to the input terminal of the circuit 19VFP0. The control terminals C of the gates 19VG0–9 are connected respectively through operated contacts of the relays 21VG0–9 to batteries 19B30–9 and also through resistors 19R0–9 to batteries 19B0–9. The control terminals C of the gates 19VF0–4 are connected respectively through the operated contacts of the relays 21VF0–4 to batteries 19B40–44 and also through resistors 19R10–14 to batteries 19B10–14. The first pulse from the amplifier 14RA functions therefor to read-in the vertical file and vertical group information to the outpulsing counters 19VGP and 19VFP.

The next timing pulse through the lead 19TP0 is routed through the gates 14RI1, 14ST4 and 14LB to the outpulsing amplifier 14OP1 which performs the following functions:

(1) It sets the idle test flip-flop circuit 14ITA if a relay 12TM2 in the memory circuit 1100 is operated;

(2) It applies a pulse through the lead 17OP which is part of cable 17CA to the selector circuit 1700 where it is utilized during the trunk outpulsing sequence;

(3) It steps the vertical group outpulsing counter 19VGP; and (4) It supplies a vertical group pulse towards the line concentrator 200.

The operating path for the flip-flop circuit 14ITA is from the outpulsing amplifier 14OP1 through the enabling gate 14TM2. The enabling gate 14TM2 is normally inhibited due to the connection of its terminal C through resistor 14R16 to the negative battery 14B11. The gate 14TM2 becomes enabled when a relay 12TM2 in the memory circuit 1100 operates to connect the battery 14B12 to the control terminal C of the gate 14TM2. The relay 14TM2, which is a slow operating relay, is operated by the frame control circuit 2100 when relays 21D, 21HG0, 21VG0 and 21VF0 operate. The operating path for relay 12TM2 is from ground through the serially connected operated contacts of relays 21D, 21HG0, 21VG0, 21VF0 and the winding of relay 12TM2 to the battery 12B2. With relay 12TM2 operated so that the gate 14TM2 is enabled, the first pulse from the outpulsing amplifier 14OP1 sets the flip-flop circuit 14ITA. When the circuit 14ITA is set, it provides an enabling potential to a gate 14LB and it operates a relay 14IT, the winding of which is connected between the terminal B of the circuit 14ITA and the battery 14B20. The enabling potential is provided to the control terminal C1 of a gate 14LB. The gate 19LB is a composite gate which is enabled by a control terminal C1 provided that a control potential does not exist at its control terminal C2. As is hereinafter described, the gate 14LB is inhibited by the flip-flop circuit 13LBA in the memory circuit 1100 when a terminating call is initiated to a busy concentrator line.

When the relay 14IT operates, it in turn operates a relay 21IT1 in the frame control circuit 2100 by completing a path from ground through an operated contact of relay 14IT and the winding of relay 21IT1 to a battery 21B8. When the relay 21IT1 operates, it locks to ground through its operated contact and an operated contact of relay 21D. Relay 21IT1 also readies an operating path for a hold magnet 10HM in the trunk switch 1000. The operating path for the hold magnet 10HM is from ground in the line link connector 2010 through the lead LH0, the operated contact of relay 21VF0, the operated contact of relay 21IT1, resistor 10R1 and the winding of the magnet 10HM to a battery 10B1. As is hereinafter described, the hold magnet 10HM is operated by the marker 2008 after the trunk switch 1000 has completed a connection from the selected trunk 4T0 to the originating register 2004.

As described above, the first pulse from the outpulsing amplifier 14OP1 is also provided to the counter 19VGP. The counter 19VGP functions to count up to the vertical group identity. The counter stages 19VGP0–9 are successively operated depending upon which one was set by the read-in pulse from the amplifier 14RA. As described above, with relay 21VG0 operated, the read-in pulse sets the last stage 19VGP9 of the counter 19VGP. When the stage 19VGP9 is set, it blocks the vertical group outpulsing. Since the stage 14VGP9 is set initially to register a vertical group number of 0, no vertical group pulses are supplied to the line concentrator 200. The output terminal 0 of the stage 19VGP9 is connected to the control terminal C of an inhibiting gate 14VG9 and to the control terminal C of an enabling gate 14VGP9. The gate 14VG9 is in the vertical group outpulsing path to the line concentrator 200. The vertical group outpulsing path is readied from the outpulsing amplifier 14OP1 through the gate 14TSK2, the gate 14VG9, an amplifier 14VGP, lead 6VGL which is part of the cable 14CA, the enabled gate 6HGS5, the amplifier 6VG, the transformer 6TR1 and the control pair 4CP1 to the line concentrator 200. For any other vertical group except 0 the counter 19VGP does not disable the gate 14VG9 initially so that vertical group pulses are provided to the concentrator 200. The stages 19VGP0–9 of the counter 19VGP are connected in a chain by the enabling gates 19VD and 19VP0–8. As each of the stages 19VGP0–8 is set, it enables the associated one of the gates 19VP0–8 so that the next pulse sets the adjacent stage. The stepping sequence always ends when the stage 19VGP9 is set because then the gates 19VD and 19VP0–8 are disabled.

The gate 14VGP9, which is enabled by the stage 19VGP9, is in the vertical file outpulsing path to the line concentrator 200. The vertical file pulses are not provided, however, to the line concentrator 200 until bother vertical group outpulsing and trunk outpulsing are completed.

As described above, the trunk outpulsing is initiated when the pulses are provided from the outpulsing amplifier 14OP1 through lead 17OP, which is part of the cable 17CA, to the trunk selector circuit 1700. The trunk selector circuit 1700 includes stepping circuits, not shown, which function to provide a number of pulses to lead 17M to identify the selected trunk 4T0. One pulse is provided to identify trunk 4T0; two pulses are provided to identify trunk 4T1, etc. The lead 17M from the trunk selector circuit 1700 is connected through the cable 17CA, varistor 14MG, an inhibiting gate 14CK2, an amplifier 14MP, lead 6ML, which is part of cable 14CA, the enabled gate 6HGS7, an amplifier 6M, the transformer 6TR2 and the control pair 4CT2 to the line concentrator 200. In this manner the vertical group pulses are provided through the control pair 4CP1 concurrent to the supply of the trunk identifying pulses through the control pair 4CP2.

When the outpulsing sequence is completed in the trunk selector circuit 1700, a relay 17OFL1 is operated. In effect, since in the illustrative example being described trunk 4T0 is selected, the first pulse through lead 17OP from the circuit 1400 causes the operation of the relay 17OFL1. When the relay 17OFL1 operates, it connects a control potential through lead 17OFL, which is part of the cable 17CA, to the control terminal C of an enabling gate 14OFL1. When the gate 14OFL1 is enabled, it completes the vertical file pulsing path from the outpulsing amplifier 14OP1 to the line concentrator 200. The vertical file pulsing path from the amplifier 14OP1 is through the enabled gates 14VGP9 and 14OFL1 an amplifier 14VFP1, an inhibiting gate 14VF5, an amplifier 14VFP2, lead 6VFL, which is part of cable 14CA, the enabled gate 6HGS6, the amplifier 6VF, the transformer 6TR2 and the control pair 4CP2 to the line concentrator 200.

As described above, when the vertical file identity is read into the counter 19VFP, the stage 19VFP0 is set. With both vertical group pulsing and trunk pulsing completed, the pulse from the outpulsing amplifier 14OP1, that is supplied as a vertical file pulse to the line concentrator 200, is also supplied to the vertical file counter 19VFP. More specifically, the pulse from the amplifier 14OP1 is provided through the enabled gates 14VGP9 and 14OFL1 and the amplifier 14VFP1 to the enabling gates 19VFP0–3 of the counter 19VFP. With stage 19VFP0 set only the gate 19VFP0 is enabled. The gate 19VFP0 is in the operating path for the stage 19VFP1 so that it is set by the first pulse from the amplifier 14OP1. This operation is repeated on each succeeding pulse until the stage 19VFP4 is set. With the stage 19VFP0 being initially set, four vertical file pulses are provided to the counter 19VFP before the stage 19VFP4 is set. These pulses are also supplied through the control circuit 600 to the line concentrator 200. When the stage 19VFP4 is set, it enables a gate 14VF4 and it disables the gate 14VF5 in the vertical file outpulsing path. In this manner, when the stage 14VFP4 is set, it blocks the vertical file pulsing to the line concentrator 200. Actually, except for vertical file 0, the counter 19VFP allows a number of vertical file pulses to be transmitted to the concentrator 200, which is one less than the vertical file identity. For example, if the vertical file identity is 4, three vertical file pulses are provided. When the vertical file identity is 0, four vertical file pulses are provided under control of the counter 19VFP.

The next timing pulse from the amplifier 14OP1 is provided through the enabled gates 14VGP9 and 14OFL1, the amplifier 14VFP1 and the now enabled gate 14VF4 to the input terminal S of a flip-flop circuit 14VFLA. When the circuit 14FLA operates, it in turn operates an associated relay 14VFL and it provides another vertical file pulse to the line concentrator 200. The winding of the relay 14VFL is connected between the battery 14B23 and the output terminal B of the circuit 14VFLA. The additional vertical file pulse is provided from the output terminal 0 of the circuit 14VFLA through the inhibiting gate 14MPD1, a capacitor 14C9 to the vertical file outpulsing amplifier 14VFP2. The final pulse, therefore, identifying the vertical file is supplied from the circuit 14VFLA instead of from the counter 19VFP. For a vertical file identity of 0 a total of five pulses is provided to the line concentrator 200.

In this manner, the vertical group and trunk identities are first pulsed to the line concentrator 200 and thereafter the vertical file identity is pulsed thereto. During the outpulsing sequence the memory circuit is operated to register the outpulse identity. As is hereinafter described, when the memory sequence is completed, a gate 14MCK1 in the control circuit 1400 is enabled to ready a path for operating a flip-flop circuit 14MA which initiates a mark pulse sequence for closing the crosspoints between the line 2L00 and the trunk 4T0.

At the concentrator 200 the outpulsed information is registered by the counters 4VF, 4VG and 3TK. The vertical group counter 4VG remains set at its stage 0 because no vertical group pulses are provided from the central office to identify the vertical group 0 of the calling line 2L00. Five vertical file pulses are provided through the control pair 4CP2 and the amplifier 4VFR to the input terminal S of the ring counter 4VF. The ring counter 4VF is, in this manner, operated or stepped through one cycle to return it to stage 0. The single trunk pulse identifying trunk 4T0 is provided through the control pair 4CP2, the amplifier 4MPR, the inhibiting gate 4TKB1, the amplifier 4TK and varistor 3V1, which is connected through resistor 3RE, to battery 3B1, to the input terminal S of a flip-flop circuit 3TC in the trunk counter 3TK. The trunk counter 3TK has eleven stages 3TC and 3TK0–9 which are flip-flop circuits and which are all normally in their reset condition. When the flip-flop circuit 3TC sets, it provides an operating potential through the varistor 3V2, which is connected through resistor 3R0 to battery 3B0, to the input terminal S of the stage or circuit 3TK0. The flip-flop circuit 3TC also provides an enabling potential to the control terminal C of a gate 5TCG to ready a path for the flip-flop circuit 5TKB.

The trunk counter 3TK is generally similar to the counters 4VF and 4VG except for the fact that normally all stages 3TC and 3TK0–9 are normally reset. These stages are reset to eliminate a current drain required to maintain the stage in the on condition. Since the trunk counter 3TK is not utilized during the normal scanning sequence, it is maintained in a reset condition until operated by the first trunk pulse from the central office during the sequence for establishing a connection to one of the lines 2L00, etc.

As described above, the vertical group outpulsing sequence and the trunk outpulsing sequence are concurrent with the vertical file outpulsing sequence following. The first vertical file pulse in addition to operating the ring counter 4VF is also provided from the amplifier 4VFR through the enabled gate 5TCG to the input terminal S of the flip-flop circuit 5TKB. When the circuit 5TKB is set, it provides a control potential through varistor 5V4 to the control terminal C of the inhibiting gate 4TKB1 to block pulses to the trunk counter 3TK. When the circuit 5TKB is set, it also enables a gate 5TKB2 so that succeeding pulses from the amplifier 4MPR will operate the flip-flop circuit 5MA. The mark pulses are not supplied from the central office until after the completion of the vertical file outpulsing sequence and also not until the completion of the registration of the line and trunk identities in the memory circuit 1100.

Figure 12:
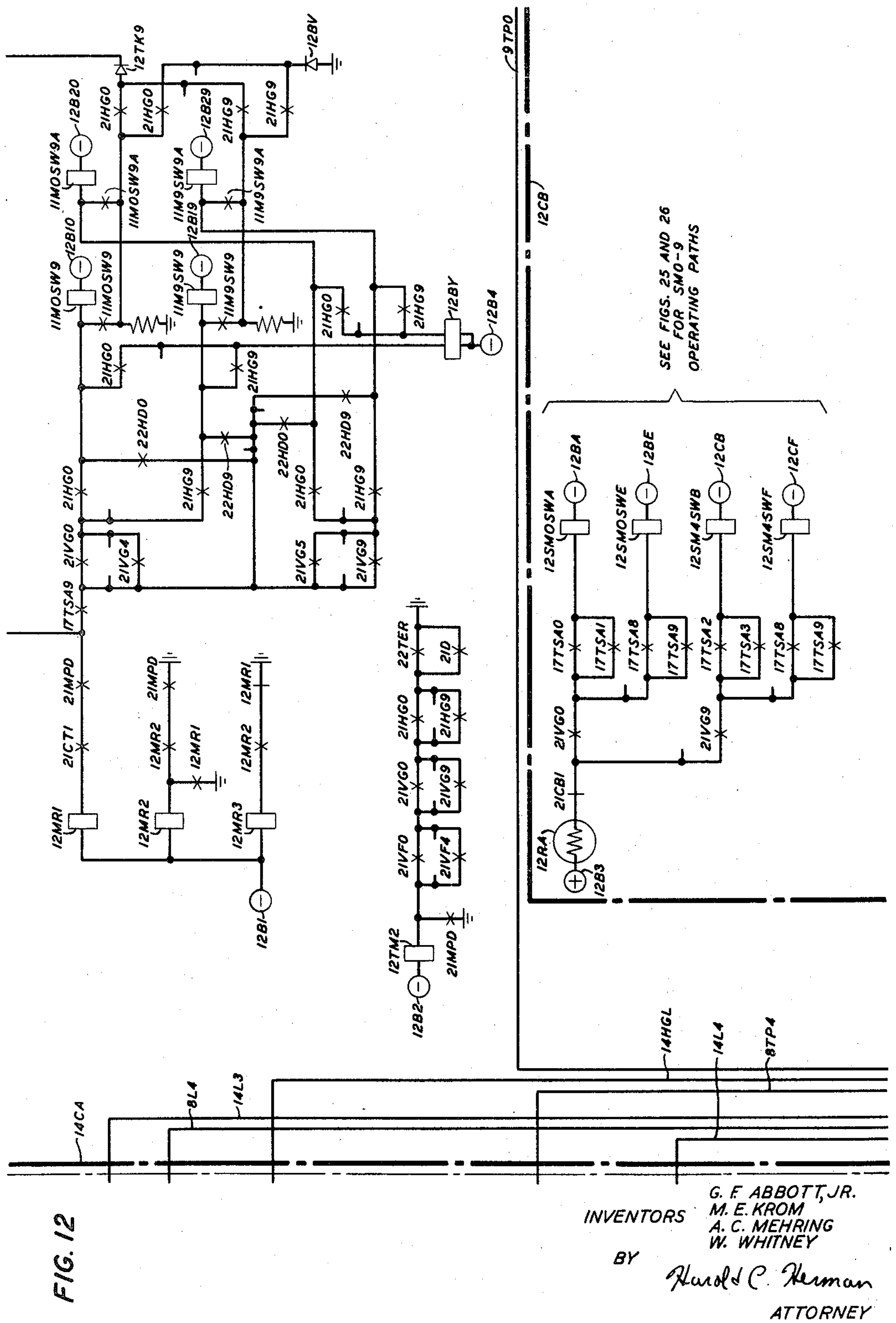

The memory circuit 1100 is operated when the marker 2000 obtains access to the frame control circuit 2100 and operates the relays 21HG0, 21VF0 and 21VG0. In other words, at the same time that the trunk selection sequence is initiated, the memory circuit 1100 is readied for registering the line and selected trunk identities. When the relay 17TSA0 in the trunk selector circuit 1700 is operated to indicate the selection of trunk 4T0 for the originating connection, a select magnet 12SM0SWA in the memory circuit 1100 is operated. As described above, the memory circuit includes six twenty by ten crossbar switches 13SWA–F which keep track of the connections established through the line concentrators 200–9. The crossbar switch 13SWA includes two sections or switches 13SW0 and 13SW1 as shown both in Fig. 13 and in Fig. 27 which illustrates the assignments of trunks to the switches 13SWA–F. The switch 13SWA is utilized when either trunk 4T0 or 4T1 for any of the concentrators 200–9 is selected. The operating path for the select magnet 12SM0SWA of the crossbar switch 13SWA is from battery 12B3 through the resistor 12RA, a normal contact of relay 21CB1, an operated contact of relay 21VG0, an operated contact of relay 17TSA0 and the winding of the magnet 12SM0SWA to the battery 12BA. Figs. 25 and 26 tabulate the connections for the six sets of select magnets of the switches 13SWA–F. For example, the operating path just described for the select magnet 12SM0SWA is illustrated in the top line of the table in Fig. 25. The indicated operating path is through an operated contact of relay 21VG0, an operated contact of either the relay 17TSA0 or 17TSA1, the winding of the select magnet 0 of switches 13SW0 and 13SW1 of the switch 13SWA. In other words, Figs. 25 and 26 provide the operating paths for all the select magnets in tabulated form. Fig. 12 only illustrates some of these operating paths.

As described above, each hold magnet of the switches 13SWA–D represents an individual concentrator trunk 4T0–9. A complete record of the call is represented by one vertical of the switches 13SWA–D. If trunk 4T8 or 4T9 is selected for the call, two verticals are utilized because twice as many crosspoints are required as these trunks are connectable to all ten vertical groups instead of just five. As hereinafter described, the vertical group information relating to a busy line is stored on the first five levels of the switch vertical and varies in accordance with the identity of the selected trunk. The vertical file information relating to the calling line is stored on the last four levels 6–9 in a manner illustrated in Fig. 26. For example, for a vertical file of 0 and a selected trunk 4T0, the select magnet 12SM9SWA on the last level is operated. In this manner, two crosspoints are closed; one for the vertical group and one for the vertical file. Only two crosspoints are closed if the file number of the line is 0, 1 or 2 and three crosspoints are closed if the file number is 3 or 4. This is apparent from a consideration of Fig. 26. If the vertical file number is 3, for example, the select magnets 12SM9SWA and 12SM6SWA are operated.

For the illustrative call being described herein which originates at line 2L00, the select magnet 12SM0SWA is operated to identify the vertical group 0 and the select magnet 12SM9SWA is operated to identify the vertical file 0. With these two select magnets operated, when the relay 14IT in the outpulsing control circuit 1400 operates, the memory hold magnet 11M0SW0 of switch 13SWA is operated. As described above, the relay 14IT is operated in the circuit 1400 when the trunk outpulsing and vertical group outpulsing sequences are initiated. Since the selected trunk for the originating call is trunk 4T0, as described above, the hold magnet 11M0SW0 of the switch 133W0 associated therewith is operated. The hold magnet 11M0SW0 is individually associated with the trunk 4T0 of the line concentrator 200. As described above, one hold magnet is provided for each of the trunks 4T0–7 of each of the line concentrators 200–9. The operating path for the hold magnet 11M0SW0 is from battery 11BA through the resistor 11LA, an operated contact of relay 21IT1 (operated by the relay 21IT), a normal contact of a relay 11MCK, an operated contact of relay 21VF0, an operated contact of the select magnet 12SM9SWA, an operated contact of the select magnet 12SM0SWA, an operated contact of the relay 17TSA0 through an operated contact of relay 21HG0 and the winding of the hold magnet 11M0SW0 to the battery 11B0. The contacts of the select magnets in the hold magnet operating paths provide a check of the operation of the registration of the vertical group and vertical file identities in the memory circuit 1100.

When the hold magnet 11M0SW0 operates, it locks to ground through its operated contact and a 500-ohm resistor 11R0, it readies a path for setting a flip-flop circuit 13LBA and it operates a memory check relay 11MCK which indicates the successful storage of the line and trunk information. The operating path for the relay 11MCK is from the winding of the hold magnet 11M0SW0 which is at a positive potential through the operated contact of the magnet 11M0SW0, an operated contact of the relay 21HG0, a varistor 11TK0 and one of two windings of the relay 11MCK to ground. When the relay 11MCK operates, it closes an operating path through its other winding from ground through an operated contact of relay 21D to a negative battery 11BC. The diode or varistor 11TK0 in series with one of the windings of the relay 11MCK permits the operation of the relay 11MCK only from the plus 130-volt potential source 11BA which is used to operate the hold magnet 11M0SW0. The hold magnet 11M0SW0 remains operated storing the line and trunk information until, as is hereinafter described, the subscriber of station 2S00 disconnects.

Figure 13:
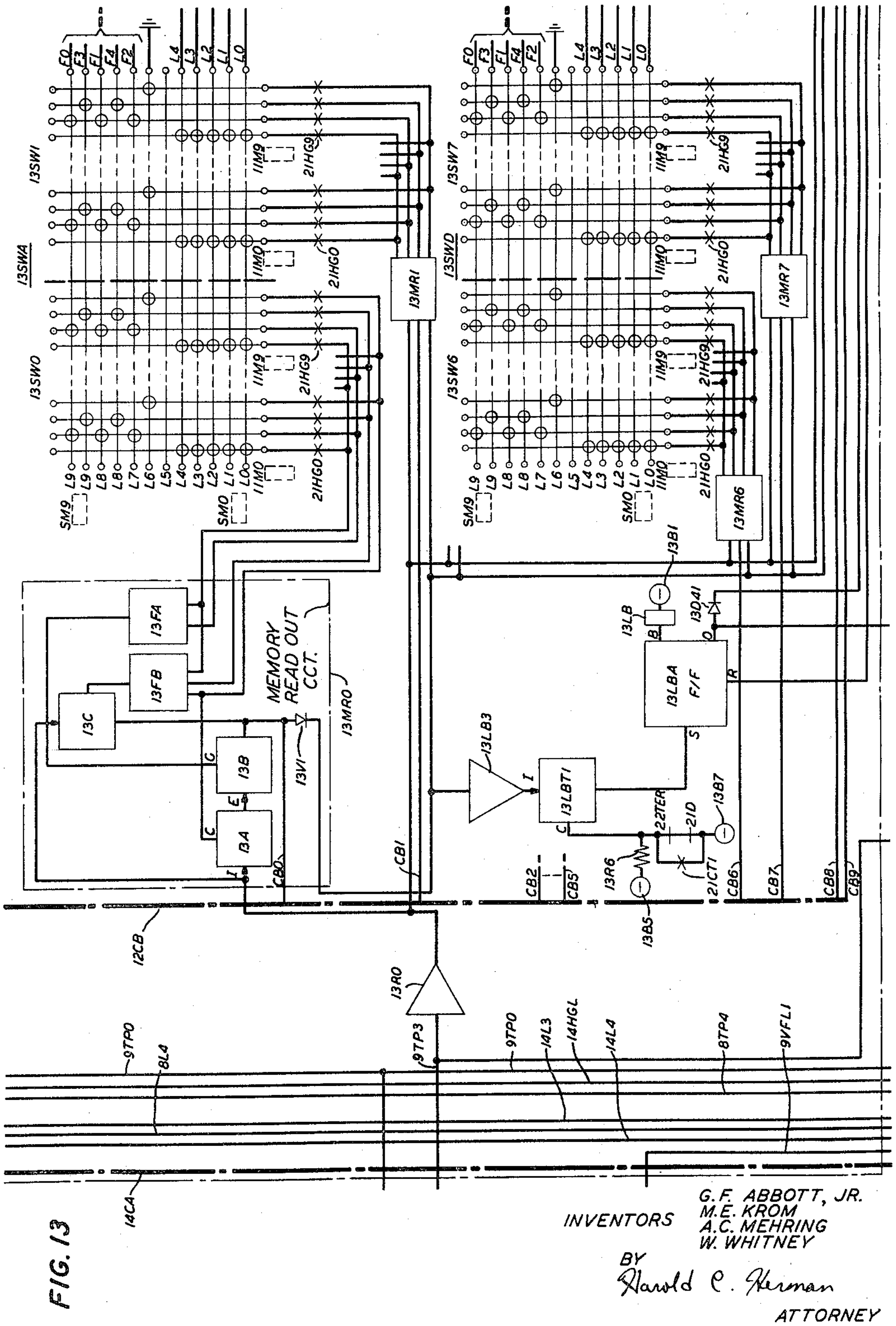
Figure 14:
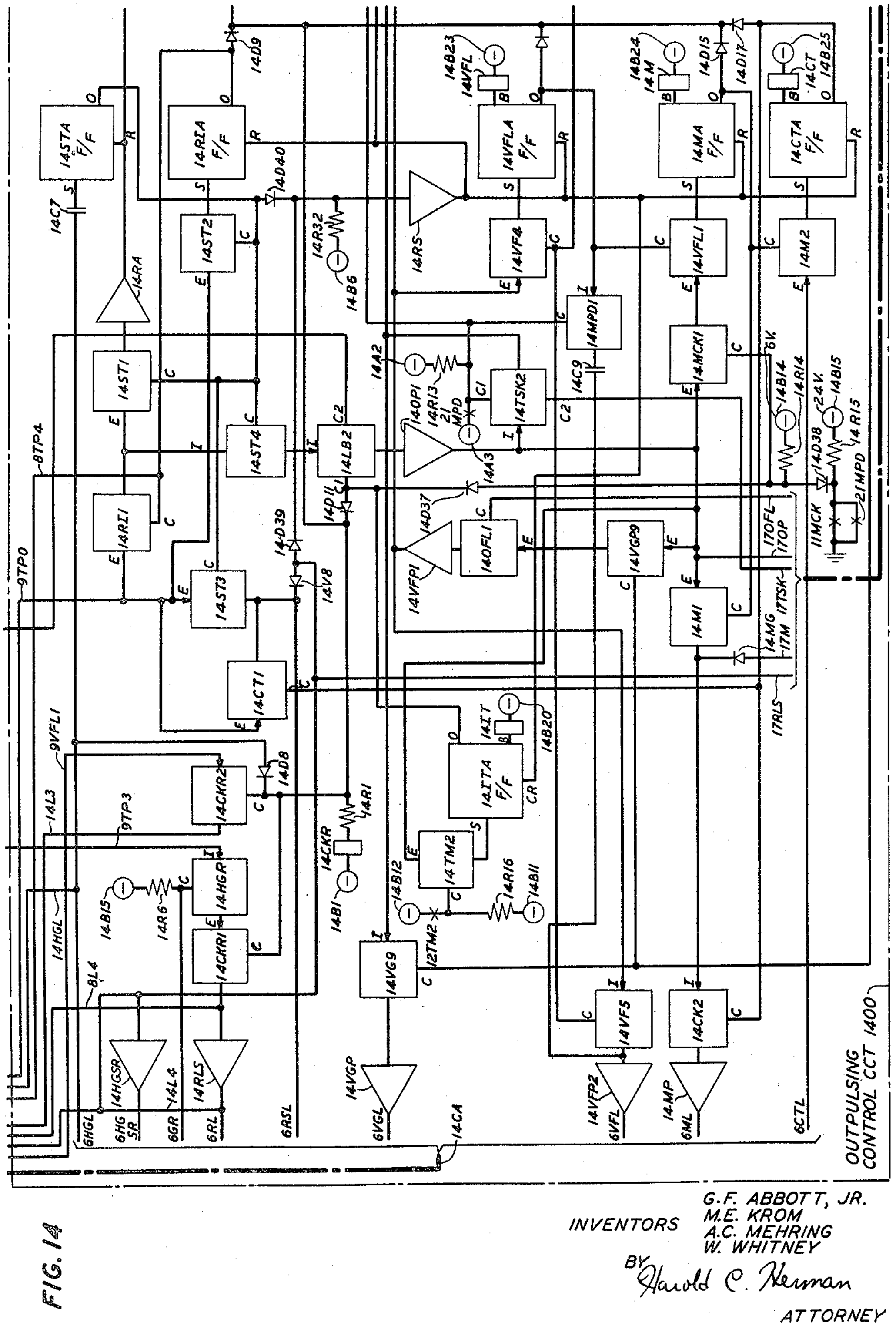

When the hold magnet 11M0SW0 operates, it also readies a path through a memory read-out circuit 13MR0 to the flip-flop circuit 13LBA. There are ten memory read-out circuits 13MR0–9 in the memory circuit 1100 each of which is associated with ten trunks having similar designations but connected respectively to the concentrators 200–9. For example, the memory read-out circuit 13MR0 is associated with the ten trunks 4T0 connected respectively to the concentrators 200–9. The memory read-out circuits 13MR0–9 are multipled through to a line busy amplifier 13LB3 and a gate 13LBT1 to the circuit 13LBA. As described above, the memory circuit 1100 includes six twenty by ten crossbar switches 13SWA–F. Each of the trunks 4T0–7 of each of the concentrators 200–9 is associated with one of the verticals of the switches 13SWA–D. Fig. 27 illustrates the assignment of switches to trunks. The hold magnets identify the line concentrators 200–9 to which the trunks are assigned. For example, in switch 13SWA, the hold magnet 11M0SW0 is associated with trunk 4T0 of the line concentrator 200. For trunks 4T8 and 4T9 of the conentrators 200–9 two verticals of the switches 13SWE–F are assigned instead of one because these trunks are connected to all ten vertical group. With the relay 21HG0 operated, the verticals of the switches 13SWA–F which are associated with the line concentrator 200 are selected. For example, as shown in Fig. 13, relay 21HG0 connects the four leads of the 0 vertical of switch 13SW0 to the memory read-out circuit 13MR0. The other nine verticals of the switch 13SW0 remain unconnected to the memory read-out circuit 13MR0.

The function of the read-out circuits 13MR0–9 is to interpret the information that has been stored in the memory switches 13SWA–F. Each of the memory read-out circuits 13MR0–9 includes a two-terminal And gate 13FA and a three-terminal And gate 13FB which are respectively enabled when all their input terminals are at ground potential. When either of the And gates 13FA or 13FB is enabled, it in turn enables, respectively, gates 13B and 13C. There are four input leads A through D which are connected to the terminals of the And gates 13FA–B; the input terminal A being multipled to both And gates 13FA–B; the input lead B to the gate 13FA; and the input leads C and D to the gate 13FB. The input leads A–D are connected by the operated contacts of the relay 21HG0 to the vertical associated with trunk 4T0 in the switch 13SW0. The voltage upon the leads A to D of each read-out circuit 13MR0 depends upon the state of the switches 13SWA–F and the number of the concentrator line. With the switch 13SWA operated due to the operation of the select magnets 12SM0SWA and 12SM9SWA and the hold magnet 11M0SW0, two paths through the switch 13SWA to the leads A–D are completed. Ground potentials are provided to a combination of the input leads A through D of the read-out circuit 13MR0 in accordance with the identity of the calling line. The following table indicates which leads are grounded and which gates in the memory read-out circuit 13MR0 are enabled.

| The Vertical File Number | Potential | | | | Enabled Gates |
|---|---|---|---|---|---|
| | A | B | C | D | |
| 0, 1 or 2 | Ground | | | Ground | FA, B, A |
| 3 or 4 | | Ground | Ground | Ground | FB, C |

Figure 18:
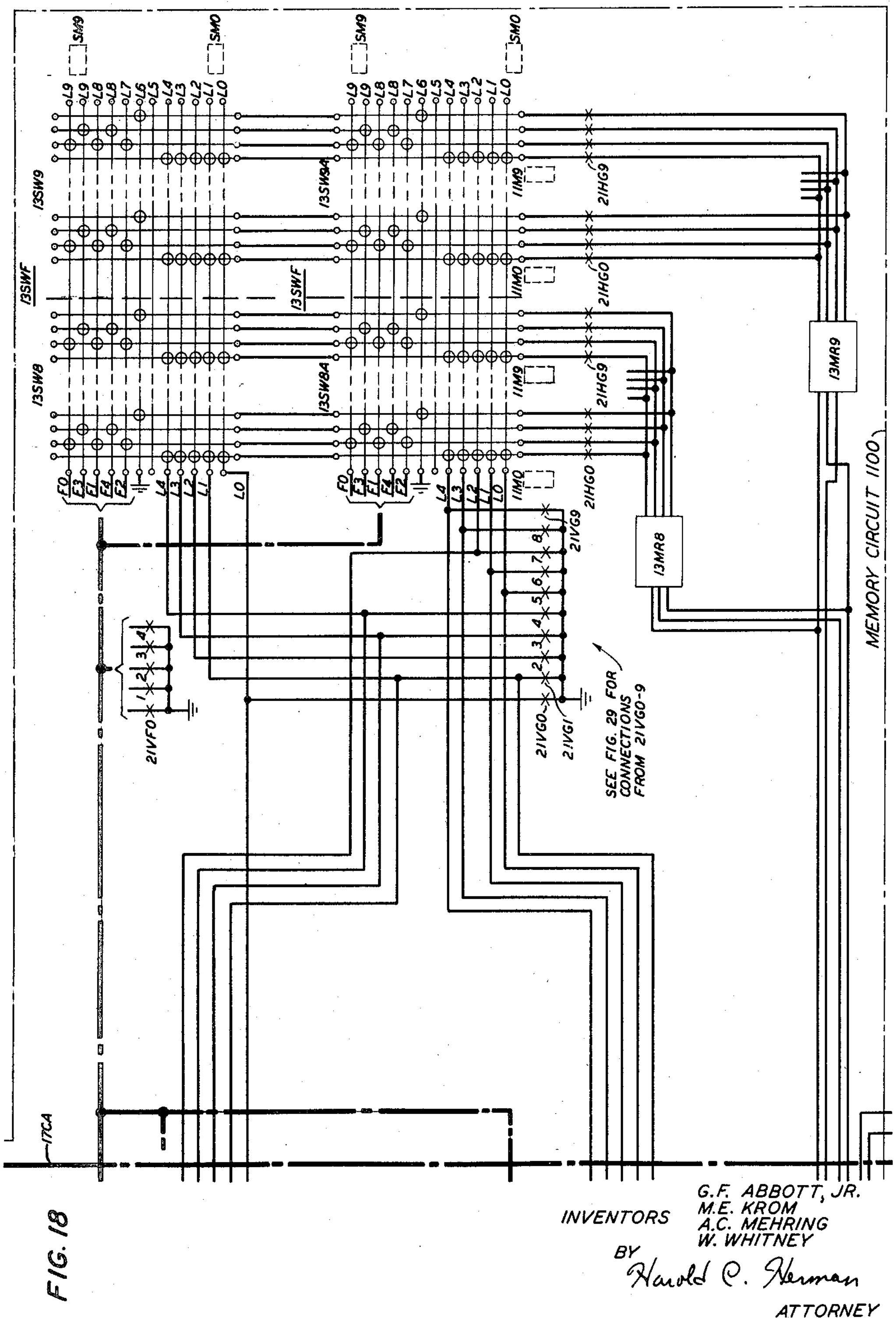
Figure 19:
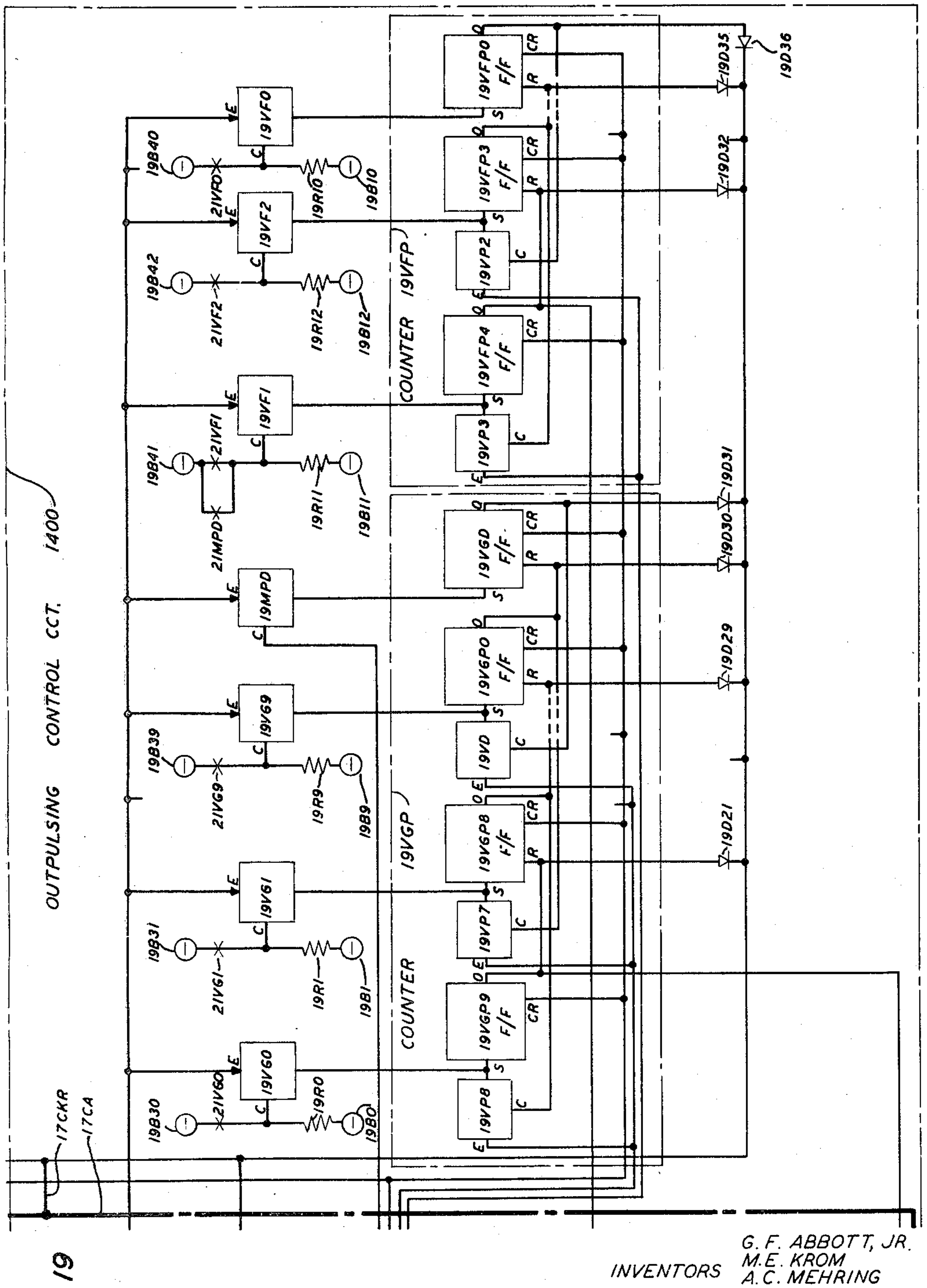

With relays 21VF0 and 21VG0 operated, paths are closed from ground, as shown in Fig. 18, to the horizontals of the crossbar switch 13SWA. More specifically, ground is provided through an operated contact of relay 21VF0, lead F0 of the switch 13SWA through the operated crosspoint furthest to the left on level 9 (designated at the left), an operated contact of relay 21HG0 to lead B of the memory read-out circuit 13MR0. Ground through an operated contact of relay 21VG0 is connected through an operated crosspoint on level 0 of the switch 13SWA and an operated contact of relay 21HG0 to the lead A of the circuit 13MR0. The table shown in Fig. 29 illustrates the connections from the grounded contacts of relays 21VG0–9 in Fig. 18 to the horizontals of the crossbar switches 13SWA–F. An output pulse is provided through a varistor 13V1 in the memory read-out circuit 13MR0 to the line busy amplifier 13LB3 when a gate 13C is enabled or when two gates 13A and 13B are enabled. The gate 13A is an inhibiting gate which remains enabled as long as a control potential is not provided thereto. With ground potential upon leads A and B, the And gate 13A is enabled to in turn enable the gate 13B. The inhibiting gate 13A remains enabled to complete a path from a lead 9TP3 of the pulse generator 900, a read-out amplifier 13R0 and the circuit 13MR0 to the amplifier 13LB3.

The memory check pulse to the amplifier 13LB3 is provided through the inhibiting gate 13LBT to the input terminal S of the flip-flop circuit 13LBA. When the circuit 13LBA operates, it in turn operates its associated relay 13LB and it inhibits a gate 14LB2 in the outpulsing control circuit 1400 to open the outpulsing path from the circuit 1400. When the relay 13LB operates, it in turn operates a relay 21LB1 in the frame control circuit circuit 2100. The operating path for the relay 21LB1 is from ground through an operated contact of relay 13LB and the winding of relay 21LB1 to battery 21B7. When the relay 21LB1 operates, it locks to ground through its operated contact and an operated contact of the relay 21D. As described above, an operated contact of relay 21LB1 is part of the operating path from the lead LH0 to the hold magnet 15T00 of the crossbar switch 15SW0.

When the relay 11MCK operates, it also enables a gate 14MCK1 in the control circuit 1400 to initiate the mark outpulsing for closing the concentrator crosspoints. The control terminal C of the gate 14MCK1 is normally at a negative potential due to its connection through a resistor 14R14 to a battery 14B14. When the relay 11MCK operates, it provides a connection from the control terminal C of the gate 14MCK1 through a varistor 14D38 and an operated contact of relay 11MCK to ground. The varistor 14D38 is connected to a battery 14B14 through a resistor 14R15. When the gate 14MCK1 is enabled it readies a path from the outpulsing amplifier 14OP1 to the input terminal S of a flip-flop circuit 14MA. The set path for the circuit 14MA is through the enabled gate 14MCK1 and the enabled gate 14VFL1. The next timing pulse provided through the amplifier 14OP1 sets the mark flip-flop circuit 14MA which operates an associated relay 14M and which enables two gates 14M1 and 14M2. Relay 14M is operated as its winding is connected between the output terminal B of the circuit 14MA and a battery 14B24. The output terminal 0 of the circuit 14MA is connected to the control terminals C of the gates 14M1 and 14M2. The succeeding timing pulses are supplied from the outpulsing amplifier 14OP1 through the now enabled gate 14M1, the inhibiting gate 14CK2, the amplifier 14MP, lead 6ML, which is part of cable 14CA, the gate 6HGS7, amplifier 6M and the control pair 4CP2 to the line concentrator 200. In the line concentrator 200 the mark pulses function to establish a connection from the calling line 2L00 to the selected trunk 4T0. As is hereinafter described, the mark pulses are supplied to the concentrator 200 until a crosspoint closure indication is received at the control circuit 1400 from the concentrator 200.

In the concentrator 200 the mark pulses are provided through the amplifier 4MPR, the enabled gate 5TKB2 to the input terminal S of the flip-flop circuit 5MA. The circuit 5MA is set by the first mark pulse applied at its input terminal S. When the circuit 5MA is set, it operates a relay 5M, the winding of which is connected between the output terminal B of the circuit 5MA and through a resistor 5R1 shunted by a capacitor 5C1 to a battery 5B5. An output potential is also provided from the putput terminal 0 of the the circuit 5MA to an amplifier 5DR which provides a reset potential to the flip-flop circuit 5DA. Only one of the circuits 5DA and 5MA is set at any time. When either sets, to insure that the other is reset, it provides a reset potential thereto. When the relay 5M operates, it in turn causes the operation of a relay 5M1. The operating path for relay 5M1 is from ground through an operated contact of relay 5M and the winding of relay 5M1 to battery 5B6. When relay 5M operates, it also connects the minus 24-volt source 4B1 through a resistor 3TKL to the windings of the ten trunk register relays 3TKR0–9. When relay 5M1 operates, it connects the battery 4B1 respectively through resistors 4RF and 4RV to the windings of the register relays 4VFR0–4 and 4VGR0–9.

With the counters 4VF, 4VG and 3TK set to identify line 2L00 and trunk 4T0, the relays 4VFR0, 4VGR0 and 3TKR0 are operated. When the relays 3TKR0, 4VFR0 and 4VGR0 operate, they in turn operate similarly numbered relays 5TKA0, 3F0 and 3G0. The operating path for relay 5TKA0 is from ground through an operated contact of relay 3TKR0 and the winding of relay 5TKA0 to battery 5B6. The operating path for the relay 3G0 is from ground through an operated contact of relay 4VGR0 and the winding of relay 3G0 to battery 3B5. A similar operating path is provided for the relay 3F0 through an operated contact of relay 4VFR0. When the relays 3F0 and 3G0 are operated, operating paths are completed for the crosspoint relays 5TG00 and 5TF00 and for releasing the relays 5C00 and 5CK1. The operating path for the relay 5TG00 is from ground through an operated contact of relay 5M1, the winding of relay 5TG00, an operated contact of relay 3G0, an operated contact of relay 5TKA0 and an operated contact of relay 5M1 to the battery 5B7. A similar operating path is provided for the relay 5TF00 through an operated contact of relay 3F0 and for the serially connected relays 5CK1 and 5C00 through an operated contact of relay 3F0 and an operated contact of relay 3G0.

The relays 5TF00, 5TG00 and 5C00 are magnetically latched relays of the type disclosed in the copending patent application Serial No. 697,465 filed by G. E. Perreault on November 19, 1957. The relays require a definite release potential as they remain operated in the absence of applied potential. Even in the absence of operating current, a current of reverse polarity to the operating current is required to release relays 5TF00, 5TG00 and 5C00. The relay 5C00 is normally operated being also of the latching type and, as is hereinafter described, is operated at the same time that the relays 5TF00 and 5TG00 are released. When the relay 5C00 releases, it disconnects the transistor scanning unit 2LSG0 from the line 2L00 so that line 2L00 is not scanned as long as the relay 5C00 is released and a clear tip and ring from the station 2S00 can be provided to the central office. Relay 5CK1 operates at the same time that the relay 5C00 releases.

When the relays 5TF00, 5TG00 and 5CK1 operate, a control path is completed for enabling a gate 5CT1. The control terminal C of the gate 5CT1 is normally at a relatively negative potential due to its connection through resistor 5T5 to battery 5B1. At the same time that a connection is established from line 2L00 to trunk 4T0 through contacts of relays 5TF00 and 5TG00, a control path is completed from battery 5B2 through an operated contact of relay 5M1, an operated contact of relay 5CK1, an operated contact of relay 5TKA0, an operated contact of relay 5TF00, an operated contact of relay 5TG00, an operated contact of relay 5TKA0 to the control terminal C of the gate 5CT1. The next mark pluse from the amplifier 4MPR is provided through the gate 5CT1, the amplifier 4CTT, the transformer 4TR1 and the control pair 4CP1 to the central office. In the central office this connect check pulse functions to block the mark pulses to the concentrator 200. This signal, in combination with an indication, hereinafter described, that the marker 2008 has applied ground to operate the trunk switch 1000, causes the control circuit 1400 to initiate a reset sequence returning the central office and the concentrator 200 to normal.

The connect check pulse from the concentrator 200 is supplied through the transformer 6TR1, the amplifier 6CT, the enabled gate 6HGS8, lead 6CT, which is part of cable 14CA, and the enabled gate 14M2 to set the flip-flop circuit 14CTA. When the circuit 14CTA is set, it operates the associated relay 14CT, the winding of which is connected between terminal B of the circuit 14CTA and a battery 14B25. When the relay 14CT operates, it in turn causes the operation of a relay 21CT1 in the frame control circuit 2100. The operating path for the relay 21CT1 is from ground through an operated contact of relay 14CT and the winding of relay 21CT1 to a battery 21B9. When the relay 21CT1 operates, it locks to ground through its operated contact and an operated contact of relay 21D.

When the circuit 14CTA is set, it also provides an inhibiting potential from its output terminal 0 to the control terminal C of the inhibiting gate 14CK2 to block the mark pulses to the concentrator 200. A control potential is also provided from the output terminal 0 of circuit 14CTA to the control terminal C of an enabling gate 14CT1. When the gate 14CT1 is enabled, succeeding timing pulses through lead 9TP0 from the pulse generator 900 are provided through lead 6RSL, which is part of cable 14CA, the enabled gate 6HGS4, the reset amplifier 6RS and transformer 6TR1 to the line concentrator 200. The reset pulses function to reset the line concentrator 200 to normal. In the line concentrator 200 the reset pulses are provided through the transformer 4TR1 and the amplifier 4RSR to reset the counters 4VF, 4VG and 3TK and to reset the circuits 5MA and 5TKB. The reset paths for these components are described above during the normal scanning sequence.

Figure 10:
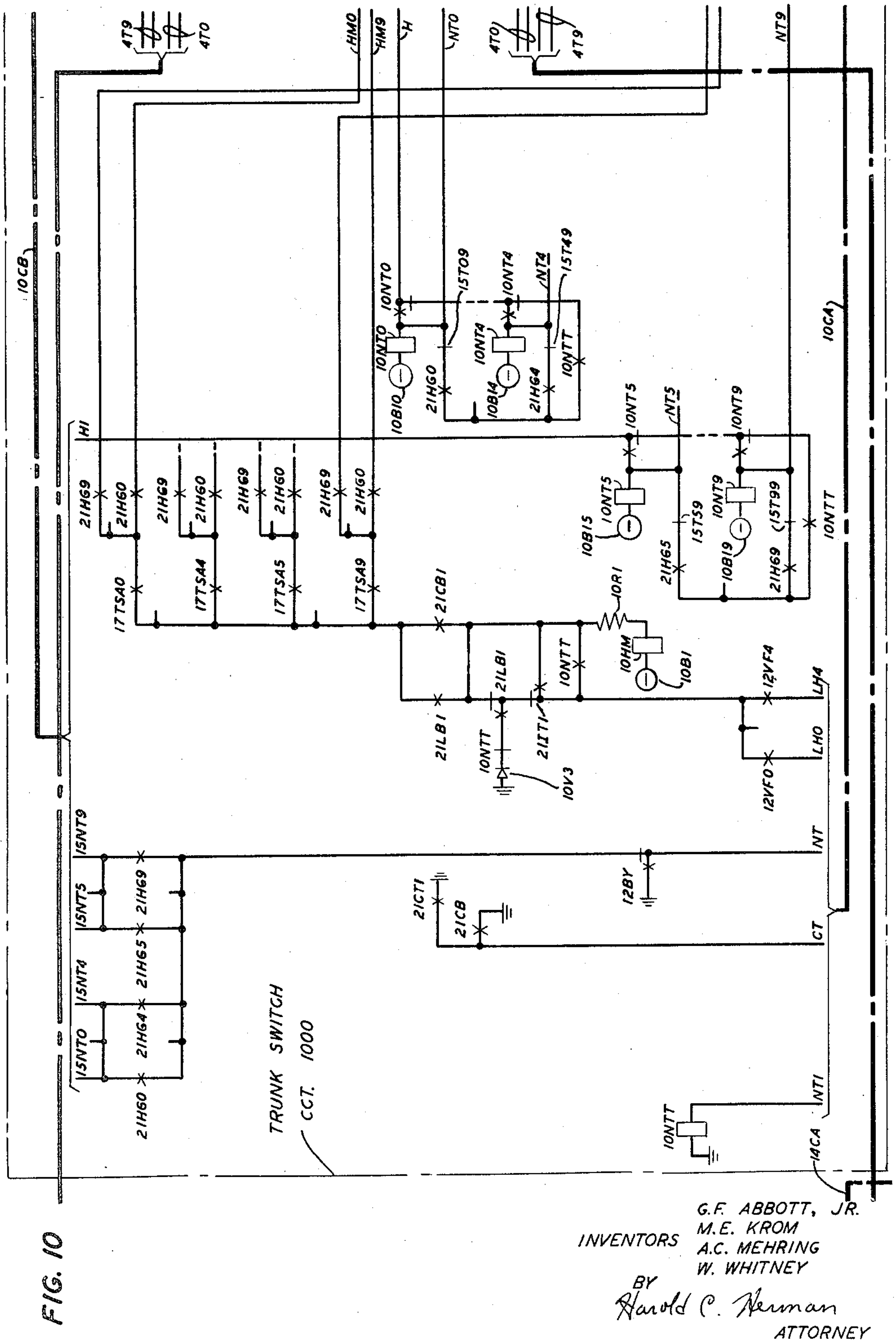
Figure 11:
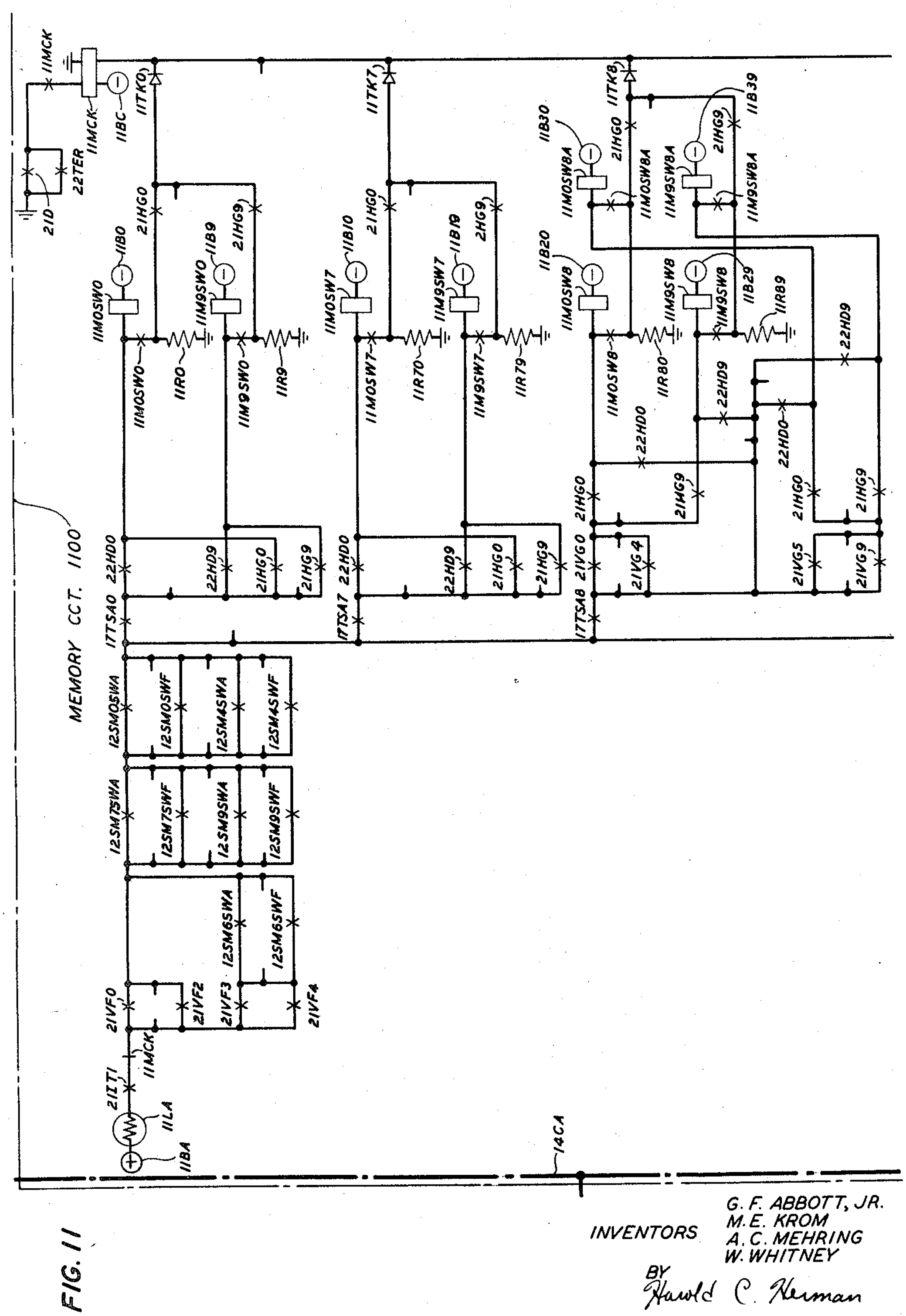

When the relay 21CT1 operates, it extends a ground connection in Fig. 10 through its operated contact and a normal contact of relay 10LIT to the connect lead CT of the line link connector 2010 as an indication that cross-point closure has been established in the concentrator 200. Failure to get this indication within a predetermined interval causes the marker 2008 to take a trouble record before disconnecting.

Figure 15:
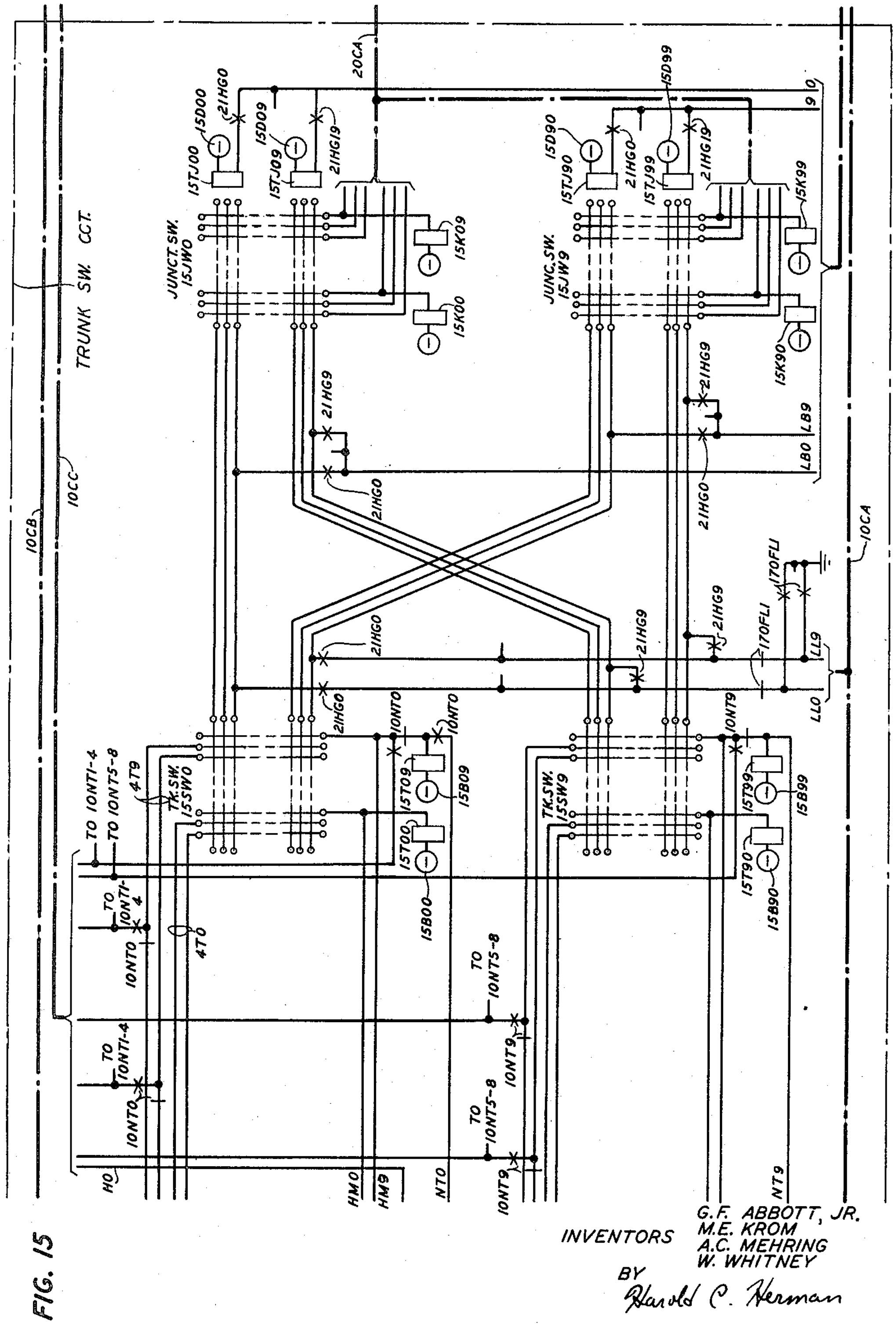

During the time that the connection is being established in the concentrator 200 a connection is also being established in the trunk switch 1000 to the other end of the selected trunk 4T0. When the marker 2008 seizes the frame control circuit 2100 and operates the relay 21HG0, leads LL0–9 in Fig. 15 are extended to the sleeve leads of the horizontals of the crossbar switches 15SW0–9 and 15JW0–9. The trunk switch 1000 includes ten trunk switches 15SW0–9 and ten junctor switches 15JW0–9 connected in a conventional crossbar system of the type described in the above-identified Busch patent. When the relay 21HG0 operates, it connects the leads LL0–9 to the sleeve leads of the ten horizontals of the switch 15SW0. The switches 15SW0–9 are connected respectively to the ten sets of trunks 4T0–9 associated individually with the ten concentrators 200–9. In other words, the switches 15SW0–9 are associated individually with the concentrators 200–9. When relay 21HG0 is operated, it extends connections only from the crossbar switch 15SW0 to the leads LL0–9. The ten horizontals of the crossbar switch 15SW0 are connected respectively to the ten upper horizontals of the junctor switches 15JW0–9. If any one of these paths are operated a ground potential is provided on the sleeve leads from a trunk link frame 2000. For example, if trunk 4T9 is busy, a ground potential may be provided through a cable 20CA, the sleeve lead of one of the verticals of the switch 15JW9, the upper horizontal of the switch 15JW9, the sleeve lead of the lowest horizontal of the crossbar switch 15SW0 to the lead LL9. When relay 21HG0 operates, it extends the potentials existing on the sleeve leads of the crossbar switch 15SW0 through leads LL0–9 to the line link concentrator 2010. Utilizing this potential information on leads LL0–9 the marker 2008 determines which channels are available from the trunk link frame 2000.

When the marker 2008 selects a channel it provides an operating potential through the line link connector 2010 to one of the ten sets of select magnets 15TJ0–9 associated respectively with the junctor switches 15JW0–9. Let us assume, for example, that the select magnet 15TJ0 of switch 10JW9 is operated. When the select magnet 15TJ0 of switch 15JW9 is operated, the marker applies a ground potential through cable 10CA and a lead LH0 to operate the trunk hold magnet 15T00. The leads LH0–4 are individually associated with the vertical file identities 0–4. The operating path for the hold magnet 15T00 is from the lead LH0 through an operated contact of relay 21VF0, an operated contact of relay 21IT1, an operated contact of relay 21LB1, a normal contact of relay 10LIT, an operated contact of relay 17TSA0, an operated contact of relay 21HG0 and the winding of the hold magnet 15T00 to battery 15B00. The relay 21LB1 is operated, as described above, after the line and trunk information has been registered in the memory circuit 1100 and serves to prevent completing a call in the event the line and trunk information is not stored in the memory circuit 1100. Failure to operate the relay 21LB1 causes the marker 2008 to time-out and take a trouble record.

The operating potential on lead LH0 also functions to operate a magnet 10HM. The operating path for the magnet 10HM is from lead LH0 through an operated contact of relay 21VF0, an operated contact of relay 21IT1, resistor 10R1 and the winding of the magnet 10HM to battery 10B1. When the hold magnet 10HM operates, it functions to inhibit the gate 6HG1 in the concentrator control circuit 600 and to enable a gate 14HGR in the outpulsing control circuit 1400. The gate 6HG1 is an enabling gate and a control potential was provided thereto from ground through a normal contact of the magnet 10HM and the serially connected operated contacts of relays 21D, 21VF0, 21VG0 and 21HG0. When the hold magnet 10HM operates, it opens this control path allowing the gate 6HG1 to return to its normal inhibited condition. As described above, the gate 6HG1 is part of a set path for the flip-flop circuit 6HGS. With the gate 6HG1 inhibited the flip-flop circuit 6HGS can be reset.

The gate 14HGR is normally inhibited due to the connection of its control terminal C through a resistor 14R6 to a battery 14B15. When the magnet 10HM is normal, a control path is provided from ground in Fig. 6 through a normal contact of the magnet 10HM, an operated contact of the relay 21D, a varistor 6V2 and lead 6GR, which is part of cable 14CA to the control terminal C of the gate 14HGR. When the magnet 10HM operates, it opens this control path allowing the gate 14HGR to return to its normal enabled condition. The gate 14HGR is part of a release path from lead 9TP3 of the pulse generator 900 to the release amplifier 14RLS which functions to return the central office equipment to normal. The release path to the amplifier 14RLS is from lead 9TP3 through the enabled gates 14HGR and 14CKR1. The control terminal C of the enabling gate 14CKR1 is connected to the output terminals 0 of the flip-flop circuits 14STA, 14RIA, 14VFLA, 14MA, 14CTA and 14ITA in the control circuit 1400 and to the output terminal 0 of the circuit 13LBA in the memory circuit 1100. As long as any of these flip-flop circuits remain set the gate 14CKR1 remains enabled.

The amplifier 14RLS provides a reset pulse through lead 6RL, which is part of the cable 14CA, and a varistor 6SD0 to the input terminal S of the flip-flop circuit 6SD in the concentrator control circuit 600. The circuit SD provides a reset pulse through the amplifier 6RSC to the reset terminal R of the circuit 6HGT causing it to reset. The circuit 6SD is itself reset by the next timing pulse from an amplifier 9SDR in the control pulse generator 900. The pulse from the amplifier 9SDR occurs at the same time that the next pulse is provided on lead 9TP3 from the generator 900 as the amplifier is connected to the lead 9TP3.

The release amplifier 14RLS also provides a reset pulse through lead 14L4 to the register circuit 800 causing it to return to normal. The reset pulse through lead 14L4 is provided through the varistor 8V7 to set the flip-flop circuit 8RLR. When the circuit 8RLR sets, it enables the gate 8RLR1 and it resets the flip-flop circuit 8RLA. The next vertical file pulse through lead 9VFL2 from the pulse generator 900 functions to reset the circuit 8RLR.

The release amplifier 14RLS also provides a reset pulse through the amplifier 14HGSR, lead 6HGSR, which is part of cable 14CA, to the reset terminal R of the flip-flop circuit 6HGS causing it to reset. The circuit 6HGS remains set because its operating path through lead 6TP0 is opened, as described above, at the gate 6HG1. When the flip-flop circuit 6HGS is reset, it returns the gates 6HGS1–8 to normal to close the outpulsing paths and to open the scanning paths to the line concentrator 200. A similar operation takes place in the concentrator control circuits 601–9 to prepare them for the normal scanning sequence.

The release amplifier 14RLS also provides reset pulses through the varistor 14V8, lead 6RSL, which is part of cable 14CA, the gate 6HGS4, which has not as yet been returned to normal, to the amplifier 6RS. Reset pulses are provided through amplifier 6RS to the concentrator 200 as long as the circuit 6HGS remains set to insure that it has been returned to its normal condition. The reset path through the gates 14HGR and 14CKR1 to the amplifier 14RLS remains open so that reset pulses are provided from the amplifier 14RLS as long as the central office equipment has not been returned to normal. The normal scanning paths are completed when the flip-flop circuits 6HGS and 6HGT are reset. The normal scanning paths from the pulse generator 900 are as described above during the normal scanning sequence through the leads 9VFL2, 9VGL and 9RSL which are all part of a cable 8CA to the concentrator control circuits 600–9. In the concentrator control circuit 600 the lead 9VFL2 provides the vertical file pulses through the gate 6HGS3, the lead 9VGL provides the vertical group pulses through the gates 6HGT3 and 6HGS2 and the lead 9RSL provides the reset pulses through the gates 6HGT2 and 6HGS1. Though scanning is resumed when the circuit 6HGS is reset, the service request is not recognized as the gates 6RHT in circuits 600–9 remain inhibited.

The release amplifier 14RLS also provides a reset pulse through a varistor 14D39 to the reset amplifier 14RS. The reset amplifier 14RS provides a reset pulse to the flip-flop circuits 14RIA, 14VFLA, 14MA, 14CTA and 14ITA returning them to normal. When these circuits are reset they release respectively their associated relays 14VFL, 14M, 14CT and 14IT. A reset pulse is also provided from the amplifier 14RS to the counters 14VGP and 19VFP resetting the stages 19VGP9 and 19VFP4 therein and to the reset terminal R of the flip-flop circuit 13LBA which resets and releases its associated relay 13LB. The relays 21CT1, 21LB1 and 21IT1 in the frame control circuit 2100 remain locked operated until the marker 2008 releases.

A reset pulse is also provided from the release amplifier 14RLS through lead 17RLS, which is part of cable 17CA, to the trunk selector circuit 1700. The release pulse through the lead 17RLS functions to partially return the circuit 1700 to normal. An additional sequence takes place in the selector circuit 1700 to complete the normalizing process when the connection through lead 21ST to battery 21B4 in the frame control circuit 2100 is open. This sequence takes place, as is hereinafter described, when the marker 2008 releases.

When the flip-flop circuit 6HGT in the concentrator control circuit 600 resets, it in turn releases the relay 6HGT0 associated therewith. When the relay 6HGT0 releases, it in turn releases the relay 21VGS in the frame control circuit 2100 and the relays 8VFT0 and 8VGT0 in the register circuit 800. The operating paths for these relays, which were described above, are apparent respectively in Figs 21 and 8. When the relay 21VGS releases, it opens the start path through its operated contact from battery 21B1 to the line link marker connector 2009.

The marker 2008 initiates a release sequence after it has operated the trunk switch 1000 and more specifically the hold magnet 15T00 of the switch 15SW0 and a hold magnet of one of the switches 15JW0–9. When the marker 2008 releases, it releases the connectors 2009 and 2010 which in turn release the frame control circuit 2100. In the frame control circuit 2100 the relays 21VF0, 21VG0, 21HG0, 21D, 21T and 21L0 release. When the relay 21HG0 releases, it in turn releases the hold magnet 10HM. When the connector 2010 is released, it also releases the select magnet 15TJ0 in the trunk switch 1000. When the relay 21VF0 releases, it in turn releases the timer relay 12TM2 and the select magnet 12SM9SWA in the memory circuit 1100. When the relay 21VG0 releases, it in turn releases the select magnet 12SM0SWA in the memory circuit 1100. The hold magnet 11M0SW0 remains locked operated to maintain the registration of the line and trunk information. Finally, when the relay 21D in the frame control circuit 2100 releases, it opens the locking paths for the relays 21CT1, 21LB1 and 21IT1 allowing them to release. Relay 21D also opens the start path to the trunk selector circuit 1700 from the battery 21B4 allowing it to complete its normalizing operation. When the trunk selector 1700 is returned to normal, the relay 17TSA0 releases and in turn releases the relay 17TSAK. In this manner the line concentrators 200–9 and the central office equipment are returned to normal with normal scanning resumed. The changes due to the initiation of the service request are the established originating connection through the trunk 4T0, and the registration in the memory circuit 1100 of the line and trunk identities of the established connection.

The circuits 600–9 remain insensitive to service requests as the circuits 8RHA and 8RNSA are still set. The next reset pulse from the generator 900 resets the circuit 8RHA and synchronizes the counters 8VFR and 8VGR with the counters 4VF and 4VG in the concentrators 200–9. Thereafter, as described above for an abandoned call, the circuit 8RNSA is reset at a random interval to enable the gates 6RHT1 in circuits 600–9 to permit service request recognition.

*Terminating call*

The sequence of operations for establishing a terminating connection responsive to a call to one of the subscriber lines 2L00, etc. is substantially the same as the sequence of operations, described above, for an originating call. The two main exceptions in the sequence involve making a line busy test and providing a trunk overflow indication in the event all trunks are busy.

The terminating call is initiated when the marker 2008 seizes the frame control circuit 2100 through the line link connector 2010. If the call, for example, is to line 2L00 connected to the concentrator 200, the relays 21HG0, 21FV0, 21VG0 and 22TER are operated. The operating path for relay 21HG0 is to ground and the operating paths for relays 21VF0, 21VG0 and 22TER are respectively to the batteries 21B17, 21B2 and 22B2.

When the relays in the circuit 2100 operate, they enable the gate 6HG1 to ready a path for setting the flip-flop circuit 6HGS. The control path to the terminal C of the gate 6HG1 is from ground through a normal contact of relay 21CT1, an operated contact, of relay 22TER, an operated contact of relay 21VF0, an operated contact of relay 21VG0 and an operated contact of relay 21HG0. With the gate 6HG1 enabled, the next pulse on lead 6TP0 sets the circuit 6HGS. When the circuit 6HGS is set, it halts the line scanning and readies the central office for outpulsing the line and trunk identities in exactly the same way as for an originating call. The circuit 14STA is set by a pulse through lead 6HGL to start the control circuit 1400, the circuit 14RIA reads in the line information to the counters 19VGP and 19VFP, etc. If the line 2L00 is idle the sequence continues with the idle test circuit 14ITA setting to enable the gate 14LB2 in the outpulsing path.

The relay 12TM2 in the memory circuit 1100 is utilized for timing a line busy test which is made when the frame control circuit 2100 is seized. If the gate 14LB2 is not inhibited before the relay 12TM2 is operated, the flip-flop circuit 14ITA operates as an indication that the called line 2L00 is idle. The operating path for the relay 12TM2 is from ground through an operated contact of relay 22TER the serially connected operated contacts of relays 21HG0, 21VG0 and 21VF0 and the winding of relay 12TM2 to the battery 12B2. A start potential is provided to the selector circuit 1700 from battery 21B4 in the circuit 2100 through an operated contact of relay 22TER and the lead 21ST. The selected trunk and vertical group identities and then the vertical file identity are outpulsed to the concentrator 200 in exactly the same manner as described above for an orignating call. Thereafter, mark pulses close the concentrator crosspoints from the called line 2L00 to the selected trunk. A crosspoint closure check is returned to set the circuit 14CTA which resets the central office and the line concentrators 200–9.

If, however, the called line 2L00 is busy, the gate 14LB2 in the outpulsing path is disabled during a line busy check of the memory circuit 1100. When the vertical file relay 21VF0 and the vertical group relay 21VG0 have operated and the called line 2L00 is busy, one of the read-out circuits, 13MR0–9, which corresponds to the number of the trunk to which the called line 2L00 is connected, will be enabled. As described above, there are ten memory read-out circuits 13MR0–9 in the memory circuit 1100 each of which is associated with ten trunks having similar designations but connected respectively to the concentrators 200–9. For example, the memory read-out circuit 13MR0 is associated with the ten trunks 4T0 connected respectively to the concentrators 200–9. The memory read-out circuits 13MR0–9 are multipled to the line busy amplifier 13LB3 so that if any trunk is connected to the called line 2L00 of the concentrator 200 a pulse is provided to the amplifier 13LB3. As also described above, the memory circuit 1100 includes six twenty-by-ten crossbar switches 13SWA–F. Each of the trunks 4T0–7 of each of the concentrators 200–9 is associated with one of the verticals of the switches 13SWA–D. Fig. 27 illustrates the assignment of switches to trunks. The hold magnets identify the line concentrators 200–9 to which the trunks are assigned. For example, in switch 13SWA, the hold magnet 11M0SW0 is associated with trunk 4T0 of the line concentrator 200. For trunks 4T8 and 4T9 of the concentrators 200–9 two verticals of the switches 13SWE–F are assigned instead of one because these trunks are connected to all ten vertical groups. When the relay 21HG0 operates, it selects the verticals of the switches 13SWA–F which are associated with the line concentrator 200. For example, as shown in Fig. 13, relay 21HG0 connects the four leads of the vertical furthest to the left of switch 13SW0 to the memory read-out circuit 13MR0. The other nine verticals of the switch 13SW0 remain unconnected to any of the memory read-out circuits 13MR0–9.

The function of the read-out circuits 13MR0–9 is to interpret the information that has been stored in the memory switches 13SWA–F. Each of the memory read-out circuits 13MR0–9 includes the two-terminal And gate 13FA and the three-terminal And gate 13FB which are respectively enabled when the terminals are at ground potential. When either of the And gates 13FA or 13FB is enabled, it in turn enables respectively the gaes 13B and 13C. The input leads A–D of the circuit 13MR0 are connected by the operated contacts of the relay 21HG0 to the vertical associated with the concentrator 200 in the switch 13SW0. At the same time that the input terminals A through D of the circuit 13MR0 are connected to a vertical the input terminals of the memory read-out circuits 13MR1–9 are also connected to a vertical of the crossbar switches 13SWA–F. The voltage upon the leads A to D of each of the read-out circuits 13MR0–9 depends upon the state of the switches 13SWA–F and the number of the line that is being called. If information has previously been stored in the memory circuit 1100 for a particular line, ground potentials are provided to a combination of the input leads A through D of the read-out circuits 13MR0–9 which are associated with the trunk utilized therefor. The following table indicates which leads are grounded and which gates in the memory read-out circuits 13MR0–9 are enabled.

| The Vertical File Number | Potential | | | | Enabled Gates |
|---|---|---|---|---|---|
| | A | B | C | D | |
| 0, 1 or 2 | Ground | | | Ground | FA, B, A |
| 3 or 4 | | Ground | Ground | Ground | FB, C |

Suppose, for example, that the called line 2L00 is connected to trunk 4T0 at the time the terminating call is initiated. Relays 21VF0 and 21VG0 close paths from ground, as shown in Fig. 18, to selected ones of the horizontals of the crossbar switches 13SWA–F. More specifically, ground is provided through an operated contact of relay 21VF0, lead F0 of the switch 13SWA through the operated crosspoint on level 9, (L9) an operated contact of relay 21HG0 to lead B of the memory read-out circuit 13MR0. Ground through an operated contact of relay 21VG0 is connected through an operated crosspoint of the switch 13SW0 to the lead A of the circuit 13MR0. The table shown in Fig. 29 illustrates the connections from the grounded contacts of relays 21VF0–4 and 21VG0–9 in Fig. 18 to the horizontals of the crossbar switches 13SWA–F.

An output pulse is provided through a varistor 13V1 to the line busy amplifier 13LB3 when the gate 13C is enabled or when two gates 13A and 13B are enabled. The gate 13A is an inhibiting gate which remains enabled as long as a control potential is not provided thereto. With ground potential upon leads A and B, the And gate 13FA is enabled to in turn enable the gate 13B. The inhibiting gate 13A remains enabled to complete a path from a read-out amplifier 13R0 to the amplifier 13LB3. The pulses to the read-out amplifier 13R0 are provided from the pulse generator 900 through the lead 9TP3.

The pulse to the amplifier 13LB3 is provided therefrom through an inhibiting gate 13LBT1 to the input terminal S of the flip-flop circuit 13LBA. The gate 13LBT1 is normally disabled due to connection through the serially connected normal contacts of relays 21D and 22TER to the battery 13B7. With relay 22TER operated, the inhibiting control path is opened and a control potential from a battery 13B5 through a resistor 13R6 functions to enable the gate 13LBT1. When the circuit 13LBA operates, it in turn operates its associated relay 13LB and it inhibits the gate 14LB2 in the outpulsing control circuit 1400 to open the outpulsing path from the circuit 1400. When the relay 13LB operates, it in turns operates a relay 21LB1 in the frame control circuit 2100. The operating path for the relay 21LB1 is from ground through an operated contact of relay 13LB and the winding of relay 21LB1 to battery 21B7. When the relay 21LB1 operates, it locks to ground through its operated contact and an operated contact of the relay 22TER. When relay 21LB1 operates, it also grounds the lead LH0, which is part of cable 10CA, to the line link connector 2010 as an indication that the called line 2L00 is busy. The ground path to lead LH0 is from ground through a varistor 10V3, a normal contact of relay 10NTT, an operated contact of relay 21LB1, a normal contact of the relay 21IT1 and an operated contact of relay 21VF0. When the marker 2008 receives the line busy signal, it releases the frame control circuit 2100 and returns busy tone to the calling subscriber.

In the circuit 2100, relays 21VF0, 21VG0, 21HG0 and 22TER release and in turn open the enabling path through the switch 13SW0 to the read-out circuit 13MR0. When relay 22TER releases, it also releases relay 21LB1 and it opens the control path from ground in Fig. 6 through lead 6GR to the control terminal C of the inhibiting gate 14CKR1. The gate 14CKR1 is part of a reset path from the lead 9TP3 through the gates 14HGR and 14CKR1 to the amplifier 14RLS. The amplifier 14RLS provides reset pulses to all the flip-flop circuits in the circuit 1400 and to the circuit 13LBA. In this manner, when the circuit 13LBA is set to indicate a line busy condition, it also initiates a sequence for resetting itself by enabling the gate 14CKR1. The gate 14CKR1 remains enabled as long as any of the flip-flop circuits in the control circuit 1400 are set. When the circuit 13LBA is reset, it releases the relay 13LB. The line concentrator system is, in this manner, returned to normal if the called line 2L00 is busy.

When all trunks in the trunk multiple connected to the called line 2L00 are busy, the leads LL0–9, which are connected to the line link connector 2010, are grounded. These leads are grounded when relay 21HG0 operates because they are connected to the sleeve leads of the switch 15SW0 in the trunk switch 1000. As described above, ground potential from the trunk link frame 2000 is provided to the sleeve leads of busy trunks. When the marker 2008 determines that all of the leads LL0–9 are grounded, it returns overflow tone to the calling subscriber and releases the frame 2100 returning the line concentrator system to normal.

*Callback*

When the originating connection is established from the line 2L00 to the register 2004, the subscriber at the station 2S00 dials the called subscriber. After the subscriber at the substation 2S00 has finished dialing, the marker 2008 is seized by the originating register 2004 to initiate a callback sequence of operations for establishing a connection from the selected trunk 4T0 to an outgoing trunk 2003 to the called subscriber. The normal scanning sequence is not interrupted during the callback sequence and the connection remains established at the concentrator 200 from the line 2L00 to the trunk 4T0. It is necessary, therefore, that the same trunk 4T0 be utilized for the talking connection to the outgoing trunk 2003 as was utilized for the originating call. In order to establish the outgoing connection to trunk 4T0, it is necessary to identify the trunk utilized on the dial-tone connection at the central office.

The marker 2008 seizes the line link connector 2010 and operates the frame control circuit 2100 supplying to it the line and concentrator identifying information and also an indication that the call is for a callback. With the call from line 2L00 of concentrator 200, the relays 21HG0, 21VG0, 21VF0 and 22CB are operated. The winding of the relay 22CB, which indicates that the call is for callback, is connected to the battery 22B2. When the relays 21HG0, 21VG0 and 21VF0 are operated, they function to energize one of the memory read-out circuits 13MR0–9 which corresponds to the trunk utilized for the originating connection in exactly the same manner as described above for an originating call. As also described above, the read-out circuits 13MR0–9 are associated individually with the trunk numbers 0–9. With relays 21VF0 and 21VG0 operated, the memory read-out circuit 13MR0 is energized as trunk 4T0 is connected to the line 2L00. Ground is provided in Fig. 18 through an operated contact of relay 21VF0, the switch 13SWA and an operated contact of relay 21HG0 to lead B of the read-out circuit 13MR0. A ground is also provided through an operated contact of relay 21VG0 and switch 13SWA to lead A of the read-out circuit 13MR0. With both leads A and B at ground potential, the And circuit 13FA is enabled which in turn enables the enabling gate 13B. The next pulse from the amplifier 13R0 is provided through the gates 13A and 13B and a lead CB0, which is part of a cable 12CB, to the trunk selector circuit 1700. There are ten leads CB0–9 connected respectively from the read-out circuits 13MR0–9 to the selector circuit 1700. When the relay 22CB operates, it connects ground in the frame control circuit 2100 as a start signal through lead 17CB to the trunk selector circuit 1700 which function to identify which one of the leads CB0–9 is pulsed by the memory circuit 1100. As described above, when the read-out circuit 13MR0 is energized the lead CB0 is pulsed. The trunk selector circuit 1700 function to operate one of the relays 17TSA0–9 to indicate the identity of the trunk utilized for the originating connection. With lead CB0 pulsed the relay 17TSA0 is operated to indicate that the trunk 4T0 was utilized for the originating connection.

Figure 22:
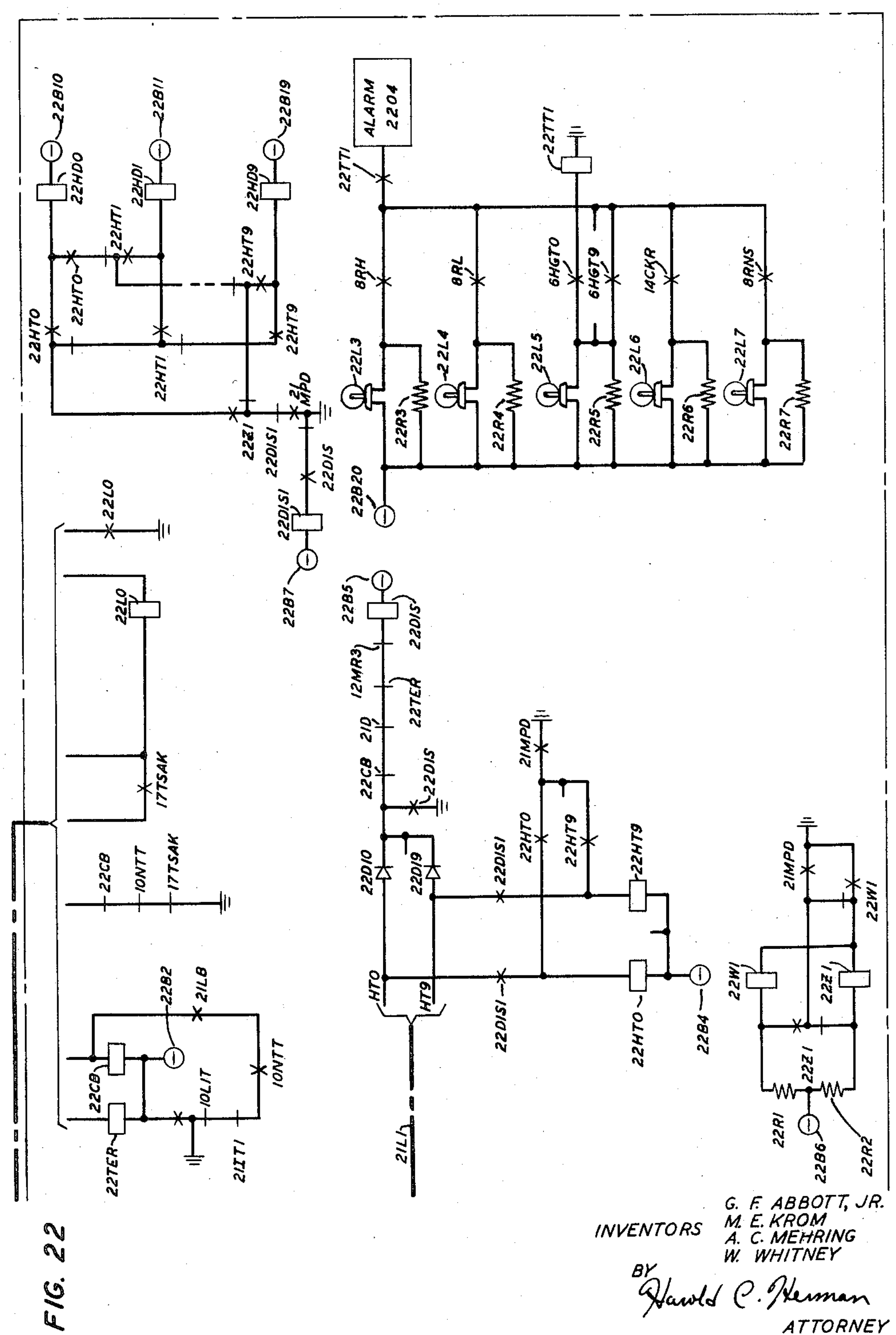

When relay 22CB operates, it also functions to operate a relay 21CB1 and it opens a path from ground in Fig. 22 to the connector 2010. The path from ground is through serially connected normal contacts of relays 17TSAK, 10NTT and 22CB. When this path is opened the connector 2010 allows the marker 2008 to select a channel from an outgoing trunk 2003 through the trunk link frame 2000 to the trunk switch 1000. The operating path for relay 21CB1 is from ground through a normal contact of relay 17TSAK, an operated contact of relay 22CB and a winding of relay 21CB1 to the battery 21B6. When the relay 21CB1 operates, it locks to ground through its operated contact and the contact of relay 22CB.

When relay 21CB1 operates, it also function to inhibit the gate 13LBT1 which is connected in the set path for the flip-flop circuit 13LBA. The control terminal C of the gate 13LBT1 is normally at a minus 24-volt potential due to its connection through a resistor 13R1 to a battery 13B4. When relay 21CT1 operates, it connects a minus 6-volt battery 13B7 through its operated contact to the control terminal C of the inhibiting gate 13LBT1.

When the memory read-out circuit 13MR0 is operated, therefore, to identify the trunk 4T0, the circuit 13LBA is not set.

When relay 17TSA0 operates, it provides access to the hold magnet 15T00 in the trunk switch 1000 which is associated with the trunk 4T0. The operating path for the hold magnet 15T00 is from the lead LH0 through an operated contact of relay 21VF0, a normal contact of relay 21IT1, a normal contact of relay 21LB1, a normal contact of relay 10LIT, an operated contact of relay 17TSA0, an operated contact of relay 21HG0 and the winding of relay 15T00 to battery 15B00. The marker 2008 operates the magnet 15T00 and one of the magnets of one of the switches 15JW0–9 after it selectively operates the select magnets 15TJ0–9. When the marker 2008 provides an operating ground through the connector 2010 and the cable 10CA to lead LH0, the magnet 15T00 is operated to complete the path from the trunk 4T0 to the outgoing trunk 2003.

After the marker 2008 operates the hold magnet 15T00, the marker 2008 releases and in turn releases the frame control circuit 2100. In the circuit 2100 the relays 21HG0, 21VF0, 21VG0 and 22CB release. When the relay 22CB releases, it in turn releases the relay 21CB1 and it opens the operating ground in the circuit 2100 from the lead 17CB to the selector circuit 1700 returning it to normal. When relays 21VG0, 21VF0 and 21HG0 release, they open the enabling paths for the read-out circuit 13MRO returning the memory circuit 1100 to normal.

After the crossbar switch 15SW0 is operated, an operating ground is provided on the sleeve lead from the trunk link frame 2000 which maintains the hold magnet 15T00 operated. The outpulsing circuit 1400 is not operated during the callback sequence as the identity of the trunk utilized for the originating call is determined at the memory circuit 1100. Moreover, as described above, line scanning is not halted by the callback call.

*Disconnect*

When the subscriber at the line 2L00 hangs up, a disconnect sequence is initiated for disconnecting the trunk 4T0 from the calling line 2L00 and from the outgoing trunk 2003. A disconnect request is initiated when the trunk hold magnet 15T00 in the trunk switch 1000 releases. As described above, the magnet 15T00 is held operated over the sleeve lead from the trunk link frame 2000. The trunk link frame 2000 recognizes the disconnect request and opens the locking path for the hold magnet 15T00 through the sleeve lead. A combination of the released trunk hold magnet 15T00 and an operated associated memory hold magnet 11M0SW0 causes the operation of a disconnect relay 22DIS in the frame control circuit 2100. The operating path for the relay 22DIS is from ground, in Fig. 16, through the now normal contact of the hold magnet 15T00, an operated contact of the hold magnet 11M0SW0, a varistor 16HT0, lead HT0, which is part of cable 21L1, a varistor 22D10, serially connected normal contacts of relays 22CB, 21D, 22TER and 12MR3 and the winding of relay 22DIS to the battery 22B5. If the central office equipment is handling a call when the disconnect is initiated, one of the relays 22CB, 21D, 22TER and 12MR3 is operated to delay the operation of relay 22DIS. The horizontal test leads HT0–9, which are part of the cable 21L1, correspond in number to that of the horizontal group or concentrator in which the disconnect occurs. For example, grounding the lead HT0 indicates that the disconnect request is for the concentrator 200.

When the relay 22DIS operates, it in turn operates the relay 22DIS1 over a path from ground through a normal contact of a preference relay 21MPD, an operated contact of the relay 22IDS and the winding of the relay 22DIS1 to the battery 22B7. When the relay 22DIS1 operates, it in turn operates the relay 22HT0 and it provides an indication from ground in Fig. 21 through the line link connector 2010 to the marker 2008 that a disconnect sequence has initiated. The relay 21HT0 is operated over a path from the grounded lead HT0 through an operated contact of relay 22DIS1 and the winding of relay 22HT0 to a battery 22B4. The relays 22HT0–9 function to identify the horizontal group from which the disconnect request initiated. When the marker 2008 receives the disconnect indication through the connector 2010, it functions to operate a preference relay 21MPD over a path to battery 22B12. As is hereinafter described, when the relay 21MPD operates, it functions to block the initiation of originating or terminating calls and to give preference to the disconnect sequence.

When the relay 21MPD operates, it provides a locking path from ground through an operated contact of relay HT0 for the relay 21HT0 and it releases the relay 21DIS1. As described above, the operating path for relay 22DIS1 was through a normal contact of relay 21MPD. Relay 21MPD also functions to operate a relay 22W1 if it is normal or to release it if it is operated. The relay 22W1 and a relay 22Z1 function to alternate the preference for operating relays 22HD0–9 in order to reduce the probability of failure to disconnect due to circuit trouble. Assuming that the relay 22W1 is normal when relay 21MPD operates, an operating path is provided from ground through an operated contact of relay 21MPD, a normal contact of relay 22W1, the winding of relay 22W1 and resistor 22R1 to battery 22B6. The grounded contact of relay 21MPD is also connected to both sides of the winding of the relay 22Z1 which therefore does not operate. When relay 22W1 operates, it locks to ground through its operated contact opening its operating path from the grounded contact of relay 21MPD. Relay 22Z1 remains normal as the ground potential remains on both sides of its winding. As is hereinafter described, when relay 21MPD releases, it causes relay 22Z1 to operate over a path from ground through the operated contact of relay 22W1, the winding of relay 22Z1 and resistor 22R2 to the battery 22B6. Relay 22W1 remains operated until relay 21MPD is again operated.

Returning now to the sequence with relay 22W1 operated and relay 22Z1 normal, an operating path for relay 22HD0 is provided from ground through an operated contact of relay 21MPD, a normal contact of relay 22DIS1, a normal contact of relay 22Z1 and serially connected contacts of relays 22HT9–1, an operated contact of relay 22HT0 and the winding of relay 22HD0 to battery 22B10. In the event two of the relays 22HT0–9 are operated at this time to indicate two disconnect requests, the higher numbered one is preferred. If relay 22Z1 is operated instead of relay 22W1, however, the lower numbered one is preferred. The relays 22W1 and 22Z1 function in this manner to reverse the direction through the preference train consisting of contacts of the relays 22HT0–9.

When the relay 21MPD operates, it also readies the outpulsing control circuit 1400 for an outpulsing sequence to the concentrator 200. In the circuit 1400, relay 21MPD inhibits the gates 14TSK2 and 14MPD1 and enables the gates 14MCK1, 19MPD and 19VF1. The control terminal C1 of the gate 14TSK2 and the control terminal C of the gate 14MPD1, which are connected through resistor 14R13 to battery 14A2, are connected by relay 21MPD to the negative battery 14A3. The control terminal C of the gate 14MCK1 is connected to ground through the varistor 14D38 and an operated contact of the relay 21MPD and the control terminals C of gates 19MPD and 19VF1 are connected respectively to the batteries 14A3 and 19B41.

When relay 22HD0 has operated, it performs the following functions:

(1) It connects the horizontal test leads 0–9 in Fig.

16 for the selected concentrator 200 through cable 16L1 and leads D0–9 to the trunk selector circuit 1700;

(2) It provides a start potential from battery 21B4 through resistor 21R4 to the start lead 21ST of the selector circuit 1700;

(3) It enables the gate 6HG1 in the concentrator control circuit 600 to initiate the operation of the control circuit 1400; and (4) It prepares a circuit for releasing the hold magnet 11M0SW0 in the memory circuit 1100.

When the selector circuit 1700 receives the start signal from the circuit 2100, it determines the identity of the trunk to be disconnected utilizing the information supplied thereto from the memory circuit 1100. Only one of the leads D0–9 is grounded with the ground being supplied through a normal trunk hold magnet and its associated memory hold magnet which is operated. When trunk 4T0 is to be disconnected, the ground is supplied through a normal contact of the hold magnet 15T00 and an operated contact of the hold magnet 11M0SW0. As described above, it was this combination of an operated memory hold magnet and a released associated trunk hold magnet which initiated the disconnect sequence.

During the trunk identification sequence of the selector circuit 1700, the circuit 600 is operated to initiate the outpulsing sequence. The gate 6HG1 is enabled as its control terminal C is connected through a normal contact of relay 21CT1 and an operated contact of relay 22HD0 to ground. The gate 6HG1 enables the set path for the circuit 6HGS which is set by the next pulse through the lead 6TP0 from the generator 900. When the circuit 6HGS is set, it inhibits the gates 6HGS1–3 to block the scanning pulses, it enables the gates 6HGS4–9 in preparation for outpulsing to the concentrator 200, it operates the relay 14CKR and it operates the circuit 14STA in the control circuit 1400 to start the outpulsing sequence. The sequence continues thereafter in a manner similar to that described above for the originating call. The circuit 14STA provides a reset pulse to the concentrator 200 and it sets the read-in flip-flop circuit 14RIA. The next timing pulse is provided through the read-in amplifier 14RA to the counters 19VGP and 19VFP.

The line information is read into the control circuit 1400 in a similar manner as for an originating call except as follows:

(1) The last stage 19VFP4 is always set and moreover the gate 14MPD1 is inhibited, as described above, so that vertical file pulses cannot be sent to the concentrator 200;

(2) The stage 19VGD is set in the counter 19VGP by the read-in pulse through the enabled gate 19MPD so that ten vertical group pulses are outpulsed to the concentrator 200 to signal that the sequence is for disconnect; and (3) The gate 14TSK2 in the vertical group outpulsing path is inhibited until the trunk to be disconnected has been identified as evidenced by the operation of the relay 17TSAK in the trunk selector circuit 1700.

The purpose of delaying the vertical group outpulsing is to start the vertical group and trunk outpulsing simultaneously so that all trunk outpulsing will be completed before the last stage of the ring counter 4VG in the concentrator 200 is operated. When trunk 4T0 is identified by the selector circuit 1700, the relays 17TSA0 and 17TSAK are successively operated. When relay 17TSAK operates, it enables the gate 14TSAK2 to begin outpulsing both the trunk identity and the ten vertical group pulses. The trunk outpulsing path is from the amplifier 14OP1 through lead 17OP which is part of cable 17CA, the circuit 1700, back through lead 17M, varistor 14MG, the gate 14CK2, amplifier 14MP, lead 6ML which is part of cable 14CA, gate 6HGS7, amplifier 6M, transformer 6TR2 and the control pair 4CP2 to the line concentrator 200. Only a single pulse is provided under control of the circuit 1700 to identify the trunk 4T0. The trunk counter 3TK is accordingly set at its stage 3TK0.

After the vertical group and the trunk pulses are outpulsed to the concentrator 200, the flip-flop circuit 14VFLA is set. Vertical file pulses are not outpulsed, however, as indicated above, due to the inhibition of the gate 14MPD1. When the circuit 14VFLA sets, it enables the operating path for the circuit 14MA which sets when the next pulse is provided from the amplifier 14OP1. When the circuit 14MA is set, mark pulses are outpulsed to disconnect the crosspoints between the line 2L00 and the trunk 4T0 in the concentrator 200.

In the line concentrator 200 the trunk pulses arrive either simultaneously with or before the last vertical group pulse from the central office because ten vertical group pulses are always provided during the disconnect sequence whereas the maximum number of trunk pulses is ten. When the last or tenth vertical group pulse is received at the eleven-stage ring counter 4VG, it provides a control potential through its output terminal VGD to enable a gate 5VGD and through a varistor 5V3 to disable the gate 4TKB1. The gate 4TKB1 prevents the succeeding mark pulses from passing to the trunk counter 3TK. When the flip-flop circuit 14MA sets in the outpulsing control circuit 1400, mark pulses are supplied from the circuit 1400 through the control pair 14CP2, the amplifier 4MPR and the now enabled gate 5VGD to set the disconnect flip-flop circuit 5DA. When the flip-flop circuit 5DA operates, it provides a reset pulse through the amplifier 5MR to insure that the flip-flop circuit 5MA is reset and it operates its associated relay 5D. The winding of the relay 5D is connected to the output terminal B of the circuit 5DA on one side and through the resistor 5R1 shunted by the capacitor 5C1 to the battery 5B5 on the other side. When the relay 5D operates, it in turn operates a relay 5D1 and the trunk register relay 3TKR0. The operating path for the relay 5D1 is from ground through an operated contact of relay 5D and the winding of relay 5D1 to the battery 5B8. The operating path of the relay 3TKR0 is from the output terminal B of the stage 3TK0 in the counter 3TK through the winding of the relay 3TKR0, the resistor 3TKL and an operated contact of relay 5D to the battery 4B1. When the relay 5D1 operates, it in turn operates a relay 5D2 over an operating path to the battery 5B8 and when the relay 3TKR0 operates, it in turn operates an associated relay 5TKA0 over an operating path to the battery 5B7.

When the relays 5D1 and 5TKA0 operate, they complete operating paths for the relays 3G0 and 3F0. The operating path for the relay 3G0 is from ground through an operated contact of relay 5D1, an operated contact of relay 5TKA0, an operated contact of the crosspoint relay 5TG00 and the winding of relay 3G0 to the battery 3B5. The relay 5TG00 is operated even in the absence of a closed operating path because, as described above, it remains operated to maintain the connection to the trunk 4T0 when the operating path is released. A similar operating path is provided through the serially connected operated contacts of the relays 5D1, 5TKA0 and 5TF00 for the relay 3F0. The relays 5TG00 and 5TF00 were operated when the call was established and their contacts are now utilized to select one of the relays 3G0–9 and one of the relays 3F0–4 to identify the file and group number of the line to be disconnected. When the relays 3F0 and 3G0 operate, they lock to ground through an operated contact of the relay 5TKA0.

The operation of the relays 3F0 and 3G0 in combination with the operated relay 5TKA0 completes a path for applying release current to the crosspoint relays 5TG00 and 5TF00 and for operating the line cut-off relay 5C00 and the check relay 5CK1. The release path for the relay 5TG00 is from ground through an operated contact of relay 5D2, an operated contact of relay 5TKA0, an operated contact of relay 3G0, the winding of relay 5TG00 and an operated contact of relay 5D2 to the battery 5B7. The release path for the relay 5TF00 is from ground through the operated contact of relay 5D2, an operated contact of relay 5TKA0, an operated contact of relay 3F0, the winding of relay 5TF00 and the operated contact of relay 5D2 to battery 5B7. The operating path for the relays 5CK1 and 5C00 is from ground through the operated contact of relay 5D2, an operated contact of relay 3F0, an operated contact of relay 3G0, the winding of relay 5C00, the winding of relay 5CK1 and the operated contact of relay 5D2 to battery 5B7. When the relays 5TG00 and 5TF00 release, they open the connection from the line 2L00 to the trunk 4T0. When the relay 5C00 operates, it connects the line scanner 220 to the line 2L00. When the relay 5CK1 operates, it completes a path for enabling the gate 5CT1. The enabling path is from the battery 5B3 through a resistor 5R3, an operated contact of relay 5D1, an operated contact of relay 5CK1, an operated contact of relay 5TKA0, an operated contact of relay 5D1 and an operated contact of relay 5TKA0 to the control terminal C of the gate 5CT1. The control terminal C is normally at a negative disabling potential due to its connection through the resistor 5T5 to the battery 5B1. When the gate 5CT1 is enabled, it readies a path for returning the next mark pulse to the central office as a disconnect check pulse. The next mark pulse is provided from the amplifier 4MPR through the gate 5CT1, the amplifier 4CTT, the transformer 4TR1, the control pair 4CP1, the transformer 6TR1, the amplifier 6CT, the enabling gate 6HGS8, lead 6CTL, which is part of cable 14CA, and the enabled gate 14M2 to set the flip-flop circuit 14CTA in the outpulsing control circuit 1400. When the circuit 14CTA is set, it enables a reset path through the lead 6RSL to the line concentrator 200 and it operates successively the relays 14CT and 21CT1.

When the circuit 14CTA operates, it enables the gate 14CT1 which readies a path from the lead 9TP0 to the lead 6RSL. When the next timing pulse is provided from the generator 900 through the lead 9TP0, it passes through the gate 14CT1, lead 6RSL, which is part of cable 14CA, the enabled gate 6HGS4, the amplifier 6RS, the transformer 6TR1, the control pair 4CP1, the transformer 4TR1, the amplifier 4RSR to the varistors 5V1, 5V2, 4V3 and 4V4 and to the amplifier 4RS2. The varistor 5V1 passes the reset pulse through an amplifier 5DR to the reset terminal of the circuit 5DA causing it to reset and in turn successively resets the relays 5D, 5D1 and 5D2. When the relay 5D releases, it also releases the relay 3TKR0 which in turn releases the relay 5TKA0. When the relay 5TKA0 releases, it releases the relays 3G0 and 3F0. When the relay 5D2 releases, it releases the relay 5CK1. The cut-off relay 5C00 remains latched operated to connect the line 2L00 to the line scanner 220. The reset pulse through the varistor 5V2 is provided through the amplifier 5MR to insure that the circuit 5MA is reset. The reset pulses through the varistors 4V3 and 4V4 are provided respectively to the reset terminals R of the counters 4VF and 4VG to insure that they are reset at their stages 0. The reset pulse through the amplifier 4RS2 is provided to the reset terminal R of the flip-flop circuit 5TKB and to the common reset terminals CR of the circuits 3TC and 3TK0–9 in the counter 3TK. The circuit 3TK0 and the circuit 3TC are accordingly reset. The line concentrator 200 is in this manner returned to normal by the reset pulses from the control circuit 1400. Reset pulses are continued from the control circuit 1400 to the concentrator 200 until the flip-flop circuit 6HGS in the circuit 600 is reset. As is hereinafter described, when the relay 21CT1 is operated, it opens the enabling potential to the gate 6HG1 allowing the flip-flop circuit 6HGS to be reset.

As described above, when the circuit 14CTA is set, it successively operates the relays 14CT and 21CT1. When relay 21CT1 operates, it functions to erase the registration of the connection in the memory circuit 1100 and it functions to reset the central office equipment to normal. The reset function is initiated when the relay 21CT1 is operated to remove ground from the control terminal C of the gate 6HG1 to disable the gate 6HG1 in the set path of the circuit 6HGS. The same contact of relay 21CT1 removes ground from the lead 6GR which is connected through the cable 14CA to the outpulsing control circuit 1400. In the circuit 1400 the ground potential maintained a gate 14HGR inhibited. When the gate 14HGR is returned to normal a reset path is completed from the lead 9TP3 through the gates 14HGR and 14CKR1 to the release amplifier 14RLS. The release sequence is thereafter exactly the same as described above for the originating call. The release amplifier 14RLS provides reset pulses to the circuit 6HGS in the concentrator control circuit 600 which resets to resume normal scanning and to block the outpulsing paths from the central office. The amplifier 14RLS also provides reset pulses through the amplifier 14RS to all the flip-flop circuits and counters in the outpulsing control circuit 1400 and to the circuit 13LBA in the memory circuit 1100 returning them all to normal. The amplifier 14RLS also provides a release pulse to the trunk selector circuit 1700 through the lead 17RLS, which is part of the cable 17CA.

As indicated above, when relay 21CT1 operates, it also erases the registration in the memory circuit 1100 of the concentrator connection which was just disconnected. When the relay 21CT1 is operated, it connects a minus 48-volt battery 12B1 through the low resistance winding of a relay 12MR1 to the ground side of the hold magnet 11M0SW0 causing it to release. The path from the battery 12B1 is through the winding of the relay 12MR1, an operated contact of relay 21CT1, an operated contact of relay 21MPD, an operated contact of relay 17TSA0 and an operated contact of relay 22HD0 to the winding of the hold magnet 11M0SW0. The other side of the winding of the hold magnet 11M0SW0 is connected to the minus 48-volt battery 11B0 so that the magnet 11M0SW0 releases. When the magnet 11M0SW0 releases, the information relating to the connection established from the line 2L00 in the trunk 4T0 is erased. The hold magnet 11M0SW0 is released after the disconnect check indication is received from the concentrator 200 indicating that the disconnect thereat has already taken place.

The release path for the hold magnet 11M0SW0 is through the winding of the relay 12MR1. The relay 12MR1 operates as it is connected through an operated contact of the hold magnet 11M0SW0 to the grounded resistor 11R0. At the same time, therefore, that a release path is provided to the magnet 11M0SW0, the relay 12MR1 is operated. When the relay 12MR1 operates, it in turn connects ground to the winding of a relay 12MR2 which is also connected to the battery 12B1. When the relay 12MR2 operates, it locks to ground through its operated contact and the contact of the relay 21MPD. When the hold magnet 11M0SW0 releases, it opens the operating path for the relay 12MR1 causing it to release. The relay 12MR2 remains, however, locked operated through the contact of relay 21MPD. When the relay 12MR1 releases, it completes an operating path from ground through its normal contact and an operated contact of relay 12MR2 to the winding of a relay 12MR3. When the relay 12MR3 operates, it indicates that the information has been successfully removed from the memory circuit 1100. When the relay 12MR3 releases, it opens the locking path for the relay 22DIS causing it to release. When the relay 22DIS releases, it releases the relay 21MPD providing an indication to the marker 2008 that the disconnect has been accomplished. The marker 2008 thereupon releases the circuit 2100. The line concentrator system is in this manner returned to normal with the trunk 4T0 idle.

*No test*

No-test calls provide direct access to the subscriber lines 2L00, etc. whether they are idle or busy for testing or for operator verification. A no-test call to an idle line is completed in exactly the same manner as for a terminating call. A no-test call to a busy line is completed through the no-test connector circuit 2014, the trunk switch 1000 and the trunk 4T9 provided that the trunk 4T9 is idle. If the trunk 4T9 is busy, as is hereinafter described, the no-test call will be routed by the marker 2008 to an overflow trunk, not shown. Suppose, for example, that a no-test call is made to the line 2L00 of the concentrator 200 and that line 2L00 is busy. The sequence of operation for seizing the frame control circuit 2100 is exactly the same as for the terminating call. The relays 21VG0, 21VF0, 21HG0 and 22TER in the frame control circuit are operated and a line busy check is made. The line busy check is made in the memory circuit 1100 and the flip-flop circuit 13LBA is operated to indicate the busy condition. When the flip-flop circuit 13LBA is set, it inhibits the gate 14LB2 in the outpulsing control circuit 1400 to prevent setting the idle test flip-flop circuit 14ITA and to inhibit all outpulsing.

When the circuit 13LBA is set, it functions to operate the relay 13LB which in turn operates the relay 21LB1 in the frame control circuit 2100. The operating paths for these relays are described above in the terminating call sequence. When the relay 21LB1 is operated, it grounds the lead LH0 to the marker 2008 as an indication to the marker 2008 that the line 2L00 is busy. The ground connection is provided through the varistor 10V3, a normal contact of relay 10NTT, an operated contact of relay 21LB1, a normal contact of relay 21IT1, an operated contact of relay 21VF0, lead LH0, which is part of cable 10CA, and the connector 2010 to the marker 2008. When the marker 2008 receives the busy indication, and a no-test connection is available, it operates the relay 10NTT over an operating path through the connector 2010 and lead NTT of the cable 10CA to the grounded winding of relay 10NTT. In this manner, terminating and no-test calls are handled the same up to the point where the line busy test is made. The marker 2008 proceeds to determine whether a no-test connection through trunk 4T9 is available by testing for ground on the lead NT which is also part of cable 10CA. If trunk 4T9 is busy and unavailable for use for the no-test call, a relay 12BY in the memory circuit 1100 will be operated to ground the lead NT. The ground on the lead NT indicates to the marker 2008 that a no-test path to the concentrator 200 is unavailable. The relay 12BY operates from ground through the varistor 12BV when either of the two memory hold magnets associated with the trunk 4T9 of the concentrator 200 is busy. For example, if the memory hold magnet 11M0SW9A is operated, the operating path from the varistor 12BV is through an operated contact of relay 21HG0, an operated contact of the hold magnet 11M0SW9A and an operated contact of the relay 21HG0 and one of the windings of the relay 12BY to the battery 12B4. The relay 12BY in this manner is operated when the relay 21HG0 is operated if either one of its two associated hold magnets 11M0SW9A and 11M0SW9 is operated. As described above, there is one hold magnet in the memory circuit 1100 which is associated with each of the trunks 4T0–7 and two hold magnets with each of the common trunks 4T8–9. The lead NT of cable 10CA will also be grounded even if relay 12BY is idle if the no-test connector 2014, which represents two connectors each common to five of the line concentrators, is busy. If the no-test connector 2014 for the concentrators 200–4 is busy, a ground potential is provided through the cable 10CB to one of the leads 15NT0–4 and an operated contact of relay 21HG0 to lead NT. Assuming that relay 12BY is not operated and a connector 2014 is available so that ground does not exist upon lead NT, the marker 2008 operates relay 12NTT. The operation of relay 12NTT performs the following functions:

(1) It operates the relay 22CB over a path from ground through a normal contact of relay 21IT1, an operated contact of relay 10NTT, an operated contact of relay 21LB1 and a winding of relay 22CB to the battery 22B2;

(2) It readies a path around a normal contact of relay 21IT1 to the winding of the trunk hold magnet which is associated with the trunk that is connected to the line 2L00. The path is from the lead LH0 in Fig. 10 through an operated contact of relay 12VF0, an operated contact of relay 10NTT, an operated contact of relay 21CB1, an operated contact of one of the relays 17TSA0–9, an operated contact of relay 21HG0 to the winding of one of the magnets 15T00–09. As is hereinafter described, one of the relays 17TSA0–9 is operated to identify the trunk utilized for line 2L00 by the selector circuit 1700; and (3) It prepares a circuit for operating the relay 10NT0 which has the same numerical designation as the horizontal group in which the called line 2L00 is located. There are ten relays 10NT0–9 which are associated individually with the line concentrators 200–9.

When the relay 22CB operates, it operates relay 21CB1 and it applies ground in the frame control circuit 2100 through the lead 17CB to the trunk selector circuit 1700 to initiate a trunk identifying sequence for identifying the trunk which is connected to the called line 2L00. The selector circuit 1700 utilizes the busy information supplied through leads CB0–9 from the memory circuit 1100 as during the callback call and identifies the trunk to which the line 2L00 is connected. With the trunk 4T0 being the identified trunk, relay 17TSA0 is operated to identify it.

After getting the line busy indication and operating relay 10NTT, the marker 2008 applies a positive potential of approximately 10 volts to the lead LH0 through the cable 10CA and tests for this potential on one of the leads LL0–9 which are extended to the connector 2010. The positive potential will appear on one of the leads LL0–9 to identify the horizontal of the switch 15SW0 through which the connection is established to the called line 2L00. For example, if trunk 4T0 is connected to the lowest horizontal, a connection is provided through lead LH0, an operated contact of relay 21VF0, an operated contact of relay 10NTT, an operated contact of relay 21CB1, an operated contact of relay 17TSA0, an operated contact of relay 21HG0, the sleeve lead of the vertical associated with trunk 4T0, through the closed crosspoint, the sleeve lead of the lowest horizontal, an operated contact of the relay 21HG0 and a normal contact of relay 17OFL1 to the lead LL9. The marker 2008 identifies the lead LL9 on which the positive potential appears, operates the associated select magnet 15TJ9 and then applies ground through the cable 10CA and the lead NT to operate the no-test connector 2014.

When the no-test connector 2014 is operated or seized by the marker 2008, it applies ground through the cable 10CC and the lead H0 to operate the no-test relay 10NT0 which locks through the lead H0. The operating path from lead H0 is through the serially connected normal contacts of relays 10NT0–4, an operated contact of relay 10NTT, an operated contact of relay 21HG0, a normal contact of the hold magnet 15T09 and the winding of relay 10NT0 to the battery 10B. The locking path for relay 10NT0 is from its winding through its operated contact to the lead H0. When the relay 10NT0 operates, it transfers the tip, ring and sleeve verticals of the trunk 4T9 in the switch 15SW0 from the concentrator trunk 4T9 to the no-test connector 2014. The verticals of trunk 4T9 in switch 15SW0 are normally connected to the tip and ring of trunk 4T9 through normal contacts of relay 10NT0. The sleeve lead of the vertical in switch 15SW0 associated with the trunk 4T9 is also extended through an operated contact of relay 10NT0 to the cable 10CC connected to the no-test connector 2014. When relay 10NT0 operates, it also operates the hold magnet 15T09 and holds it operated under control of the no-test connection through lead H0. Lead H0 is connected through two of the normal contacts of relay 10NT0 to the winding of the magnet 15T09 which is also connected to the battery 15B09.

When the magnet 15T09 operates, it closes a connection between the connector 2014 through the cable 10CC and the vertical in switch 15SW0 associated with trunk 4T9 to the lowest horizontal. As described above, the select magnet 15TJ9 was operated by the marker 2008 after it identified the link through which line 2L00 is connected. In this manner two crosspoints are closed in the switch 15SW0, one from trunk 4T0 to the lowest horizontal and one from the connector 2014 to the lowest horizontal. When the crosspoints close on the trunk switch 15SW0, the sleeve ground from the trunk link frame 2000 is extended through the no-test connector 2014 to the marker 2008 as an indication that the connection has been completed. The relay 10NT0 is held operated under control of the connector 2014 so that the connection may be released by releasing the connector 2014. This completes the connection of the no-test call.

When the marker 2008 receives the indication from the connector 2014, it releases and releases the frame control circuit 2100 which causes a release sequence for returning the selector circuit 1700, the control circuit 1400, the memory circuit 1100 and the trunk switch 1000 to normal except for the talking connection to the line 2L00 and the no-test connection to the connector 2014. The release sequence is similar to that described above for the originating, terminating and callback calls.

It is to be understood that the above-described arrangements are illustrative of the application of the principles of this invention. Numerous other arrangements may be devised by those skilled in the art without departing from the spirit and scope of the invention.

What is claimed is:

1. In a line concentrator telephone system, a plurality of lines, a central office, a plurality of trunks less in number than said plurality of lines extending from said central office, a line concentrator connecting said lines to said trunks, a memory circuit at said central office for registering the condition of said lines, means effective during a call to any one of said lines for making a busy test of said called line at said central office memory circuit, means effective when said memory circuit indicates that said called line is idle for operating said line concentrator to connect said called line to one of said trunks, and means effective when said memory circuit indicates that said called line is busy for releasing said initiating means.

2. In a line concentrator telephone system, a plurality of lines, a central office, a plurality of trunks less in number than said plurality of lines extending from said central office, a line concentrator connecting said lines to said trunks, means at said central office for maintaining a record of the connections established at said concentrator, means effective when a call is made to any one of said lines for making a line busy test of said called line at said central office record maintaining means whereby signalling to said line concentrator is avoided, means effective when a called one of said lines is idle for operating said line concentrator to connect said called line to one of said trunks, means effective when said called line is busy for determining at said record maintaining means the identity of said trunk to which said called line is connected, and means controlled by said determining means for establishing a connection at said central office to said identified trunk without disturbing the connection from said called line through said identified trunk.

3. In a telephone system, a plurality of lines, a plurality of trunks, means for establishing connections between said lines and said trunks, a memory circuit for maintaining a record of the connections established between said lines and said trunks by said connection establishing means by registering the identities of busy ones of said lines and the identities of busy ones of said trunks to which said busy lines are connected, means for disconnecting said established connections, and means controlled by said disconnecting means for controlling said memory circuit to erase records of disconnected connections.

4. In a telephone system wherein a large number of subscriber lines are connected by a remote concentrator to a small number of trunks extending from a central office, a memory circuit at the central office for maintaining a continuous record of the connections established through said concentrator.

5. In a telephone system wherein a large number of subscriber lines are connected by a remote concentrator to a small number of trunks extending from a central office, a memory circuit at the central office for maintaining a continuous record of the connections established through said concentrator by registering the identities of busy ones of said lines and the identities of said trunks to which said busy lines are connected.

6. In a line concentrator telephone system, a central office; a plurality of subscriber lines; a smaller plurality of trunks extending from said central office; a concentrator unit for establishing connections between said lines and said trunks; a signaling circuit at said central office including first means for supplying to said concentrator unit the identity of said lines and the identity of said trunks between which connections are to be established, and second means for supplying to said concentrator unit the identity of said lines and the identity of said trunks between which connections are to de discontinued; and a memory circuit at said central office and controlled by said signaling circuit for registering the identity of busy ones of said lines and the identity of said trunks to which said busy lines are connected.

7. In a line concentrator telephone system in accordance with claim 6 means for initiating a call to any one of said subscriber lines, means for checking said memory circuit for the condition of said called line, and means effective when said called line is idle as determined by said checking means for operating said signaling circuit.

8. In a line concentrator telephone system, a central office; a plurality of subscriber lines; a smaller plurality of trunks extending from said central office; a concentrator unit for establishing connections between said lines and said trunks; a signaling circuit at said central office including first means for supplying to said concentrator unit the identity of said lines and the identity of said trunks between which connections are to be established, and second means for supplying to said concentrator unit the identity of said lines and the identity of said trunks between which connections are to be discontinued; means for initiating a call to any one of said lines; means responsive to said call initiating means for operating said first supply means of said signaling circuit; and a memory circuit at the central office for maintaining a continuous record of the connections established through said concentrator, said memory circuit including means effective before the operation of said operating means for making a line busy test and for inhibiting said first supply means if said called line is busy.

9. In a line concentrator telephone system, a central office; a plurality of subscriber lines; a smaller plurality of trunks extending from said central office; a concentrator unit for establishing connections between said lines and said trunks; a signaling circuit at said central office including first means for supplying to said concentrator unit the identity of said lines and the identity of said trunks between which connections are to be established, and second means for supplying to said concentrator unit the identity of said lines and the identity of said trunks between which connections are to be discontinued; means for initiating a call to any one of said lines; means responsive to said call initiating means for operating said first supply means of said signaling circuit; a memory circuit at the central office for maintaining a continuous record of the connections established through said concentrator, said memory circuit including means effective before the operation of said operating means for making a line busy test and for inhibiting said first supply means if said called line is busy, and means effective when a disconnect is initiated at any one of said lines for determining the identity of said trunk connected to said disconnect initiating line and for supplying said determined trunk identity to said second means.

10. In a line concentrator telephone system, a central office; a plurality of subscriber lines; a smaller plurality of trunks extending from said central office; a concentrator unit for establishing connections between said lines and said trunks; a signaling circuit at said central office including first means for supplying to said concentrator unit the identity of said lines and the identity of said trunks between which connections are to be established, and second means for supplying to said concentrator unit the identity of said lines and the identity of said trunks between which connections are to be discontinued; and a memory circuit at said central office and controlled by said signaling circuit for registering the identity of busy ones of said lines and the identity of said trunks to which said busy lines are connected, said memory circuit including means effective when a disconnect is initiated at any one of said lines for determining the identity of said trunk connected to said disconnect initiating line and for supplying said determined trunk identity to said second supply means.

11. In a telephone system, a plurality of lines, a plurality of trunks, means for establishing connections between said lines and said trunks, a memory circuit for maintaining a record of the connections established between said lines and said trunks by said connection establishing means, means effective when a call is initiated to any one of said lines for checking said memory circuit to determine the service condition of said called line, means effective when said called line is idle as determined by said checking means for operating said connection establishing means, means effective when a disconnect is initiated at any one of said lines for reading said memory circuit to determine the identity of said trunk connected to said disconnect initiating line, and means controlled by said reading means for controlling said memory circuit to erase the record of the connection to said disconnect initiating line.

12. In a telephone system for establishing connections between a number of subscriber lines and a smaller number of trunks extending from a central office, a crossbar switch at said central office having a plurality of hold magnets individually associated with said trunks, a plurality of select magnets for registering the identities of said lines, means effective when a call is initiated at any one of said lines for selecting one of said trunks, means controlled by said selecting means for selectively operating said select magnets to register the identity of said calling line and for operating said hold magnet associated with said selected trunk, means for maintaining the operation of said operated hold magnet as long as said selected trunk is busy for the call from said calling line, and means effective when a call is initiated to any one of said lines for determining whether any one of said hold magnets is operated to indicate an established connection to said called line.

13. In a telephone system for establishing connections between a number of subscriber lines and a smaller number of trunks extending from a central office, a crossbar switch at said central office having a plurality of hold magnets individually associated with said trunks, a plurality of select magnets for registering identities of said lines, means at said central office effective when a call is initiated at any one of said lines for selecting one of said trunks, means controlled by said selecting means for selectively operating said select magnets to register the identity of said calling line and for operating said hold magnet associated with said selected trunk, and means for maintaining the operation of said operated hold magnet as long as said selected trunk is busy for the call from said calling line.

14. In a telephone system for establishing connections between a number of subscriber lines and a smaller number of trunks extending from a central office, a crossbar switch at said central office having a plurality of hold magnets individually associated with said trunks, a plurality of select magnets for registering identities of said lines, means effective when a call is initiated at any one of said lines for selecting one of said trunks, means controlled by said selecting means for selectively operating said select magnets to register the identity of said calling line and for operating said hold magnet associated with said selected trunk, means for maintaining the operation of said operated hold magnet as long as said selected trunk is busy for the call from said calling line, means for disconnecting said calling line from said selected trunk, and means effective during the operation of said disconnecting means for releasing said operated hold magnet.

15. In a telephone system, a plurality of lines, a central office, a plurality of trunks less in number than said plurality of lines extending from said central office, a switching network connecting said lines with said trunks, a first crossbar switch at said central office for establishing connections to said trunks, a second crossbar switch at said central office for maintaining a record of the connections established through said network, means responsive to the initiation of a call from any one of said lines for operating said network and said first crossbar switch to establish a connection from said calling line through said network and through one of said trunks and said first crossbar switch, and means responsive to the initiation of a call from any one of said lines for operating said second crossbar switch to make a record of the connection to be established through said network before said network and said first crossbar switch are operated by said operating means.

16. In a telephone system, a plurality of lines, a central office, a plurality of trunks less in number than said plurality of lines extending from said central office, a switching network connecting said lines with said trunks, a first crossbar switch at said central office for establishing connections to said trunks, a second crossbar switch at said central office for maintaining a record of the connections established through said network, said first crossbar switch having a plurality of hold magnets individually associated with said trunks, said second crossbar switch having at least one hold magnet associated with each of said trunks, means for operating any one of said hold magnets of said first crossbar switch to establish a connection to the associated one of said trunks, means effective during the operation of said operating means for operating said hold magnet in said second crossbar switch associated with said associated trunk, means effective during the operation of said first crossbar switch operating means for operating said switching network to establish a connection to said associated trunk, and means responsive to the release of said hold magnet in said first crossbar switch for operating said switching network to release said associated trunk.

17. In a telephone system, a plurality of lines, a plurality of trunks, means for establishing connections between said lines and said trunks, a memory circuit for maintaining a record of the connections established between said lines and said trunks by said connection establishing means, means for disconnecting said established connections, and means controlled by said disconnecting means for controlling said memory circuit to erase records of disconnected connections, said memory circuit including at least one crosspoint for each of said trunks, and means for operating any one of said crosspoints when a connection is to be established through the associated one of said trunks by said connection establishing means.

18. In a telephone system, a plurality of lines, a plurality of trunks, means for establishing connections between said lines and said trunks, a memory circuit for maintaining a record of the connections established between said lines and said trunks by said connection establishing means, means for disconnecting said established connections, and means controlled by said disconnecting means for controlling said memory circuit to erase records of disconnected connections, said memory circuit including at least one crosspoint for each of said trunks, means for operating any one of said crosspoints when a connection is to be established through the associated one of said trunks by said connection establishing means, and means preventing the operation of said connection establishing means until after the operation of said crosspoint.

19. In a telephone system, a plurality of lines, a plurality of trunks, means for establishing connections between said lines and said trunks, a memory circuit for maintaining a record of the connections established between said lines and said trunks by said connection establishing means, means for disconnecting said established connections, and means controlled by said disconnecting means for controlling said memory circuit to erase records of disconnected connections, said memory circuit including a plurality of crosspoints for each of said trunks, means effective when a connection is to be established from any one of said lines through any one of said trunks for operating one of said crosspoints associated with said trunk, means effective when a call is initiated to any one of said lines for providing pulses to one of said crosspoints associated with each of said trunks to determine if one of said trunks is connected to said called line, and means controlled by said pulse providing means and said operated crosspoint for determining the identity of any one of said trunks connected to said called line.

20. In a telephone system, a plurality of lines, a plurality of trunks, means for establishing connections between said lines and said trunks, a memory circuit for maintaining a record of the connections established between said lines and said trunks by said connection establishing means, means for disconnecting said established connections, and means controlled by said disconnecting means for controlling said memory circuit to erase records of disconnected connections, said memory circuit including a plurality of crosspoints for each of said trunks, means effective when a connection is to be established from any one of said lines through any one of said trunks for operating one of said crosspoints associated with said trunk, means effective when a call is initiated to any one of said lines for providing pulses to one of said crosspoints associated with each of said trunks to determine if one of said trunks is connected to said called line, means controlled by said pulse providing means and said operated crosspoint for determining the identity of any one of said trunks connected to said called line, and means effective when said called line is busy as determined by said pulse providing means for inhibiting the operation of said connection establishing means.

21. In a telephone system in accordance with claim 20, means responsive to the initiation of a call to any one of said lines for selecting an idle one of said trunks, and means effective when none of said trunks is connected to said called line as determined by said pulse providing means for operating said connection establishing means to connect said selected trunk to said called line.

22. In a telephone system, a central office, a plurality of lines, a plurality of trunks less in number than said plurality of lines and connected to said central office, a line concentrator for establishing connections from any one of said lines to an idle one of said trunks, means for registering dial pulses, means responsive upon the initiation of a calling condition on any one of said lines for operating said line concentrator and for completing a dial connection from the connected one of said trunks to said register means, means at said central office controlled by said operating means for registering the identity of busy ones of said lines and busy ones of said trunks, means effective upon the completion of dialing for disconnecting said dial pulse register means from said connected trunk, and means controlled by said identity register means for extending the talking connection from said connected trunk in accordance with the dialed digits.

23. A line concentrator telephone system comprising a plurality of subscriber lines; a central office; a plurality of talking trunks less in number than said plurality of lines and extending from said central office; and an automatic line concentrator for connecting said lines and said trunks having scanning means for cyclically determining the condition of said lines and for supplying an indication of said condition to said central office, and means for providing an indication of the establishment of a line-to-trunk connection to said central office; said central office having a memory circuit for registering the identity of connected ones of said lines and connected ones of said trunks, means controlled by said scanning means for operating said line concentrator for establishing a dialing connection, means effective when dialing is completed for reading said memory circuit to determine which one of said trunks was connected to said line for the dialing connection, and means controlled by said reading for establishing a callback connection through said determined trunk without interrupting the operation of said scanning means.

24. A telephone system comprising a plurality of subscriber lines, a plurality of talking trunks, a central office, a switching network controlled by said central office for establishing connections between said lines and said trunks, a line scanner associated with said network for determining the service condition of said lines and for supplying indications of said conditions to said central office, means at said central office responsive to a service request indication from said line scanner for halting the operation of said line scanner and for establishing a dial-tone connection through one of said trunks to the service requesting one of said lines, means effective upon the establishment of the dial-tone connection for restarting said line scanner, means at said central office for registering the identity of busy ones of said lines and said trunks, and means controlled by said register means and effective when dialing is completed for establishing a callback connection through said trunk utilized for said dial-tone connection without interrupting the operation of said line scanner.

25. A line concentrator telephone system comprising a plurality of subscriber lines, a plurality of talking trunks less in number than said plurality of lines, a central office, a remotely located line concentrator controlled by said central office for establishing connections between said lines and said trunks, an originating register at said central office for registering dial pulses, means at said concentrator responsive to the service request condition of any one of said lines for supplying the identity of said service requesting line to said central office, means at said central office controlled by said supply means for selecting an idle one of said trunks and for initiating the operation of said concentrator to connect said service requesting line to said selected trunk, means at said central office controlled by said select and initiating means for connecting said selected trunk to said register, a memory circuit at said central office for maintaining a record of the connections established through said line concentrator, means controlled by said register upon the completion of dialing for disconnecting said register from said selected trunk while maintaining the connection from said service requesting line to said selected trunk, an outgoing trunk at said central office, means controlled by said memory circuit upon completion of dialing for establishing a connection from said outgoing trunk to said selected trunk which is still connected to said service requesting line, means effective when the subscriber at said service requesting line hangs up for disconnecting said selected trunk at one end from said outgoing trunk and at the other end from said service requesting line, and means controlled by said disconnect means for causing said memory circuit to erase the record of the connection through said line concentrator from said service requesting line to said selected trunk.

26. A centralized memory line concentrator system comprising a number of groups of subscriber lines; a central office; a group of trunks for each of said groups of lines extending from said central office; a line concentrator connecting each of said groups of lines with the associated one of said groups of trunks; a crossbar switch at said central office for each of said groups of trunks; means responsive to the initiation of a service request at any one of said subscriber lines for selecting one of the trunks in the associated one of said groups of trunks; a plurality of memory crossbar switches for maintaining a current record of the connections established through said line concentrator, each of said memory switches having a coordinate array of crosspoints, means responsive to said trunk selecting means for selecting one one of said memory switches for recording a record of the connection to be established from said service requesting line, means controlled in accordance with the identity of said service requesting line for readying the operation of a plurality of crosspoints in said selected memory switch, means controlled in accordance with the identity of said concentrator associated with said service requesting line for operating said readied crosspoints, and means effective after the operation of said crosspoints for establishing an originating connection from said service requesting line through said selected trunk and said crossbar switch associated with said selected trunk.

27. A centralized memory line concentrator system in accordance with claim 26 comprising in addition means responsive to the initiation of a terminating call to any one of said lines for supplying reading pulses to selected ones of said crosspoints in each of said memory switches in accordance with the identity of said called line, a reading circuit for each of said memory switches controlled in accordance with the condition of the associated selected crosspoints for determining if said called line is busy, and means controlled by said reading circuits for returning busy tone in the event said called line is busy.

28. A centralized memory line concentrator system in accordance with claim 26 comprising in addition means responsive to the initiation of a callback call for said service requesting line for supplying reading pulses to selected ones of said crosspoints in each of said memory switches in accordance with identity of said service requesting line, a reading circuit for each of said memory switches controlled in accordance with the condition of the associated selected crosspoints for determining the identity of said selected trunk, and means controlled by said reading means for establishing a callback connection for said service requesting line through said selected trunk.

29. A centralized memory line concentrator system in accordance with claim 26 comprising means responsive to the initiation of a no-test call to any one of said lines for supplying reading pulses to selected ones of said crosspoints in each of said memory switches in accordance with the identity of said tested line, a reading circuit for each of said memory switches controlled in accordance with the condition of the associated selected crosspoints for determining if said tested line is busy, and means effective if said tested line is busy as determined by said reading means for establishing a no-test connection to said tested line through said trunk to which said busy line is connected.

References Cited in the file of this patent

UNITED STATES PATENTS

| | | |
|---|---|---|
| 2,715,656 | Andrews | Aug. 16, 1955 |
| 2,774,822 | Dunlap et al. | Dec. 18, 1956 |
| 2,812,385 | Joel et al. | Nov. 5, 1957 |